(12) United States Patent
Narayanaswamy et al.

(10) Patent No.: US 10,291,657 B2
(45) Date of Patent: May 14, 2019

(54) METADATA-BASED DATA LOSS PREVENTION (DLP) FOR CLOUD STORAGE

(71) Applicant: NetSkope, Inc., Los Altos, CA (US)

(72) Inventors: Krishna Narayanaswamy, Saratoga, CA (US); Lebin Cheng, Saratoga, CA (US); Abhay Kulkarni, Cupertino, CA (US); Ravi Ithal, Los Altos, CA (US); Chetan Anand, San Francisco, CA (US); Rajneesh Chopra, Sunnyvale, CA (US)

(73) Assignee: NetSkope, Inc., Los Altos, CA (US)

( * ) Notice: Subject to any disclaimer, the term of this patent is extended or adjusted under 35 U.S.C. 154(b) by 0 days.

(21) Appl. No.: 16/000,132

(22) Filed: Jun. 5, 2018

(65) Prior Publication Data
US 2018/0367575 A1    Dec. 20, 2018

Related U.S. Application Data

(63) Continuation of application No. 15/368,240, filed on Dec. 2, 2016, and a continuation of application No. 15/368,246, filed on Dec. 2, 2016.
(Continued)

(51) Int. Cl.
*H04L 29/06* (2006.01)
*G06F 21/62* (2013.01)
*G06F 17/30* (2006.01)

(52) U.S. Cl.
CPC ........ *H04L 63/20* (2013.01); *G06F 17/30598* (2013.01); *G06F 17/30864* (2013.01); *G06F 21/6209* (2013.01); *H04L 63/0281* (2013.01); *H04L 63/10* (2013.01); *H04L 63/104* (2013.01); *H04L 63/105* (2013.01); *H04L 63/12* (2013.01)

(58) Field of Classification Search
None
See application file for complete search history.

(56) References Cited

U.S. PATENT DOCUMENTS

| | | | |
|---|---|---|---|
| 6,574,655 B1 * | 6/2003 | Libert | H04L 63/10 707/999.01 |
| 2008/0127303 A1 * | 5/2008 | Wrighton | G06F 8/315 726/2 |

(Continued)

OTHER PUBLICATIONS

Cheng et al., "Cloud Security for Dummies, Netskope Special Edition," John Wiley & Sons, Inc. 2015.
(Continued)

*Primary Examiner* — Kaveh Abrishamkar
(74) *Attorney, Agent, or Firm* — Haynes Beffel & Wolfeld LLP; Ernest J. Beffel, Jr.

(57) ABSTRACT

The technology disclosed relates to enforcing multi-part policies on data-deficient transactions of independent data stores. In particular, it relates to combining active analysis of access requests for the independent object stores with inspection of objects in the independent object stores, each of the analysis and inspection generating and persisting object metadata in a supplemental data store, actively processing data-deficient transactions that apply to the objects by accessing the supplemental data store to retrieve object metadata not available in transaction streams of the data-deficient transactions, and actively enforcing the multi-part policies using the retrieved object metadata.

20 Claims, 49 Drawing Sheets

Related U.S. Application Data

(60) Provisional application No. 62/307,305, filed on Mar. 11, 2016.

(56) References Cited

U.S. PATENT DOCUMENTS

| | | | |
|---|---|---|---|
| 2014/0007222 A1 | 1/2014 | Qureshi et al. | |
| 2016/0269467 A1* | 9/2016 | Lee | H04W 4/70 |
| 2016/0277374 A1* | 9/2016 | Reid | H04L 63/061 |
| 2017/0063720 A1* | 3/2017 | Foskett | H04L 67/2804 |
| 2017/0264640 A1* | 9/2017 | Narayanaswamy | G06F 17/30864 |

OTHER PUBLICATIONS

"Netskope Introspection," netSkope, Inc., 2015, 3 pgs.
"Data Loss Prevention and Monitoring in the Cloud" by netSkope, Inc., Nov. 2014, 18 pgs.
"The 5 Steps to Cloud Confidence," netSkope, Inc., 2014, 11 pgs.
"Netskope Active Cloud DLP," netSkope, Inc., 2015, 4 pgs.
"Repave the Cloud-Data Breach Collision Course," netSkope, Inc., 2014, 6 pgs.
"Netskope Cloud Confidence Index™," netSkope, Inc., 2015, 2 pgs.
PCT/US2017/021969—International Search Report and Written Opinion dated Jun. 22, 2017, 11 pages.
Laminin Solutions: "Metadata Permissions Protects Confidential Information", Feb. 19, 2013, pp. 1-2 XP002770913.
Yague et al., "A Metadata-based access control model for web services", Computer Science Department, Internet Research, vol. 15, No. 1, University of Malaga, Malaga, Spain, Dec. 31, 2005, pp. 99-116, XP002770914.
Gowadia etal., "RDF Metadata for XML Access Control", Proceedings of the ACM Workshop on XML Security 2003. Fairfax, VA, Oct. 31, 2003, pp. 39-48, XP001198168.
Kuwabara etal., "Use of Metadata for Access Control and Version Management in RDF Database", Sep. 12, 2011, Knowledge-Based and Intelligent Information and Engineering Systems, Springer Berling Heidelberg, pp. 326-336, XP019164752.
PCT/US2017/021969—International Preliminary Report on Patentability dated Mar. 5, 2018, 13 pages.
U.S. Appl. No. 15/368,240—Office Action dated Aug. 7, 2018, 28 pages.
U.S. Appl. No. 15/368,240—Response to Office Action dated Aug. 7, 2018, filed Oct. 11, 2018, 25 pages.

* cited by examiner

| object_id 1302 | attribute_1 1304 | attribute_2 1306 | attribute_3 1308 | attribute_4 1310 | attribute_5 1312 | ... |
|---|---|---|---|---|---|---|
| Content File 871 | Sensitive:yes | Owner:xyz@nsk.com | FileType:yes | Md5:1gh2n320#*&^ | ... | |
| User 6412 | Compromised:yes | Device:8917 | GeoLocation:95050 | Group:IT | ... | |
| Device 9712 | AtRisk:yes | OS:Windows | GeoLocation:95050 | Owner:xyz@nsk.com | ... | |

Metadata 1300

FIG. 13

METADATA-BASED DATA LOSS PREVENTION (DLP) FOR CLOUD STORAGE

PRIORITY APPLICATION

This application is a continuation of U.S. patent application Ser. No. 15/368,240, "SYSTEMS AND METHODS OF ENFORCING MULTI-PART POLICIES ON DATA-DEFICIENT TRANSACTIONS OF CLOUD COMPUTING SERVICES", filed on Dec. 2, 2016, which claims the benefit of U.S. Provisional Patent Application 62/307,305, "SYSTEMS AND METHODS OF ENFORCING MULTI-PART POLICIES ON DATA-DEFICIENT TRANSACTIONS OF CLOUD COMPUTING SERVICES", filed on Mar. 11, 2016. The priority provisional application is hereby incorporated by reference for all purposes.

This application is a continuation of U.S. patent application Ser. No. 15/368,246, "MIDDLE WARE SECURITY LAYER FOR CLOUD COMPUTING SERVICES", filed on Dec. 2, 2016, which claims the benefit of U.S. Provisional Patent Application 62/307,305, "SYSTEMS AND METHODS OF ENFORCING MULTI-PART POLICIES ON DATA-DEFICIENT TRANSACTIONS OF CLOUD COMPUTING SERVICES", filed on Mar. 11, 2016. The priority provisional application is hereby incorporated by reference for all purposes.

INCORPORATIONS

The following materials have been incorporated by reference in this filing:

Cheng, Ithal, Narayanaswamy, and Malmskog. *Cloud Security For Dummies, Netskope Special Edition*. John Wiley & Sons, Inc. 2015, "Netskope Introspection" by netSkope, Inc., "SYSTEMS AND METHODS OF MONITORING AND CONTROLLING ENTERPRISE INFORMATION STORED ON A CLOUD COMPUTING SERVICE (CCS)", U.S. Non Prov. application Ser. No. 14/835,640, filed on Aug. 25, 2015, "SYSTEMS AND METHODS OF PER-DOCUMENT ENCRYPTION OF ENTERPRISE INFORMATION STORED ON A CLOUD COMPUTING SERVICE (CCS)", U.S. Prov. application Ser. No. 14/835,632, filed on Aug. 25, 2015, "SECURITY FOR NETWORK DELIVERED SERVICES", U.S. Prov. App. No. 61/773,633, filed on Mar. 6, 2013, "SECURITY FOR NETWORK DELIVERED SERVICES", U.S. Non Prov. application Ser. No. 14/198,499, filed on Mar. 5, 2014 (U.S. Publication No. 2014/0259093 A1), "SECURITY FOR NETWORK DELIVERED SERVICES", U.S. Non Prov. application Ser. No. 14/198,508, filed on Mar. 5, 2014 (now U.S. Pat. No. 9,270,765 issued Feb. 23, 2016), "SYSTEMS AND METHODS OF MONITORING AND CONTROLLING ENTERPRISE INFORMATION STORED ON A CLOUD COMPUTING SERVICE (CCS)", U.S. Prov. App. No. 62/135,656, filed on Mar. 19, 2015, "Data Loss Prevention and Monitoring in the Cloud" by netSkope, Inc., "The 5 Steps to Cloud Confidence" by netSkope, Inc., "Netskope Active Cloud DLP" by netSkope, Inc., "Repave the Cloud-Data Breach Collision Course" by netSkope, Inc., and "Netskope Cloud Confidence Index™" by netSkope, Inc.

FIELD OF THE TECHNOLOGY DISCLOSED

The technology disclosed generally relates to providing visibility, control and data security for network delivered services, and more particularly relates to security and regulatory compliance of cloud services transactions and traffic.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Sharing content from the cloud has never been easier. The challenge is that without visibility and control over what is being shared and with whom is the content being shared with, there is risk that sensitive data could get in the wrong hands. For example, when an Office 365™ user shares sensitive content with a user outside of the organization, it has potential to be a risky situation. To help mitigate this risk, the technology disclosed allows setting of fine-grained access restrictions so as to enforce granular and precise policies on sensitive content.

The use of cloud services for a number of corporate functions is now common. Thus, instead of installing servers within a corporate network to run a customer relationship management (CRM) software product, a software as a service (SaaS) solution such as Salesforce.com's offerings can be used. The information technology (IT) and network architecture approaches that could log and protect access to a classic solution provide limited control. The sprawl of "bring your own devices" (BYODs) and the need to haul that traffic back to the enterprise make it less attractive. For example, VPN solutions are used to control access to the protected corporate network. Proxies (both transparent and explicit) may be used to filter, or limit access to undesirable web sites when the client is accessing the web sites from within the corporate network. Similar filtering software can be installed on client computers, e.g. safe browsing software, to enforce limits on access. A viable solution should provide consistent, centrally administered control, e.g. enforce the same policy across multiple devices, network services, and networks—including corporate networks.

Data is often the lifeblood of any business and it is critical that it is effectively managed, protected, and meets compliance needs. Protecting data in the past was focused primarily on on-premise scenarios, but now with the increased adoption of cloud services, companies of all sizes are now relying on the cloud to create, edit, and store data. This presents new challenges. Despite its benefits, the cloud also makes it easy for people to lose sensitive corporate data. For one thing, people can access cloud services from multiple devices more easily. Another is that the cloud services make it easy to share data, including with people outside of an organization. For these reasons, it is easy for data to get out of an organization's control.

Also, as the number of cloud services increases exponentially, there are hundreds of ways data can leak. Employees might be attach a wrong file while sending e-mails, hit the send button too early, not be careful when rushing to a deadline, or share data and collaborate with people outside of their organization. The native cloud storage sync clients also pose a significant risk to organizations. A continuous sync takes place between the end point and the cloud service without employees realizing they are leaking confidential company information. In the case of disgruntled workers, the cloud services are making it super easy for them to steal intellectual property.

Accordingly, it is imperative to facilitate the use of cloud services so people can continue to be productive and use the best tools for the job without compromising sensitive information such as intellectual property, non-public financials, strategic plans, customer lists, personally identifiable information belonging to customers or employees, and the like.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

In FIG. 4G, the proxy-bypassing data-deficient transaction bypassed the active proxy analyzer because it was initiated by an unmanaged device.

FIG. 13 illustrates object metadata being stored in a Cassandra data model in accordance with an exemplary implementation of the technology disclosed.

DESCRIPTION

Introduction

Figure 1A:
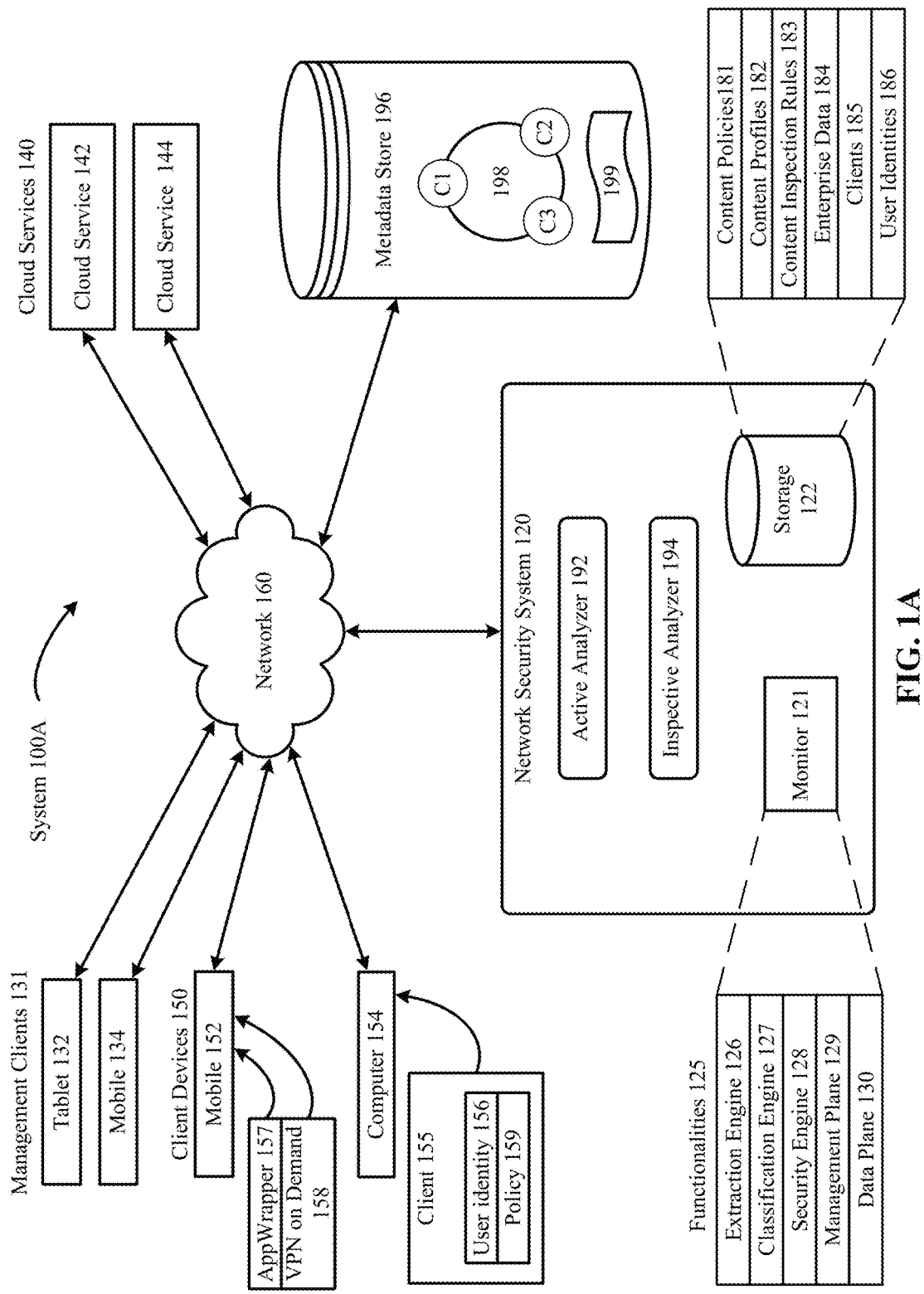
FIG. 1A illustrates an architectural level schematic of a system in accordance with an implementation.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, an introduction describing some of the problems addressed by various implementations will be presented, followed by an explanation of terminology that will be used throughout the discussion. Then, a high-level description of one implementation will be discussed at an architectural level. Next, the algorithms used by some implementations to provide security are discussed. Lastly, more detailed architectures for implementing the system, together with filtering rules, models, and application definitions, are discussed.

Content inspection has come a long way in the past several years. Whether it is the knowledge and understanding of different file types (from video to even the most obscure binary files) or the reduction of false positives through proximity matching, the industry has cracked a lot of the code and IT and businesses are better off as a result. One constant technical problem that has remained true, however, is the fact that you cannot inspect content you cannot see. For example, there are more than 153 cloud storage providers today and the average organization, according to the Netskope Cloud Report, is using only 34 of them. Considering IT admins are typically unaware of 90% of the cloud applications running in their environment, this means that there is content in 30 plus cloud applications that IT has no knowledge of. And, that is just cloud storage because the average enterprise uses 917 cloud applications. Accordingly, there is a need of a comprehensive solution that is flexible enough to cover the myriad use cases the users are confronted with.

Once a cloud application is discovered to be in use, inspection of content in the cloud application requires movement or traversing of said content across a so-called content monitor. Since many traditional tools perform inspection of content as it flies by, the scope of inspection is limited to when content is being uploaded or when it is downloaded. Therefore, content may exist in a cloud application for several years before it is ever inspected. In particular, the "sharing" activity or transaction is very popular in cloud applications today. The 2015 Cloud Security Alliance survey reported that the cloud file sharing services are the most-requested. However, with cloud services, sharing is done by sending links rather than the traditional "attachment" method. Since the link does not contain the file, the content monitor is useless. Transactions and activities such as sharing that cause manipulation of data and data objects without including the actual data or content of the data in the given transaction or activity and sometimes by merely referencing the data objects are referred herein as "data-deficient transactions" because the actual transactions or activities are devoid of any content upon which content polices can be fully applied. Other examples of data-deficient transactions are provided infra.

The technology disclosed solves the technical problem of data-deficient data transactions by using an "inspective analyzer" that instantaneously discovers all cloud applications running in an enterprise environment and determines whether the usage of these applications is risky or not. Further, the technology disclosed enables enterprise users to examine, take action and/or enforce policies over all content stored in a cloud application. This means that regardless of whether the data was placed in a cloud application yesterday or years ago, enterprise IT can take advantage of the disclosed real-time and activity-aware platform to protect it. In addition, the disclosed inspective analysis provides data inventory and classification, application and usage context, creates a content usage audit trail, and is deployed alongside an "active analyzer". In one example, the inspective analyzer encrypts specific data by discovering the content, determining whether the content meets certain criteria (such as sensitive or high value content), and accordingly encrypting the content. In other examples, additional security actions are automatically triggered, such as alerting sharing permissions, changing to ownership of the content to the appropriate person, encrypting the content, quarantine data for review (by IT, legal, security, HR, etc.), and many more.

Viewing cloud storage as a spectrum, on one side of the spectrum, content is constantly being moved in and out of a cloud application. For this side, the technology disclosed uses an active analyzer to inspect real-time transactions. On the other side of the spectrum, there is content that is already in the cloud application and being shared via links. For this side, the technology disclosed use the inspective analyzer, thus providing complete cloud coverage. As a result, an opportunity arises to enable users to confidently use cloud applications they have cautiously embraced. The technology disclosed provides organizations that use cloud applications higher levels of control over their user and data access, thereby reducing the potential for data leakage, audit findings or regulatory sanctions. Increased user retention and satisfaction and enhanced user experience may result.

We describe a system and various implementations for providing security for network delivered services. Consider the technical problems faced primarily by corporations seeking to protect their data at the intersection of a bring your own device (BYOD) environment and the proliferation of cloud services. The company may be using Salesforce.com™ for CRM, Dropbox™ for storage, and Google Apps™ for collaboration. While users' devices are using the corporate network, the corporation may have some ability to log and monitor usage of these cloud services with existing network monitoring tools. However, if a user uses the Salesforce.com application with their mobile device over the cellular network, the user's activity is not comprehensively tracked in the sense that the tracking is restricted to maintaining limited audit logs on the cloud services side and the audit logs are not shared with the customers using the cloud services. Additionally, the trend towards BYOD may also increase the likelihood of enterprise traffic bypassing corporate networks completely.

Further, the activity that is tracked with traditional approaches is very much at the network level. What if you want to log data exports activity from the application? Track large downloads? Only allow users to access certain data or services while their location is within the European Union? Additionally, the system is compatible with existing VPNs, proxies, firewalls, and filtering systems. Thus, one policy could require that access to a particular cloud service by a particular user must be from client devices that are logged into the corporate VPN. For business applications developed by combining components from multiple web application services (sometimes called "mash-ups"), one implementation provides a consistent, enterprise-wide application level control and policy enforcement.

Some individual cloud services may offer differing levels of security and access controls; one is limited to the specific items implemented by the cloud services as opposed to a uniform, programmable set of controls across multiple cloud applications. This enables the system to provide access controls and event logging that exceed the native capabilities of the cloud service.

One workaround companies use is to require cloud service vendors to deploy into private clouds within the corporate network. Aside from the previously discussed limitations, private clouds require that the company backhaul data to your corporate network for monitoring. In contrast, implementations provide for centralized client corporate analytics across cloud services. Secondly, some implementations provide for intentionally allowing "one more" access by a computer that is believed compromised. This approach may allow for better recovery of lost or stolen client devices because the access can be logged. Other implementations assist in identifying cloud services that should be deactivated for individual users, e.g. user attempts to access service are reported even if the user should no longer have access. Implementations can also interoperate with single sign-on (SSO) solutions and/or corporate identity directories, e.g. Microsoft's Active Directory. Such implementations may allow policies to be defined in the directory, e.g. either at the group or user level, using custom attributes.

Also, it should be mentioned that another feature of implementations is that cloud services configured with the system are also configured to require traffic via the system. This can be done through setting IP range restrictions in the cloud service to the IP range of the system and/or integration between the system and SSO systems. For example, integration with a SSO solution can enforce client presence requirements before authorizing the sign-on, i.e. whether traffic from the client requesting authorization is being tunneled through an on-premise or in-cloud secure network. Other implementations may use "proxy accounts" with the SaaS vendor—e.g. a dedicated account held by the system that holds the only credentials to sign in to the service. In other implementations, the client may encrypt the sign on credentials before passing the login to the cloud service; this means that the networking security system "owns" the password.

We also describe a system and various implementations for providing security for network delivered services. The technology disclosed provides visibility into the cloud services interfacing with an organization's network. It allows organizations to institute granular policies that make interaction with those services safe, compliant, and highly efficient. In addition, it allows the organizations to identify risky behavior and potential data loss or breach.

With an increasing number of cloud services coming onto the scene, organizations are grappling with the technical problem of monitoring and controlling transfer of critical enterprise data to these services. Organizations are concerned that due to the lack of a "cloud gatekeeper", they can no longer attest to the accuracy of their security and compliance claims.

Organizations have adopted cloud computing services (CCS) in a big way. Today accounting for 23 percent of IT spend, cloud computing has accelerated because it allows people to get their jobs done more quickly, easily, and flexibly than traditional computing tools. Cloud services, the most visible and adopted segment of cloud computing, have proliferated in enterprises with thousands of cloud services being used in enterprises today.

Cloud services are increasingly common in nearly every kind of enterprise. Sometimes this is because they are cheaper to buy and operate. Other times it's because people want to be nimble, deploying a service faster and taking advantage of the latest product features sooner than they would with on-premises software. And other times it's because people don't want to coordinate across the many gatekeepers—operations, hardware, networking, and security—required to make a software rollout successful.

While IT has ownership or responsibility for some cloud services, people are now more than ever empowered to go outside of IT and deploy their own service commonly referred to as "shadow IT". This means they are procuring, paying for, managing, and using these services without IT's involvement. This means that there is no way for IT to consistently manage and secure all of the cloud services running across the organization, whether "shadow IT" or sanctioned, or to enforce security or compliance controls.

Whether shadow or sanctioned, cloud service usage is growing and C-suites, boards of directors, and audit committees around the world are beginning to ask whether the cloud technologies in their environment are safe, compliant with business policies, and perform according to vendor service-level agreements. Accordingly, it is desirable that IT can confidently answer these questions and assuage these concerns.

Moreover, data leaks can cause an organization loss of millions of dollars. When sensitive information is leaked companies spend millions of dollars to conduct internal investigations and fix existing infrastructure. Also, dealing with the damaged reputation and external audits and litigations can stay with the company for a long period of time. A leak can be subjected to more long-term costs for those who sell and depend on intellectual property. When companies lose intellectual property, it directly and immediately impacts R&D costs and revenue.

Forrester Research estimates that the average data leak results in $1.5 million in economic damage. Ultimately, the cost of the leak is determined by the size and nature of the organization, the sensitivity of the data leaked, and the size of the leak itself. According to Forrester research, when an organization loses customer data the total cost per record is $218. A simple data leak that results in the loss of 100,000 customer records can turn into a direct and immediate cost of millions. See Trends: Calculating the Cost of a Security Breach. Forrester Research, Inc. Apr. 10, 2007.

The Ponemon Institute conducted a survey sponsored by Netskope™ of 613 IT and security professionals, and found that just over half of them (51 percent) believed the use of cloud services increased the likelihood of a data breach. 90 percent of the respondents said that the backup and storage of sensitive and/or confidential information in the cloud services increased by 50 percent within an organization over a 12-month period would increase the probability of a data breach. The study used information like this to calculate the increased cost of a data breach due to using the cloud services more. On average, a major breach will cost an organization around $2.37 million (£1.41 million), but increased use of cloud services can raise this by an estimated 310 percent, to $7.34 million. See *Data Breach: The Cloud Multiplier Effect*, Jun. 4, 2014.

When confronted with an unknown technology, sometimes organizations are inclined to shut it down. That's because many of the tools IT has used to detect and remediate rogue technology are binary, so they allow organizations to say only "yes" or "no". The data loss prevention (DLP) solutions available in the market have similar shortcomings where they respond to attempts of unauthorized movement of data by completely blocking the movement when a policy requires doing so. In addition, existing DLP solutions lack user activity-based context and as a result flag too many false positives.

The technical solution disclosed herein solves the technical problem of data leaks and breaches. In particular, it allows organizations to use nearly all of the cloud services available in the market, and then selectively authorize certain activities to make the usage of those services acceptable to the organizations from a security and compliance standpoint. In particular, the solution identifies activities that pertain to transmission of sensitive data based on evaluating the content details (e.g. content-type, file, or object name) against one or more content profiles, according to one implementation. The content profiles (e.g. personally-identifiable information, payment card information, and electronic personal health information) include a combination of custom data identifiers and industry-standard data identifiers that provide context and activity aware detection of sensitive data.

The technology disclosed enforces, in real-time, granular policies based on the content profiles to prevent potential data leakage scenarios and allow continuous compliance. In another implementation, the cloud services can be retroactively evaluated against the content profiles for discovering sensitive data that may have already been transmitted. In some implementations, the enforcement is global and applies to all cloud services interfacing with the organization's network. In other implementations, the enforcement applies to individual cloud services or to a category of cloud services.

Also, it should be mentioned that another feature of implementations is a Cloud confidence Index™ (CCI) that assesses a cloud service's enterprise-readiness based on objective criteria, and assigns an overall score. In particular, CCI measures the enterprise readiness of cloud services by taking into various attributes of the cloud services. The following list of cloud service attribute is exemplary rather than exhaustive and includes: encryption policies, auditability and business continuity, disaster management policies, number of data centers, compliance certifications (e.g. SOC2) of the data centers, identity and access control, file sharing, data classification, audit and alert, data access logs preservation, password policy, forfeiture policies, published data recovery plan, and ability to proxy traffic for inspection and security controls.

Some implementations include assigning a score of 0-100 to each cloud service interfacing with an organization's network. Further, based on the assigned score, the cloud services are categorized into different cloud confidence levels such as excellent, high, medium, low, or poor.

Other implementations include CCI grouping the cloud services into a plurality of categories, including cloud storage, collaboration, finance and accounting, customer relationship management (CRM), human resources, and software development.

In one implementation, CCI can be used as a matching criteria in the real-time content policies, e.g.:
  Block the upload of personally-identifiable information to cloud storage services with a CCI score of "medium" or below.
  Don't let users share content in cloud storage services rated medium or low or poor. In another implementation, cloud services rated medium or below can be considered non enterprise-ready and risky.

In yet another implementation, organizations can customize CCI by adjusting the index's input weightings to match organization's requirements and criteria.

Some examples of monitoring and controlling enterprise data using granular polices defined based on content profiles include:
  Allow users in sales to share any public collateral while preventing them from downloading content deemed confidential from a cloud storage service to an unmanaged system.
  Alert IT if any user in investor relations shares content from a finance/accounting service with someone outside of the organization.
  Block any user located outside of the U.S. from downloading contacts from any CRM service.
  Only allow data uploads to services that have a CCI score of medium or above, and block uploads to the rest.
  Encrypt all content matching my confidential DLP profile in cloud services.
  Block download of any .exe file from a cloud storage service.
  Alert on the download of PII from any HR cloud service to a mobile device.

In another implementation, the technology disclosed tracks movement of the sensitive data across the cloud services by maintaining an audit trail of the transmitted content. For instance, let's say that in the course of performing analytics, an organization's IT uncovers suspicious activity. Analysts suspect that just days before leaving the organization for a competitor, an employee has exfiltrated data by downloading proprietary data from one of the company's cloud services and then uploading the file into a cloud storage service that he accessed with his personal login credentials. Using the technology disclosed, IT can construct a forensic audit trail showing every cloud service action for that user leading up to and immediately following the incident. This would enable IT not only to uncover suspicious behavior, but also to prove a breach occurred and clearly demonstrate malicious or criminal activity.

Upon detecting any event or deviation from a baseline, such as transmission of data deemed sensitive given a content profile, the technology disclosed can trigger a plurality of security actions, including block, alert, bypass, quarantine, coach, initiate a workflow to remediate, record, seek justification, report on the out-of-compliance event or activity, or content encryption. The type of the security action can be based on at least one of the type of the content policies, the content-level activity being performed, and the content-type. In other implementations, certain off-line inspections can be triggered as security actions, such as changing the ownership of sensitive data.

In particular, the technology disclosed provides a safe cloud adoption for their customers and business by protecting data in a fine-grained context, including user group, location, device, service or category, activity, and content. Unlike solutions for which encryption for the cloud services is an all-or-nothing proposition; the technology disclosed allows companies to narrow the aperture of data that needs protection so that they can target the real risks in their organizations without having to necessarily encrypt everything.

In one implementation, the technology disclosed uses AES 256-bit encryption for the enterprise data being uploaded to, downloaded from, or discovered within cloud services. In addition to having fine-grained contextual controls, a company can also enable encryption for content that matches the organization's data loss prevention (DLP) profile, including personally-identifiable information, electronic personal health information, payment card information, profanity, and even custom regular expressions defined by the organization.

The following is a sample list of some of the encryption-related use cases that can be implemented using the technology disclosed:

A bio-pharmaceutical company can enforce a policy that says any file containing electronic personal health information should be encrypted upon upload to any data and analysis cloud service.

An investment bank can enforce a policy that says any existing folder in a cloud service containing mergers and acquisitions (M&A) data based on the bank's custom regular expression profile should be encrypted, and can only be shared within a collaboration group.

An insurance company can enforce a policy that says any file being uploaded by an insurance adjuster from a mobile device into a cloud storage service should be encrypted.

Using the technology disclosed, an organization's IT can answer compliance-oriented questions based on the organization's business operations and regulations, including:

"Who from my call center in Bulgaria is accessing my CRM system, and what specifically are they doing?"

"Who from my Investor Relations group is sharing docs from our cloud storage app during the company's 'quiet period'?"

"Has any non-HR manager downloaded salary data in any cloud app in the past three months?"

"Is there any excessive downloading, uploading or sharing that could signal a data breach?"

In more exemplary implementations, the technology disclosed can allow the organizations to:

Enable the use of cloud services, but prevent sharing of data with people outside of the company.

Disallow file uploads to cloud storage services that contain highly sensitive data or intellectual property that, if ever leaked, stolen, or modified, could cause serious damage to the organization.

Allow people in the HR and finance groups worldwide to access HR or finance/accounting services, but block anyone outside of the U.S. from downloading salary information.

Encrypt sensitive content in context as its being uploaded or when it's already resident within cloud services.

Examples of systems, apparatus, and methods according to the disclosed implementations are described in an information technology context. In other instances, the technology disclosed can be applied to fraud detection, telecommunications systems, financial systems, security trading, banking, business intelligence, marketing, mining, energy, etc. Other services are possible, such that the following examples should not be taken as definitive or limiting either in scope, context, or setting.

The technology disclosed relates to actively enforcing multi-part policies on data-deficient transactions of independent data stores. The technology disclosed can be implemented in the context of any computer-implemented system including an on-demand database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™ and Yahoo! S4™.

Terminology

Independent Data Store: As used herein, a hosted service or a cloud service or a cloud application or a cloud storage provider or a cloud storage application or a cloud computing service (CCS) is referred to as an "independent data store", and vice-versa. Also as used herein, a cloud service, sometimes also referred to as a cloud computing service (CCS), or a hosted service or a cloud application refers to a network cloud service or application, web-based (e.g. accessed via a uniform resource locator (URL)) or native, such as sync clients. Examples include software as a service (SaaS) offerings, platform as a service (PaaS) offerings, and infrastructure as a service (IaaS) offerings, as well as internal enterprise applications that are exposed via URLs. Examples of common cloud services today include Salesforce.com™, Box™, Dropbox™, Google Apps™, Amazon AWS™, Microsoft Office 365™, Workday™, Oracle on Demand™, Taleo™, Yammer™, and Concur™. Cloud services provide functionality to users that is implemented in the cloud and that is the target of policies, e.g. logging in, editing documents, downloading bulk data, reading customer contact information, entering payables, deleting documents, in contrast to the offerings of a simple website and ecommerce sites. Note that some consumer facing websites, e.g. Facebook™ and Yammer™, which offer social networks are the type of cloud service considered here. Some services, e.g. Google's Gmail™ can be a hybrid with some free users using the application generally while other corporations use it as a cloud service. Note that implementations can support both web browser clients and application clients that use URL-based APIs. Thus, using Dropbox™ as an example, user activity on the Dropbox™ website, as well as activity of the Dropbox™ client on the computer could be monitored.

Policy: As used herein, the term "policy", sometimes also referred to as a policy definition or policy data or content policy refers to a machine-readable representation of flow control and content control requirements for cloud services. Typically, a policy is defined by one or more administrators at a corporation, or other entity, and is enforced upon users within that corporation, or entity. It is possible for individuals to define policies for their own usage that are enforced upon them; however, corporate usage is the more common case. It is also possible for a policy to be enforced on visitors or customers of a cloud service, e.g. where a corporation hosts a service and requires visiting customers to adhere to the policy for use. Of particular note is that the policies considered herein are capable of being sensitive to the semantics of a cloud application, which is to say a policy can differentiate between logging in to a cloud service from, say, editing documents on the cloud service.

Context is important for understanding usage; for an entity, the collection of dozens or hundreds of individual policies (e.g. log bulk downloads, prohibit editing documents on the service, only allow bulk downloads for users who are in the "Vice President" group) is referred to singularly as one policy, or one policy definition. Thus, a system supporting multiple entities will generally have one policy per entity, each made up of dozens or hundreds of individual flow control and content control policies. Similarly, as discussed infra, the policy that is transferred to individual computers can be a subset of a full corporate policy, e.g. solely a machine-readable representation of the URLs of interest, as opposed to the full policy specification for each URL describing the flow control and/or content manipulations.

Multi-Part Policy: As used herein, a "multi-part policy" is defined as a policy that specifies triggering of at least one security action when at least one condition about the transaction is met. In another implementation, a multi-part policy is defined as a policy that applies to a single transaction but at least one policy condition of the multi-part policy requires evaluation of data or metadata not available in the single transaction. In yet another implementation, a multi-part policy is defined as a policy that applies to a single transaction but at least one policy condition of the multi-part policy requires evaluation of data or metadata available in an external data or metadata store. In a further another implementation, a multi-part policy is defined as a policy that applies to a single transaction but at least one policy condition of the multi-part policy requires evaluation of data or metadata generated by an external engine. In another implementation, a multi-part policy is defined as a policy that applies in real-time during active analysis but at least one policy condition of the multi-part policy requires evaluation of data or metadata collected in deferred time or non-real-time inspection. Examples of multi-part policies includes "prevent user form uploading/downloading, if user is at risk as indicated by anomaly detection", "prevent sharing of a file, if file is sensitive", "prevent download of a file to a device, if the device is at risk as indicated by a malware detection engine", "prevent deletion of a virtual machine, if the virtual machine is a critical server", and others.

Data-Deficient Transaction: As used herein, a "data-deficient transaction" is defined as a data manipulation activity that causes manipulation of data and data objects by reference without including or providing the data, content, and/or the metadata necessary or required to enforce or apply a given policy or a multi-part policy. In one implementation, a data-deficient transaction is defined as a data manipulation activity that causes manipulation of data and data objects without including or providing the actual and/or the data or content in the given transaction or activity that is necessary or required to enforce or apply a given policy or a multi-part policy. In another implementation, a data-deficient transaction is defined as a data manipulation activity that causes manipulation of data and data objects by merely referencing the data objects. In yet another implementation, a data-deficient transaction is defined as a data manipulation activity that lacks sufficient data or metadata upon which a given policy or a multi-part policy can be completely applied or all the parameters or fields of the given policy or a multi-part policy can be matched against the parameters or fields of the data manipulation activity. Accordingly, data-deficient transactions or activities are devoid of certain content upon which content polices can be completely applied. Examples of data-deficient transactions include content sharing using a link to the content object, manipulation of a virtual machine (e.g., deletion, addition) using a virtual machine identifier, data manipulation activity (e.g., upload, download, share) by a user with unknown usage history, data manipulation activity (e.g., upload, download, share) via a device with unknown behavior history (e.g., an unmanaged device), and others.

Trust-Deficient Transaction: As used herein, a "trust-deficient transaction" is defined as a data manipulation activity that causes manipulation of data and data objects (e.g., sensitive data and sensitive data objects) while masking, morphing, concealing, or hiding a parameter or a field or metadata of the data manipulation activity and/or the data or the data objects which can be matched against the parameters or fields of a given policy or a multi-part policy. Accordingly, trust-deficient transactions are configured (e.g., under a malicious scheme) to bypass a given policy or a multi-party policy by masking, morphing, concealing, or hiding an attribute or property of the data and data objects being manipulated by the trust-deficient transactions.

Examples of masking, morphing, concealing, or hiding include renaming the data objects, changing the file type of the data objects, changing the file extension of the data objects, encrypting the data objects, compressing the data objects, indexing the data objects, and modifying a file identifier (ID) of the data objects (e.g., a file name, a file type, a file extension, and other file attributes and metadata such as archive, hidden, system, read-only). Examples of trust-deficient transactions include data manipulation activities like uploading content, downloading content, modifying content, where the data, the data objects, and the content therein are available for analysis by a policy-enforcing server (e.g., an active proxy analyzer). In some implementations, trust-deficient transactions are considered data-deficient transactions, and vice-versa.

Unmanaged Device:

As used herein, an "unmanaged device" is referred to as a Bring Your Owen Device (BYOD) and/or an off-network device whose traffic is not being tunneled through a policy-enforcing server (e.g., an active proxy analyzer).

Proxy-Bypassing Transactions:

As used herein, data-deficient transactions and trust-deficient transactions initiated by unmanaged devices are referred to as "proxy-bypassing data-deficient transactions" and "proxy-bypassing trust-deficient transactions", respectively.

Application Programming Interface:

As used herein, an "application programming interface (API)" is defined as a packaged collection of code libraries, routines, protocols methods and fields that belong to a set of classes, including its interface types. The API defines the way that developers and programmers can use the classes for their own software development, just by importing the relevant classes and writing statements that instantiate the classes and call their methods and fields. In another implementation, an API is a source code based specification intended to be used as an interface by software components to communicate with each other. An API can include specifications for routines, data structures, object classes and variables. Basically, an API provides an interface for developers and programmers to access the underlying platform capabilities and features of online social networks. Implementations of the technology disclosed include different types of APIs, including web service APIs such as HTTP or HTTPs based APIs like SOAP, Bulk, XML-RPC and JSON-RPC and REST APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs (objet orientation) like Java API and Android API (e.g., Google Maps™ Android API, MSDN Class Library for .NET Framework, Twilio™ APIs for Java and C#), OS functions and routines like access to file system and access to user interface, object remoting APIs like CORBA and .NET Remoting and hardware APIs like video acceleration, hard disk drives and PCI buses. Other examples of APIs used by the technology disclosed include Box Content API™, Microsoft Graph™, Dropbox API™, Dropbox API v2™, Dropbox Core API™, Dropbox Core API v2™, Facebook Graph API™, Foursquare API™, Geonames API™, Force.com API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, aggregated-single API like CloudRail™ API, and others.

Mobile and Tablet vs. Computer:

Portions of the specification may make distinctions between two types of client devices used by users to access cloud services. The primary distinction is between the mechanisms for coupling the client device to the network security system. In relation to client devices, the term "computer" will refer to more open systems where the network security system can more directly install software and modify the networking stack. Similarly, in relation to client devices, the terms "mobile" or "tablet" will refer to more closed systems where the network security system options for modifying the network stack are more limited. This terminology mirrors the situation today where computer-client devices running Mac OS X, Windows desktop versions, Android, and/or Linux can be more easily modified than mobile or tablet devices running iOS, and/or Windows Mobile. Thus, the terminology refers to how third-party operating system vendor limitations are addressed to provide access to the network security system as opposed to a fundamental technical difference between the types of client devices. Further, if mobile OS vendors open their systems further, it is likely that the distinction could be eliminated with more classes of client devices using the implementation described in the computer-client discussions. Additionally, it can be the case that certain server computers and other computing devices within an organization can have the client installed to cover machine-to-machine communications.

A closely related point is that some clients interface with the network security system differently. The browser add-on clients, for example, redirect the browsers to an explicit proxy. Only the traffic needed to apply the policy to is rerouted and it is done so within the application. The traffic arriving at the network security system can have the user identity embedded in the data or within the secure tunnel headers, e.g. additional headers or SSL client side certificates in some implementations. Other clients redirect select network traffic through transparent proxies. For these connections, some traffic beyond exactly those requests needed by the policy can be routed to the network security system. Further, the user identity information is generally not within the data itself, but rather established by the client in setting up a secure tunnel to the network security system.

User Identity:

User identity, or user identification, in the context of this specification refers to an indicator that is provided by the network security system to the client device. It can be in the form of a token, a unique identifier such as a UUID, a public-key certificate, or the like. In some implementations, the user identity can be linked to a specific user and a specific device; thus, the same individual can have a different user identity on their mobile phone vs. their computer. The user identity can be linked to an entry or userid corporate identity directory, but is distinct from it. In one implementation, a cryptographic certificate signed by the network security is used as the user identity. In other implementations, the user identity can be solely unique to the user and be identical across devices.

Encryption Key:

An encryption key or a key, as used herein, refers to a code or number which, when taken together with an encryption algorithm, defines a unique transformation used to encrypt or decrypt data.

Identification:

As used herein, the "identification" of an item of information does not necessarily require the direct specification of that item of information. Information can be "identified"

in a field by simply referring to the actual information through one or more layers of indirection, or by identifying one or more items of different information which are together sufficient to determine the actual item of information. In addition, the term "specify" is used herein to mean the same as "identify".

Based on and Responsive:

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" or "dependent on" the predecessor signal, event or value. "Responsiveness" of a given signal, event or value upon another signal, event or value is defined similarly.

System Overview

We describe a system and various implementations for providing security for network delivered services. The system and processes will be described with reference to FIG. 1A showing an architectural level schematic of a system in accordance with an implementation. Because FIG. 1A is an architectural diagram, certain details are intentionally omitted to improve the clarity of the description. The discussion of FIG. 1A will be organized as follows. First, the elements of the figure will be described, followed by their interconnections. Then, the use of the elements in the system will be described in greater detail.

FIG. 1A includes the system 100A. The system 100A includes network security system 120, the management clients 131, the cloud services 140, the client devices 150, and network 160. The network security system 120 includes the active analyzer 192, inspective analyzer 194, monitor 121, and storage 122. The storage 122 stores, among other things, content policies 181, content profiles 182, content inspection rules 183, enterprise data 184, clients 185, and user identities 186. In some implementations, storage 122 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Enterprise data 184 can include organizational data, including but not limited to, intellectual property, non-public financials, strategic plans, customer lists, personally identifiable information belonging to customers or employees, patient health data, source code, trade secrets, booking information, partner contracts, corporate plans, M&A documents, and other confidential data. In particular, the term "enterprise data" refers to a document, a file, a folder, a webpage, a collection of webpages, an image, or any other text-based document. See the discussion of FIGS. 5-6 for additional items that are typically included in the storage 122.

The network security system 120 can be viewed as providing several functionalities 125; key among them are an active analyzer 192, inspective analyzer 194, extraction engine 126, classification engine 127, security engine 128, management plane 129, and a data plane 130. The management clients 131 include tablet 132 and mobile 134. The cloud services 140 include the cloud service 142 and the cloud service 144. The client devices 150 include the mobile 152 and the computer 154. The mobile 152 includes an AppWrapper 157 and a VPN on demand 158. The computer 154 includes a client 155 that in turn includes the user identity 156 and a policy 159.

The interconnection of the elements of system 100A will now be described. The network 160 couples the tablet 132, the mobile 134, the mobile 152, the computer 154, the cloud service 142, the cloud service 144, and the network security system 120 in communication (indicated by solid lines). The actual communication path can be point-to-point over public and/or private networks. Some items, such as AppWrapper 157, might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Monitor 121 and storage 122 can include one or more computers and computer systems coupled in communication with one another. They can also be one or more virtual computing and/or storage resources. For example, monitor 121 can be one or more Amazon EC2 instances and storage 122 can be an Amazon S3™ storage. Other computing-as-service platforms such as Force.com from Salesforce, Rackspace, or Heroku could be used rather than implementing network security system 120 on direct physical computers or traditional virtual machines. Additionally, to implement the functionalities 125 one or more engines can be used and one or more points of presence (POPs) can be established. The engines can be of varying types including a workstation, server, computing cluster, blade server, server farm, or any other data processing system or computing device. The engine can be communicably coupled to the databases via a different network connection. For example, the extraction engine 126 can be coupled via the network(s) 160 (e.g., the Internet), classification engine 127 can be coupled via a direct network link and security engine 128 can be coupled by yet a different network connection. In other examples, the data plane 130 POPs can be distributed geographically and/or co-hosted with particular cloud services. Similarly, the management plane 129 POPs can be distributed geographically. The two types of POPs can be either separately hosted or co-hosted as well.

Having described the elements of FIG. 1A and their interconnections, elements of the figure will now be described in greater detail. The network security system 120 provides a variety of functionalities 125 via a management plane 129 and a data plane 130. Data plane 130 includes an extraction engine 126, a classification engine 127, and a security engine 128, according to one implementation. Other functionalities, e.g. control plane, can also be provided. These functionalities 125 collectively provide secure interfacing with the cloud services 140 by client devices 150. Although we use the term network security system to describe network security system 120, more generally the system provides application visibility and control functions as well as security.

The management clients 131 according to one implementation are computing devices with a web browser with a secure, web-delivered interface provided by the network security system 120 to define and administer content policies 181. The network security system 120 according to some implementations is a multi-tenant system, so a user of a management client can only change content policies 181 associated with her organization. In some implementations, APIs can be provided for programmatically defining and or updating policies. In such implementations, the management clients 131 can include one or more servers, e.g. a corporate identities directory such as a Microsoft Active Directory, pushing updates, and/or responding to pull requests for updates to the content policies 181. Both systems can co-exist; for example, some companies may use a corporate identities directory to automate identification of users within the organization while using a web interface for tailoring policies to their needs. Management clients are assigned roles and access to the network security system 120 data is controlled based on roles, e.g. read-only vs. read-write.

A general view of how the network security system 120 functions has been provided. Companies, or more generally any individual or entity, wishing to better secure their use of network cloud services sign up with the network security system 120. Using a web-based interface and a computer device, the company can establish a policy in content policies 181 for their users. For each activity that involves manipulation of content, one or more content inspection rules are applied to the content by the network security system 120. If it is determined that the content is subject to content control i.e. it is sensitive data, then one or more security actions are triggered to prevent leakage or breach of sensitive data enclosed in the content. These approaches will both be discussed now in greater detail.

While system 100A is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

System Architecture

Figure 1B:
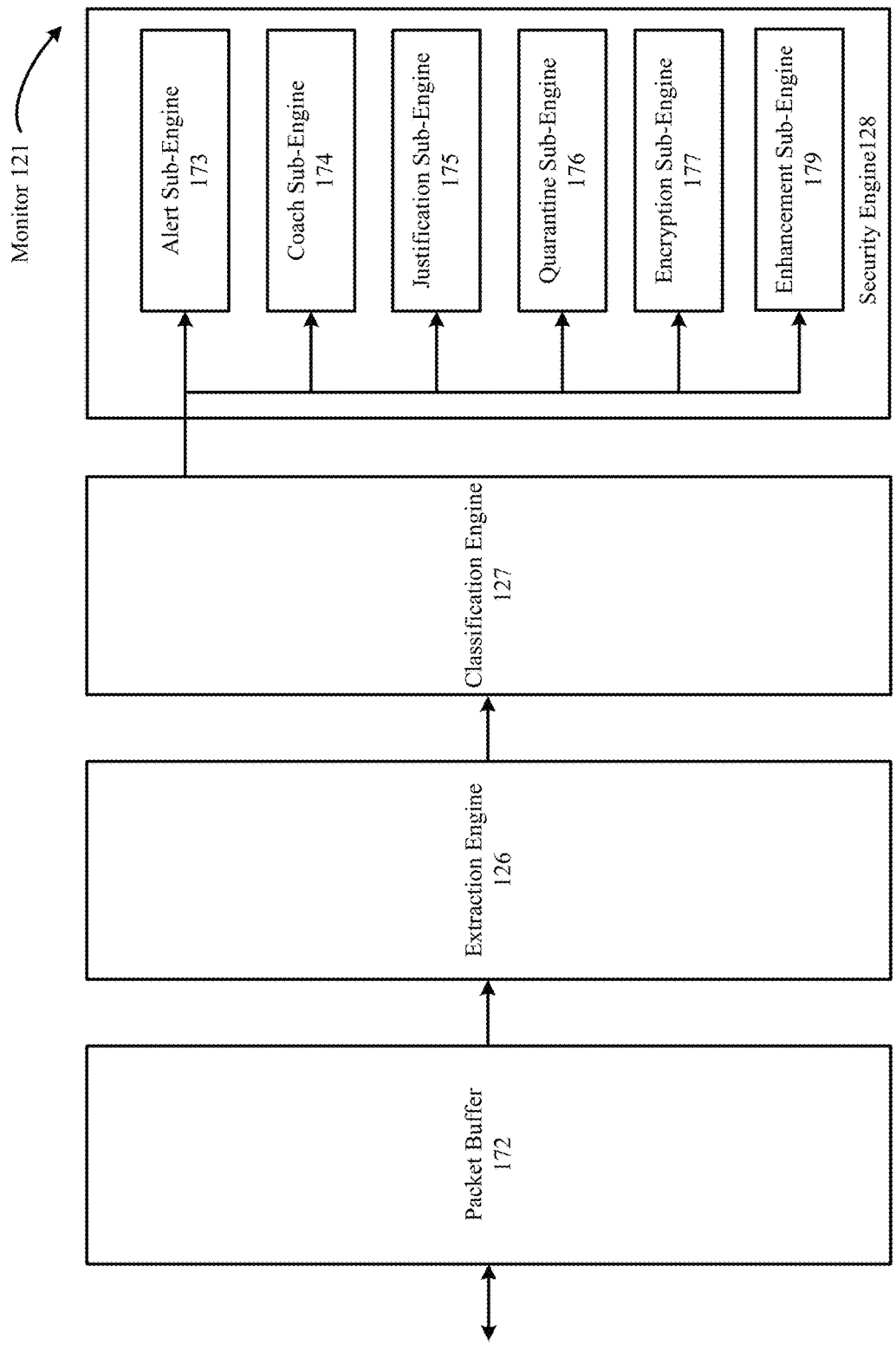
FIG. 1B illustrates a block diagram of a cross-application monitor in one implementation of the technology disclosed, showing in detail an extraction engine, a classification engine and a security engine.
Figure 1C:
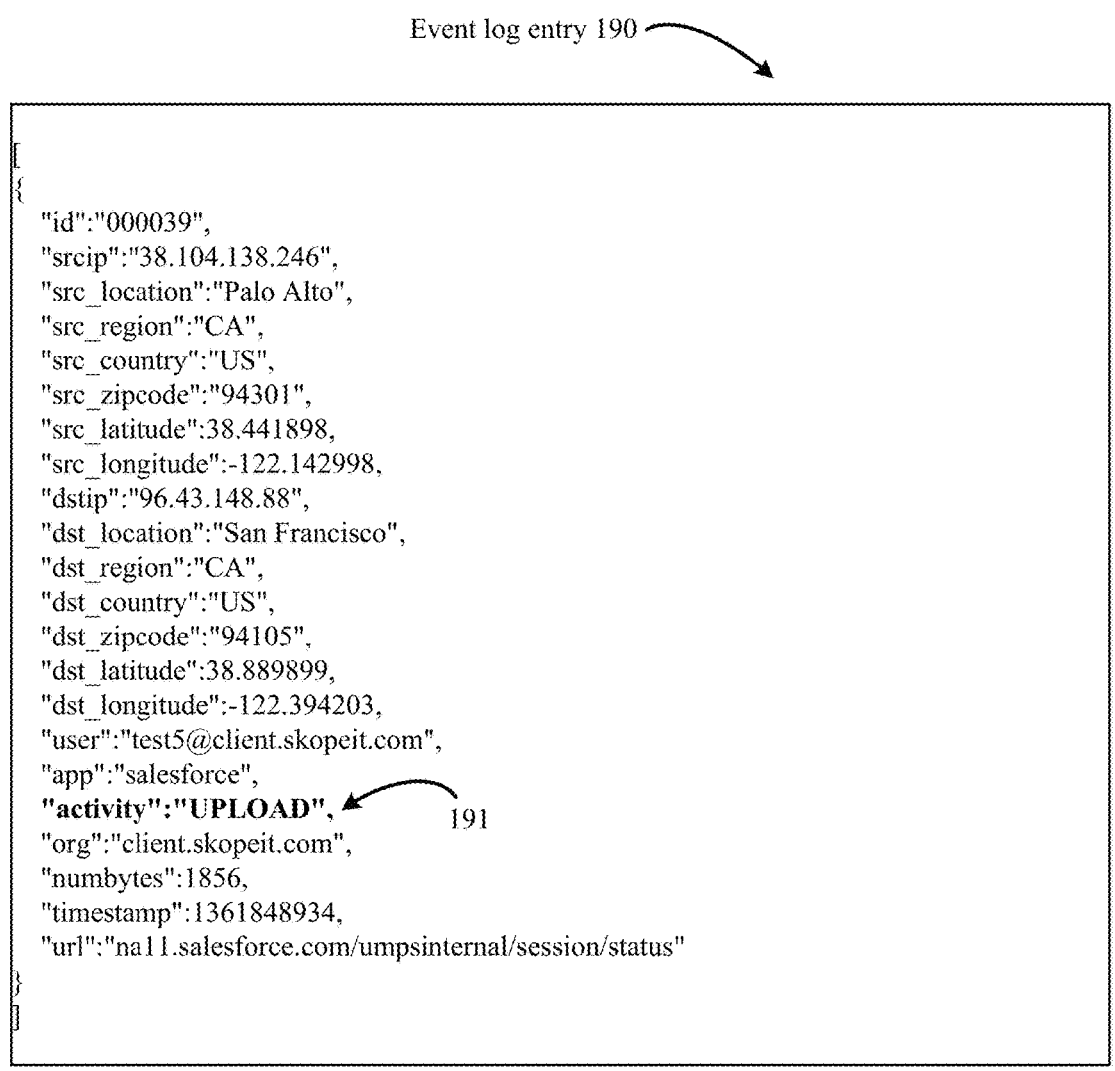
FIG. 1C is an exemplary event log entry that identifies content-level activity being performed via an API of a cloud service.

Having discussed the functionality, the implementation architecture used by one implementation will be discussed in connection with FIGS. 1B and 1C. As discussed, supra, the functionalities 125 of the network security system 120 divide into different groups: active analyzer 192, inspective analyzer 194, extraction engine 126, classification engine 127, security engine 128, etc. Additionally, a control plane may be used along with or instead of management plane 129 and data plane 130. The specific division of functionality between these groups is an implementation choice. Similarly, the functionality can be highly distributed across a number of points of presence (POPs) to improve locality, performance, and/or security. For example, either component of the network security system 120 can be co-located with cloud services or with corporate networks.

Inspective analyzer 194 leverages API connections to inspect content that is already resident in the cloud services 140, irrespective of when the content was uploaded or when it was created. In particular, each of the cloud services 140 are communicably interfaced with network 160 via their respective APIs through which content from the respective cloud services 140 and metadata about the content is observed, listened to, monitored, tracked, collected, aggregated, assembled, retrieved, etc. Such content is, for example, files, folders, documents, images, and videos and content metadata is, for example, file or folder level details like who the file or folder owner is, which cloud application is hosting the file or folder and additional detail such as which DLP policies have been triggered on the file or folder, when was the file or folder created, posted, edited, modified, an audit trail of user activity, version history, file type, and others. In other implementations, the collected content metadata provides details on file exposure, including whether files are private, shared internally, shared externally with specific people or shared publicly via a link. In yet other implementations, inspective analyzer 194 discovers content against set DLP policies, inventories and classifies content, content owners, and collaborators as well as provides content sharing status (private, shared or public). Additionally, it enables users to download files for review, and perform a variety of security actions such as restrict access, revoke sharing, encrypt content, quarantine content for review, notify content owners, and place content on legal hold.

In one implementation, inspective analyzer 194 includes a data aggregator (omitted to improve clarity). Data aggregator includes listener capable of listening to streams and data flows originating at the cloud services 140 by connecting with their respective APIs via the public Internet. In some implementations, listener includes heterogeneous instances responsible for the intake of content and content metadata from different cloud services 140. Listener listens for both structured data, such as values and keywords returned from the APIs, and also listens for unstructured data, such as text in logs and so forth. In some implementations, listener includes a miner for performing a pull from the APIs and a crawler for other cloud services which do not expose a public API. In one implementation, to consume data from APIs, listener provides a push API with a valid endpoint. This endpoint can take the form of an HTTP/HTTPS server, a UDP socket, or a message queue listener (e.g., Apache Kafka™, RabbitMQ™, ActiveMQ™, and others). The listener can also throttle messages as necessary to ensure none are dropped.

According to an implementation, inspective analyzer 194 includes a handler component (omitted to improve clarity) that is configured to receive the content and content metadata over the network 160 and an application protocol layer, or other higher protocol layer, such as HTTP protocol layer, among many possible standard and proprietary protocol layers. These higher protocol layers can encode, package and/or reformat data for sending and receiving messages over a network layer, such as Internet Protocol (IP), and/or a transport layer, such as Transmission Control Protocol (TCP) and/or User Datagram Protocol (UDP).

In some implementations, the gathered content metadata is processed and/or normalized. In some instances, metadata includes structured data and functionality targets specific data constructs provided by the cloud services 140. Non-structured data, such as free text, can also be provided by, and targeted back to, the cloud services 140. Both structured and non-structured data are capable of being aggregated by the inspective analyzer 194. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 196 like Apache Cassandra™ 198, Google's BigTable™, HBase™, Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation shown in system 100A, as content metadata are aggregated, they are stored in a NoSQL key-value column store distributed storage system 196 such as Cassandra™ 198. Metadata sent to Cassandra™ 198 is spread out across many nodes or commodity servers C1-C3, connections to which can be made using a Java, Scala, Ruby, Clojure or Python based APIs (e.g., Hector, Pelops, CQL, Thrift, Phpcassa, PyCassa, etc.). Cassandra™ 198 stores metadata in units called columns. Each column is a tuple, a list of associated data elements. The basic column format can be represented as (name, value, timestamp). For brevity, the timestamp, while an essential element of the column, is often not written. Thus, an example column may be written (UserName, User—1). An optional level of hierarchy called a super column incorporates any number of columns. Moving up a level, keys (sometimes referred to as rows) are tuples consisting of a name and one or more columns or super columns. An example key is written as (Status_Key, (UserName, User—1), (Logged_In, Y). Any number of keys is grouped into a column family. Analogously, a group of column families is referred to as the keyspace, the final level of hierarchy. Two pseudocode representations of the relationship are constructed as follows:

- [keyspace] [column family] [key] [column]
- [keyspace] [column family] [key] [super column] [column]

A more detailed description of distributed key-value storage systems is found in the following papers: Cassandra—A Decentralized Structured Storage System, Avinash Lakshman and Prashant Malik, 2009; Dynamo: Amazon's Highly Available Key-value Store, Giuseppe DeCandia, Deniz Hastorun, Madan Jampani, Gunavardhan Kakulapati, Avinash Lakshman, Alex Pilchin, Swaminathan Sivasubramanian, Peter Vosshall, and Werner Vogels, SOSP '07, Oct. 14-17, 2008; and Bigtable: A Distributed Storage System for Structured Data, Fay Chang, Jeffrey Dean, Sanjay Ghemawat, Wilson C. Hsieh, Deporah A. Wallach, Mike Burrows, Tushar Chandra, Andrew Fikes, and Robert E. Gruber, Operating Systems Design and Implementation (OSDI), 2006; all of which are incorporated by reference herein.

In other implementations, content metadata are stored in a Hadoop distributed file system (HDFS) like Hadoop cluster 199.

In an implementation, inspective analyzer 194 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parting or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by inspective analyzer 194 are not homogenous (e.g., there are many different sources in many different formats), certain implementations employ at least one metadata parser per cloud service, and in some cases more than one.

In other implementations, inspective analyzer 194 uses monitor 121 to inspect the cloud services and assemble content metadata.

Active analyzer 192 enforces policies in real-time on sensitive content using monitor 121 when the sensitive content traverses the network 160 inline. Monitor 121 performs content inspection (CI) on the cloud services transactions and traffic via the application programming interfaces (APIs) by identifying each of the cloud services interfacing with an organization's network. Monitor 121 can specify data packets (stored in packet buffer 172) to be inspected and content inspection rules to be applied to the data packets. In one implementation, monitor 121 can use CI to find application layer objects, SIP packets, verify media (e.g. real-time transport protocol (RTP) media) of the media packets, and otherwise inspect the packets sent through the network 160. Packets can be inspected for any suitable feature, including, packet signature, bandwidth used by packets, compression protocol, content, or other suitable features. In other implementations, CI is performed for packets in the flow of packets for a specific client 155 over the network 160 including looking at the packet headers along with the packet's payload.

Monitor 121 can employ different techniques to perform CI. In one implementation, it can use pattern matching that includes scanning for strings or generic bit and byte patterns anywhere in the packets. In another implementation, it can use behavioral analysis which includes scanning for patterns in the communication behavior of a cloud service, including absolute and relative packet sizes, per-flow data and packet rates, number of flows and new flow rate per cloud service. In yet another implementation, it can use statistical analysis that includes the calculation of statistical indicators that identify transmission types (e.g. media files, instant messages, or content transfer), including mean, median, and variation of values collected as part of the behavioral analysis.

In addition to CI, monitor 121 also performs shallow packet inspection that tracks network connections or flows by grouping all packets with a 5-tuple (source IP, destination IP, source port, destination port, and layer-4 protocol).

Following this, the extraction engine 126 extracts content and content metadata or object metadata from the packets stored in packet buffer 172 by parsing the traffic packets at multiple levels, including such as the physical, data link, or network layers. In particular, the extraction engine 126 can extract text and information representation from the content (e.g. a feature structure), grammatical/semantic information from the content (e.g. a parse tree that identifies watermarks in documents), or metadata about the content (e.g. in-content headers/footers, author, last modified time data, and other suitable metadata types).

In one implementation, extraction engine 126 uses parsing functions on upper-layer protocols, including FTP, SMTP, IMF, HTTP, SMB, and the like. It can also use a rich language of variable length text and/or binary phrases, such as regular expressions, to extract the application layer objects from the protocol data stream.

In other implementations, extraction engine 126 extracts complex object metadata from the content that identifies structure of the content. For example, it can identify key field a message, such as "TO" and "FROM" fields of an e-mail. Other non-exhaustive examples of complex object metadata include file or folder level details like who the file or folder owner is, which cloud application is hosting the file or folder and additional detail such as which DLP policies have been triggered on the file or folder, when was the file or folder created, posted, edited, modified, an audit trail of user activity, version history, file type, and others. In other implementations, the collected content metadata provides details on file exposure, including whether files are private, shared internally, shared externally with specific people or shared publicly via a link, IP addresses, e-mail addresses, recipient addresses, sender addresses, time of the e-mails, web-URLs, contact lists, instant message IP addresses, chat aliases, VOIP addresses, logins, sender and receiver of instant messages, a file name sent in an instant message or an e-mail, a number of files transferred in the web-communication, a type of instant message text, a name of an audio and/or video attachment sent in the web-communication, a number of parties involved in a web-communication, a time of a social networking post, a size of a social networking post, a number of followers, likes, user, user groups, cloud service, cloud service groups, time of day, day of week, geo-location, bandwidth usage, latency observed, criticality data, anomalous behavior data, malicious behavior data, and others.

After the object metadata is extracted, it is organized into data sets and stored as lists, tuples, dictionaries, tables, and/or sets in metadata store 196, according to one implementation.

The classification engine 127 can then issue commands (e.g. SQL statements, BNF statements) to the database to retrieve and view the data. Additional programs and command can be executed to derive relationships between the data elements in the tables of the relational database. Supplementary data contained in other tables in the relational database can be combined with the extracted content, according to one implementation.

Classification engine 127 evaluates the extracted content and content metadata according to the applicable content policies 181, content profiles 182, and content inspection rules 183. In one implementation, a packet can match a content inspection rule if the characteristics of the packet satisfy conditions of the content inspection rule and qualify as content subject to content control. In particular, classification engine 127 compares the extracted content with the arguments defined in the applicable standard search pattern or the custom search pattern (as discussed infra) by using a plurality of similarity measures.

The following discussion outlines some examples of the similarity measures used by the classification engine 127 to determine whether strings in extracted content match one of the applicable content inspection rules. One example of a similarity measure is unigram overlap. The baseline unigram approach considers two strings to be similar if they have higher Jaccard similarity than a threshold. The Jaccard coefficient between the unigrams is used to measure the similarity of the pair of strings. In some implementations, Jaccard similarity between two strings can be conditional upon the presence of certain essential tokens. In another implementation, an edit distance technique can be used to determine the similarity between strings. The edit distance between two strings is considered, that is, two strings are a match if the number of edits to transform one string into the other is less than some threshold value. In some implementations, a Levenshtein distance can be used as a metric for measuring the amount of difference between two strings. The distance is the minimum number of edits required in order to transform one string into the other.

In other implementations, different similarity measures can be used to determine similarity such as Euclidean distance, Cosine similarity, Tanimoto coefficient, Dice coefficient, Hamming distance, Needleman-Wunch distance or Sellers Algorithm, Smith-Waterman distance, Gotoh Distance or Smith-Waterman-Gotoh distance, Block distance or L1 distance or City block distance, Monge Elkan distance, Jaro distance metric Jaro Winkler, SoundEx distance metric, Matching Coefficient, Dice Coefficient, Overlap Coefficient, Variational distance, Hellinger distance or Bhattacharyya distance, Information Radius (Jensen-Shannon divergence) Harmonic Mean, Skew divergence, Confusion Probability, Tau, Fellegi and Sunters (SFS) metric, FastA, BlastP, Maximal matches, q-gram, Ukkonen Algorithms and Soergel distance.

Security engine 128 accesses content policies 181 to identify security actions to be performed. In some implementations, the security engine 128 includes a plurality of sub-engines such as alert sub-engine 173, coach sub-engine 174, justification sub-engine 175, quarantine sub-engine 176, and encryption sub-engine 177. Upon detecting content that is subject to content control, one or more of the security sub-engines are invoked based on the rules defined in the content policies 181, the content-level activity being performed, and the content-type. Other implementations can include different or more sub-engines (as represented by the three vertical dots in FIG. 1B), such a block sub-engine, a bypass sub-engine, and a remediate sub-engine.

The alert sub-engine 173 sends out notifications to network administrators upon detection of potential breach or leakage of sensitive data. The coach sub-engine 174 educates the users performing the content-level activity about more secure alternative cloud services pre-sanctioned by the users' organization. The justification sub-engine 175 seeks justification from the users performing the content-level activity regarding why their particular transaction (e.g. uploading a spreadsheet) via a cloud service should be permitted. The quarantine sub-engine 176 temporarily holds the transmitted data in a quarantine folder at the cloud service pending a quarantine approver's ratification or rejection. Based on the quarantine approver's decision, the content is either transmitted to the cloud service or not. The encryption sub-engine 177 performs document specific encryption of the content by deriving a per-document key from a combination of a triplet-key using a hash key derivation function (HKDF). The enhancement sub-engine 179 performs at least one of set-up authentication, multi-factor authentication, and re-authentication. In one example of re-authentication, a user or device identified as a compromised user or device based on detection of anomalous activity on an application or cloud service, the user or device is logged out of the application session and the user or device is required to re-login to initialize a new application session.

While monitor 121 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Deep API Inspection (DAPII)

The cloud service detection and content-based function or activity identification provided by the network security system 120 will be described by focusing on application layer traffic.

The technology disclosed uses an algorithm-based traffic analysis that discovers cloud services interfacing with an organization's network by deep inspecting services transactions in real-time, including calls made to the services. The technology disclosed uses connectors or standardized integrations to interpret the transactions between client 155 and cloud services 140. The transactions are decomposed to identify the activity being performed and its associated parameters. The transactions are represented as JSON files, which include a structure and format that allows the monitor 121 to both interpret what actions a user is performing in the cloud service as it is happening. So, for example, the monitor 121 can detect for an organization that "Joe from Investment Banking, currently in Japan, shared his M&A directory with an investor at a hedge fund at 10 PM".

A typical user interaction with a cloud service like Salesforce.com consists of a sequence of events that occur in the context of a session. The main events of note are: (a) login—provide user credentials to cloud service to authenticate the user; (b) application transactions—execute a set of application level transactions, e.g. upload meeting notes, add leads, or define new campaigns; and (c) log-out—this event terminates the session with the server. In this context an application session connects these interactions for the network security system. Deep API inspection logic can identify these events and link policy evaluations to each transaction boundary enabling actions to be taken. Most commonly, the application session is identified by a session cookie in the HTTP header. The network security system 120 can use the session cookie to define the session or alternately use a tuple that includes user id, user IP address, application instance id, device, operating system and browser/native application to define the session.

Data Mining of Event Store and Anomaly Detection

The network security system generates logging information, e.g. raw event data, with information gleaned from every cloud application transaction passing through the system. FIG. 1C is an exemplary event log entry including event log entry 190 in a JSON-style representation. Event log entry 190 is not exhaustive of the fields that are logged, but rather highlights key fields.

Additionally, event logs from external sources can also be provided to the network security system 120. Mining of the event data can thus accomplish several key tasks:

Identify content-based functions and activities 191 such as creating content, uploading content, posting content, and editing content.

Identify non-content-based functions and activities such as inviting users to access content, share content, and view content.

Establish a baseline usage behavior based on criteria such as: user, user groups, cloud service, cloud service groups, time of day, day of week, geo-location, bandwidth usage, and latency observed. Note the usage behaviors can be tracked per company using the system and/or across companies.

Once the baseline usage behavior is established, anomalous activities are those that do not fit the observed baseline and could be flagged for administrators to review and take action. Example anomalous activities include: user accesses from a geo-locations and/or times that do not fit the baseline and bandwidth usage by a user being very high, e.g. over two standard deviations compared to measured baseline. Notably, the rules are sensitive to roles, e.g. a user in a custom-defined sales group may be afforded greater latitude to be in a non-standard geo-location than an employee outside that group. In some implementations, some anomalous activities may also be conditions to policies that companies define specific actions, e.g. block for excessive transfer anomaly condition until an administrator approves it.

According to one implementation, the raw event data is stored in metadata store 196 analyzed using machine-learning techniques to establish the baseline. Both supervised (rules based) and unsupervised (clustering) methods can be employed. The baseline data and anomalies can be presented in a human manageable format through the management interface. For example access patterns based on geo-location could be presented using a map interface with points representing users and cloud services and connective arcs showing the usage. According to another implementation, there is an API available to mine the raw data. This API can be used by partners to build value added applications using the data collected by the system. Notably, the anomalies can be tracked across multiple cloud services. For example, a download of data from one service followed by an upload to a second could be an anomaly policy that is automatically detected. Other cross service policies having to do with data integrity and security can similarly be established with suitable conditions.

Content Monitoring

The technology disclosed applies content inspection rules to find strings and interrelated strings in enterprise data that are subject to content control. The content inspection rules include at least one multi-part string search pattern that matches two or more non-contiguous strings that collectively identify content that is subject to content control. Strings can be a sequence of any data type, including text, characters, numerical, alphanumerical, Boolean expressions, etc. In one implementation, interrelated and non-contiguous strings can be explained in the context of proprietary financial data such as credit card information. Typical credit card information almost always includes a first and last name, a credit card number, and an expiry data. When these strings are detected in close proximity to each other, such as in the same data chunk, same document, or same sentence, then they are determined to constitute valid credit card information.

Content Inspection Rules

An organization can comply with a regulation such as Payment Card Information (PCI) by defining a multi-part string search pattern that looks for credit card strings within a certain semantic proximity threshold. An example multi-part string search pattern is shown below:

```
CreditCard_Rule :=
              {{Person/first_name, last_name}}NEAR(100)
              {{Number/CC}}
              /* look for first names and last names and credit
                 card numbers within five words of each other */
```

Standard Search Pattern

In some implementations, at least one subpart of the multi-part string search pattern is a standard pattern pre-defined by a data classification library. The standard search patterns serve as regular expressions that can be used to detect the presence of different content-types. When parameter values match the regular expressions, the classification engine 127 detects the particular content-type. Examples of standard patterns include Payment Card Industry information (PCI), Personally-Identifiable Information (PII), Electronic Protected Health Information (ePHI), Health Insurance Portability and Accountability Act (HIPAA), and Profanity. In one example, HIPAA is a U.S. law that applies to healthcare entities and governs the use, disclosure, and safeguarding of protected health information (PHI). In addition, HIPAA imposes requirements on covered organizations to sign agreements with their vendors that have access to PHI. In this example, a healthcare company can detect a PHI violation by creating a content profile using a predefined dictionary that includes different PHI related classifiers such as patient's name, social security number, Medicare ID, etc.

In other implementations, a plurality of pre-defined data identifiers can be used to detect specific data types. In one implementation, count thresholds can be associated with each of the data identifiers such that as if a document or dunk chunk includes matching data, given a data identifier, more than a count threshold, then the document or the dunk chunk can be identified as including sensitive data. The following list of pre-defined data identifiers is exemplary rather than exhaustive and includes: telephone numbers, SSN, SWIFT codes, VIN numbers.

Custom Search Pattern

At least one subpart of the multi-part string search pattern is a custom pattern tailored to a particular customer need. Organizations can use pattern matching, keyword search, and regular expressions (regex) to create a custom pattern that is tailored to their specific needs. For example, a document with the keyword "Netskope Confidential" can be identified as sensitive data.

In some implementations, regular expressions can be used to define custom patterns that detect specific sensitive data type. When parameter values match the regular expressions, the classification engine 127 detects the particular sensitive data.

A sample set of regular expressions operators and the pattern the operator matches according to one implementation includes the following:

| Operator | Matched Pattern |
| --- | --- |
| \ | Quote the next metacharacter. |
| ^ | Match the beginning of a line. |
| $ | Match the end of a line. |
| . | Match any character (except newline). |
| \| | Alternation. |
| ( ) | Used for grouping to force operator precedence. |
| [xy] | Character x or y. |

| Operator | Matched Pattern |
| --- | --- |
| [x-z] | The range of characters between x and z. |
| [^z] | Any character except z. |

The following table shows a sample set of regular expressions quantifiers and the pattern the quantifier matches:

| Operator | Matched Pattern |
| --- | --- |
| * | Match 0 or more times. |
| + | Match 1 or more times. |
| ? | Match 0 or 1 time. |
| {n} | Match exactly n times. |
| {n,} | Match at least n times. |
| {n, m} | Match at least n times, but no more than m times. |

A sample set of regular expressions metacharacters and the pattern the metacharacter matches according to one implementation includes the following:

| Operator | Matched Pattern |
| --- | --- |
| \t | Match tab. |
| \n | Match newline. |
| \r | Match return. |
| \f | Match form feed. |
| \a | Match alarm (bell, beep, etc.). |
| \e | Match escape. |
| \v | Match vertical tab. |
| \021 | Match octal character (e.g. 21 octal). |
| \xF0 | Match hex character (e.g. F0 hex). |
| \x{263a} | Match wide hex character (Unicode). |
| \w | Match word character (alphanumerical plus '_'). |
| \W | Match non-word character. |
| \s | Match whitespace character. This metacharacter also includes \n and \r. |
| \S | Match non-whitespace character. |
| \d | Match digit character. |
| \D | Match non-digit character. |
| \b | Match word boundary. |
| \B | Match non-word boundary. |
| \A | Match start of string (never match at line breaks). |
| \Z | Match end of string. Never match at line breaks; only match at the end of the final buffer of text submitted for matching. |

The following example shows regular expressions based custom multi-part string search pattern that detects sixteen digit credit card number:

\{4}-?\d{4}-?\d{4}-?d\{4}

\d—Checks for digit character.

{4}—Match exactly n times. It validates that there are exactly four digits.

-?—This would validate that the digits are occasionally separated by a hyphen (-). "?" indicates 0 or 1 times.

This simple regex validates that a sixteen digit number occasionally separated by "-" is detected.

Example matches—This regex would match 1234-5678-9123-4567 or 1234567891234567.

Source Code Detection

In other implementations, the custom multi-part string search pattern can detect source code, such as C++ input/output statements, C++ comments, Java parsing command-line arguments, Python print commands, and SQL statements:

output: cout <<"string of characters";
input: cin >>variable;
/* . . . */

```
//
double Double.parseDouble(String s)
print test_string, 'text'
SELECT column_name,column_name
```

The following table summarizes the different content-type and the search patterns used to detect them:

| Content-type | Search Pattern |
|---|---|
| 1. Standard Pattern | Standard data classifiers such as social security numbers, credit card numbers, date of birth, first/last name, driving license numbers, Medicare ID, etc. |
| 2. Custom Pattern | Keyword search and pattern matching with proximity detection e.g. no uploading of documents that has "Company Confidential" watermark on file metadata or the header or footer. |
| 3. Regex | Custom rules with regular expressions e.g. detect ePHI data with ICD, NCD, and CPT codes. |
| 4. File Type | Inspect file types i.e. docx, PDF, music/video files, etc. |
| 5. Password Protected Files | Detect files that are password protected. |
| 6. Source Code | Detect transmission of source code i.e. C++, Java, Python, etc. |
| 7. Regulations | PII, PCI, PHI, HIPAA, Profanity. |
| 8. Non-regulated Data Types | Intellectual property, financial and legal terms, national ID numbers, International Bank Account Numbers (IBAN), etc. |

Content Profiles

One or more content inspection rules can be combined to define a content profile. For instance, a PCI content profile can include content inspection rules for detecting credit card information and social security data, and can be defined as follows:

```
PCI_Content_Profile :=
              CreditCard_Rule
              SSN_Rule
```

In another example, a PII content profile can include content inspection rules for detecting credit card information, social security data, and driver's license number, and can be defined as follows:

```
PII_Content_Profile :=
              CreditCard_Rule
              SSN_Rule
              DL_Rule
```

Content Policies

Further, one or more content profiles can be combined to define a content policy. A content policy can be applied to any user, user group, cloud service, cloud service category, cloud service instance, geo-location, device and operating system (OS) type. The following syntax shows one example of a content policy:

All_User=Cloud_Storage, Upload_Activity, Apply PCI_Content_Profile

All_user—Apply PCI_Content_Profile to activities of all users.

Cloud_Storage—Apply PCI_Content_Profile to only cloud storage services.

Upload_Activity—Apply PCI_Content_Profile to only upload activities.

PCI_Content_Profile—Apply PCI_Content_Profile.

Example detections—This regex would detect any credit card information or social security numbers being uploaded to a cloud storage service.

Generally a policy can be considered as testing a set of match conditions and the performing one or more actions. The most common actions are permit, block (or deny), redirect (asks client to go to another site, might prompt user to request permissions from the administrator), quarantine the data for administrative approval, log, reset (drops the TCP connection) and encrypt (data within application payload). Another action could be to invoke another external service integrated in the network security server or outside to process the data further. We will use "block" as a common example of a policy action in the below descriptions, but more generally any action can be applied as described infra.

For content policies 181, there can be a default to "permit" (or default to "deny") policy and then administrators can supplement the policy with service-, user-, and group-specific policies. If only one content policy matches, then a determination is made whether to drop, reset, or redirect a particular request (or entire flow of requests/responses). If multiple policies match, different rules can be used by the system to pick the priority, e.g. most specific policy to least specific policy (most conditions matched), first policy tested in sequence that matches (administrator can re-order), most restrictive policy outcome selected (drop wins over reset wins over redirect).

Context and Activity Aware Detection

With increasing amounts of enterprise data moving to the cloud services, identifying and protecting what's truly sensitive is a challenge. Traditional content inspection techniques can lead to false positives or false negatives. The technology disclosed uses a plurality of condition variables to set context for inspecting content and enforcing content policies. The following list of condition variables is exemplary rather than exhaustive and includes: content service, content service category, CCI, user or group, location of the user or the cloud service, time of day, device, browser, and user activity-type (e.g. upload, download, or view). Having this context in the content policies allows for precision and accuracy in identifying potential data loss scenarios and for targeted data protection.

Regarding the condition variables, condition variables are used to determine policy matches for both logging and flow actions. The policy itself can define a match in terms of condition variables tested for a simple direct match, hierarchical parent/child matches, and/or more complex logical matches.

In addition, time windows can be specified (window types may also include time/date information to narrow the window):

| Time Window Type | Description | Evaluation |
|---|---|---|
| Always | Apply policy all the time. | Default value of policy in one implementation. |
| Weekly | A day of the week. | Based on calendar of the locale, e.g. Saturday. |
| Daily | A specific time within the day. | Time range in the locale, e.g. 9am-5pm. |
| User defined | A window specified by a start time and an end time. | Generally specified as a full UTC date-time range, e.g. a block during a three-day company shutdown could be specified for US operations. |

Continuing, there are network and HTTP flow condition variables:

| Variable | Description | Evaluation |
|---|---|---|
| client public source IP | The public IP visible to the system. | CIDR match; can also be used for geolocation. |
| client internal source IP | The internal IP used within a NAT'ed network. | CIDR match; can also be used for geolocation; however, administrator may want it if it is from a known network. |
| http_req_resp_size | The total size in number of bytes. | Numerical thresholds. |
| http_method | The HTTP method is sometimes useful if admin wants to disable POST. | Match, e.g. against values such as: "POST"/ "GET"/"PUT". |

Additionally, geolocation mapping is supported, and depending on the library/libraries used, e.g. maxmind geoip library, different condition variables may be available, e.g. city, country, region, postal code, latitude, longitude.

User-related variables are another collection of condition variables:

| Variable | Description | Evaluation |
|---|---|---|
| User identifier (or name) | User's identifier, or name, from the user identity. | Match. |
| Group identifier (or name) | A group identifier or name. | Supports hierarchical containment, e.g. vice president group is a subset of all employees group and organizational units (OU), e.g. finance group, marketing group, etc. Note, engine can shortcut user identifier matching in some cases, e.g. if group is denied then skip user checks. |
| Account name | Sometimes a user can have different SaaS accounts or SSO, in which case a SaaS account can be treated as an alias. | Match. This can also allow users to have different permissions based on roles. For example, if a user John has a general account and a sysadmin account with cloud service X, only the sysadmin account with cloud service X might be authorized to use certain sysadmin resources. |

Lastly, device and client platform condition variables are available, such as browser family (e.g., Chrome, Internet Explorer, Safari), OS family (e.g., Windows, iOS, MacOS, Linux, Android), OS subfamily (e.g. for Windows: 7 vs. Vista), device type (e.g. desktop, mobile), device subtype (e.g. for desktop: PC vs. Mac, for mobile: tablet vs. smartphone), managed vs. unmanaged (BYOD) devices.

Policy Enforcement

For content-based action policies, enforcement points may occur at multiple junctures. For example, a source IP range or country code geolocation enforcement can be applied when the connection is established, but a policy to block specific file uploads to an application would likely only be enforceable when HTTP POST data becomes available when the application identifier and resource identifier condition variables are set. Thus, key points for policy enforcement within the network security system include:

After connection establishment between the client and the network security system;
After HTTP request URL and host received;
After HTTP request header, but before request data (if any) sent;
After HTTP request data received;
After HTTP response header, but before response data sent; and
After HTTP request/response completion (connection may continue in case of pipelining).

The policy enforcement framework is also extensible to allow policy actions to be expanded beyond the described items. In some implementations, for example, custom policy actions can include selective in-line scanning of data in transition to detect and prevent data leakage. In other implementations, a policy action can invoke an anti-virus module to scan data in transit for malware and viruses. Still other implementations, dynamically to perform operations such as selective data encryption or decryption. In one implementation, the goal can be to ensure that sensitive data uploaded or stored in cloud services is encrypted. Thus encryption can occur on the network security system when data moves from the client to the cloud service and decryption can occur similarly occur on the network security system when data moves from the cloud service to the client. Still other implementations, may aid with compliance with corporate policies and government regulations, e.g. HIPAA, that require local copies of data to be encrypted. Thus, a download of records, e.g. patients, customers, could be automatically encrypted by a policy triggered by the network security system before it is provided to the requesting client. The encryption (and decryption) keys or passwords can be specified in the policy and/or the third party system. For example, all draft tax returns that are downloaded could be automatically encrypted with the last four characters of a user identifier. In still other implementations, the encryption system may have a default password for the user that is provided to the network security system. In another implementation, the encryption is based on a key or password based on the user identity. For example, the password based on the user identity could be a corporate encryption password for a common group of users. In another implementation, the key could be a common token, e.g. a group certificate.

In another implementation, encryption could be performed down at the field level. For example, only encrypting social security numbers or credit card number columns in a spreadsheet. Similarly, in another implementation, the message contents of e-mails might be encrypted but headers could be left alone.

Operational Modes

The content policies can be enforced in active, quasi-active, and/or passive modes. In active mode, all user data goes through the network security system 120 and content inspection rules are applied in real-time. In a quasi-active mode implemented by the inspective analyzer 194, deposits or modifications of content in user directories, files, and folders that already exist on cloud services made by bypassing an active proxy platform are detected by the inspective analyzer 194, which is notified of the deposits or modification in near real-time. Upon being notified, the inspective analyzer 194 applies content inspection rules on the deposited or modified content to quasi-actively enforce policy compliance. In a passive mode implemented by the inspective analyzer 194, API connectors can be used to apply content inspection rules retroactively on user directories, files, and folders that already exist on cloud services sanctioned by the organization. The passive mode allows organizations to retrieve content that is resident in cloud services and has left the organization's network.

Active Proxy Analysis

Figure 2A:
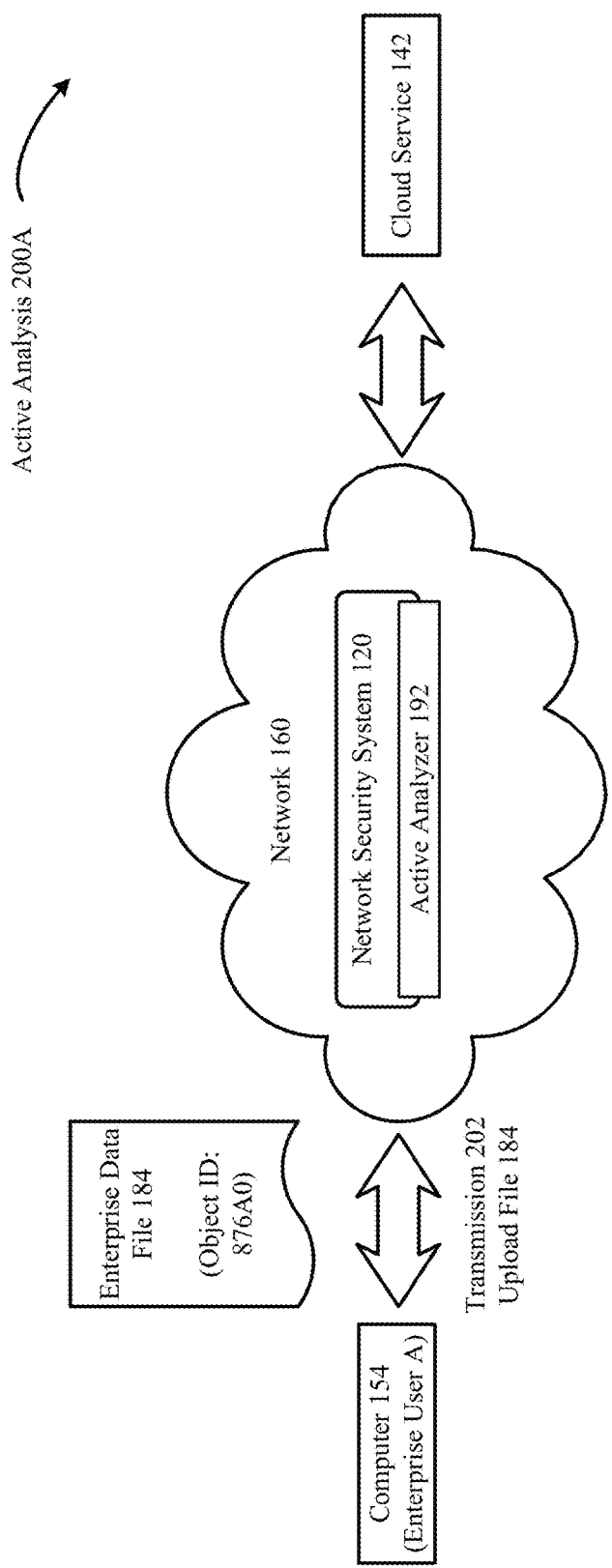
FIG. 2A illustrates one implementation of active proxy analysis of object deposit to, retrieval from and sharing via the independent object stores.

FIG. 2A illustrates one implementation of active proxy analysis 200A of object deposit to, retrieval from and sharing via the independent object stores. Analysis 200A can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this workflow is described with reference to the system that carries out a method. The system is not necessarily part of the method.

Figure 2B:
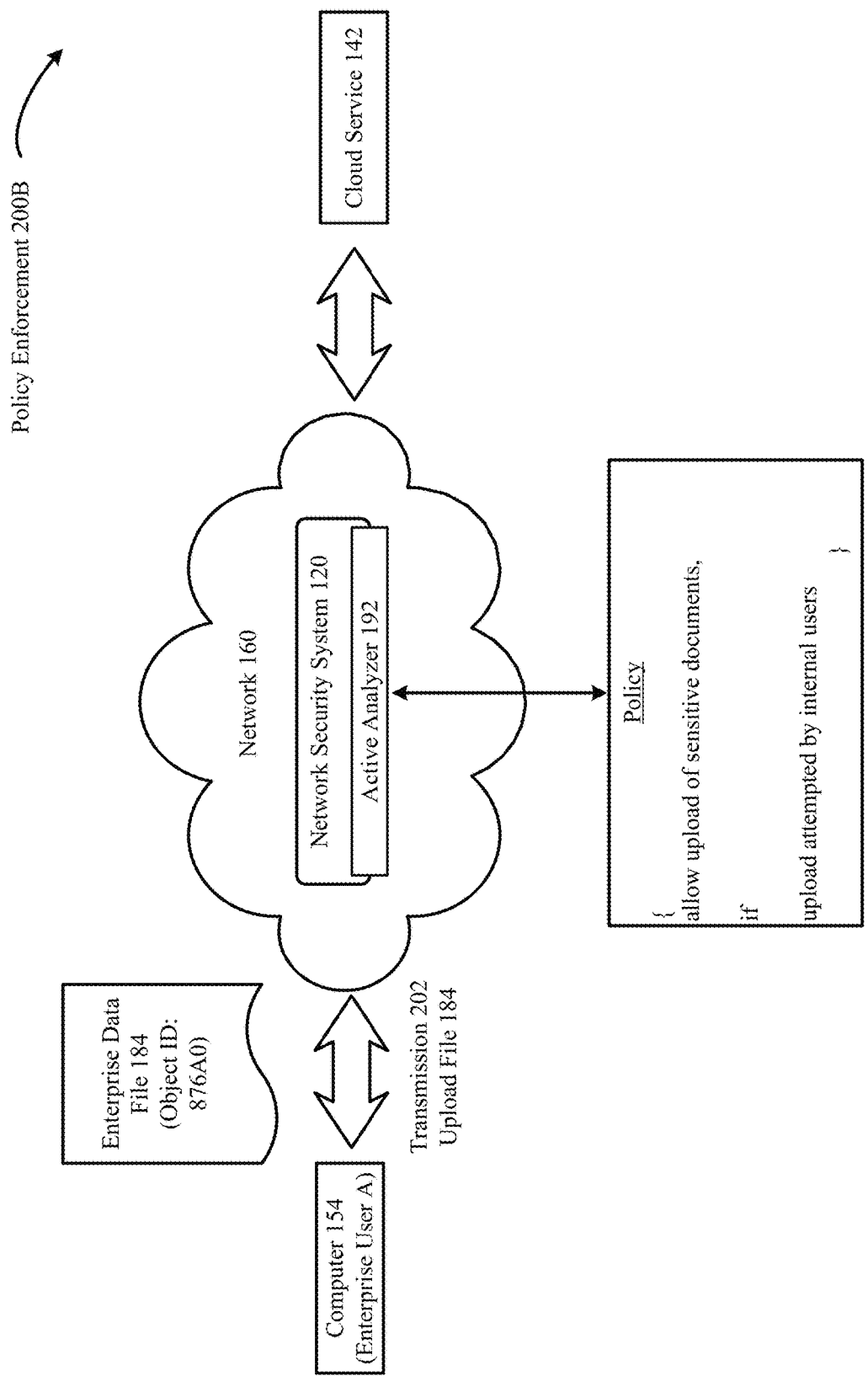
FIG. 2B shows one implementation of enforcement of a policy by active proxy analysis.

In FIG. 2A, an enterprise user A attempts (via computer 154) to make a transmission 202 (e.g., upload a file) of enterprise data file 184 (object ID 876A0) to a cloud service 142. FIG. 2B shows one implementation of enforcement 200B of a policy by active proxy analysis. In FIG. 2B, active analyzer 192 enforces a policy that allows upload of sensitive documents if the upload is attempted by internal users. Further, active analyzer 192 determines the sensitivity of enterprise data file 184 (object ID 876A0) using monitor 121 and determines whether enterprise user A is an internal user based on storage 122.

Figure 2C:
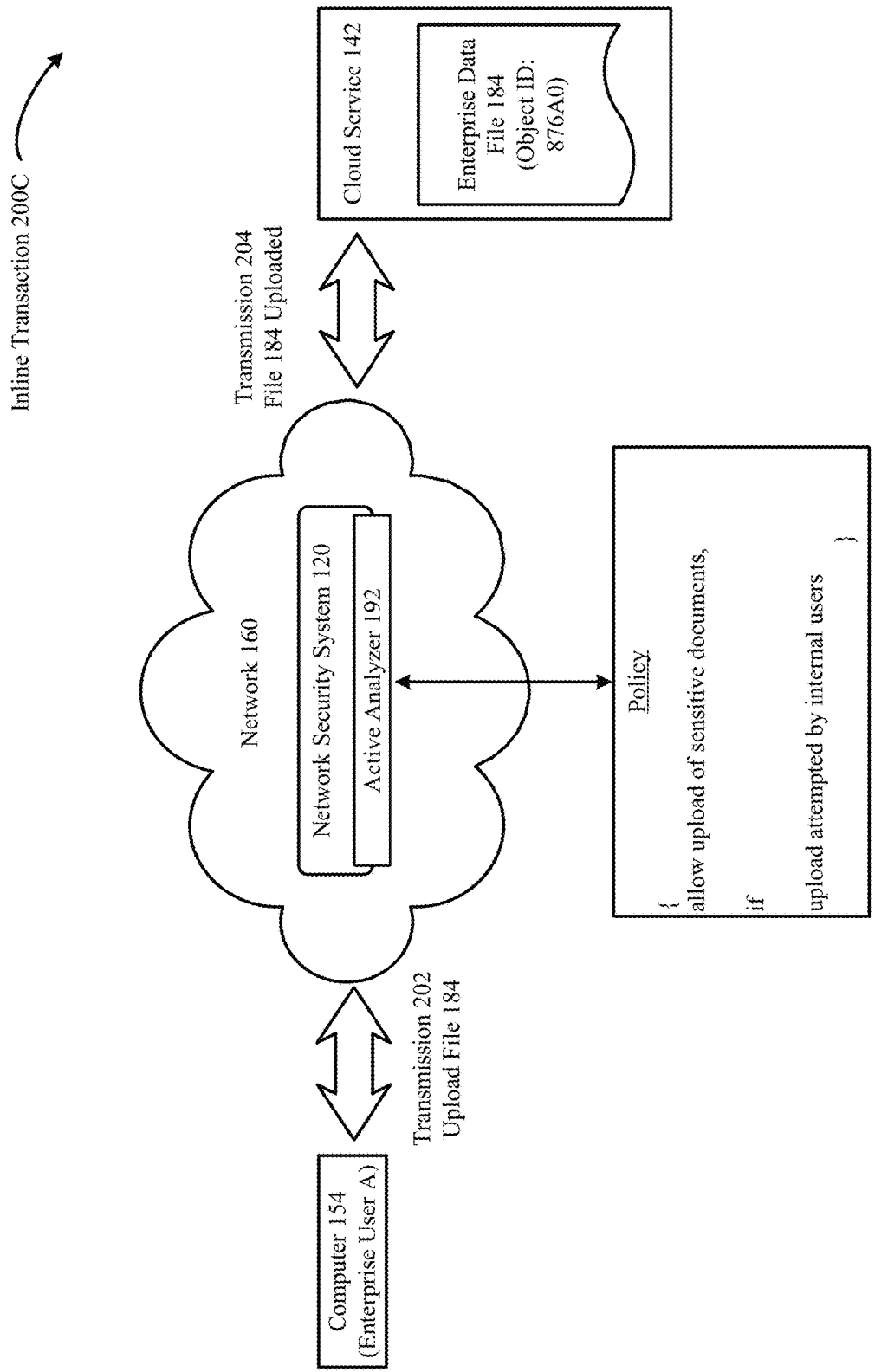
FIG. 2C is one implementation of an inline transaction traversing an active proxy platform.
Figure 2D:
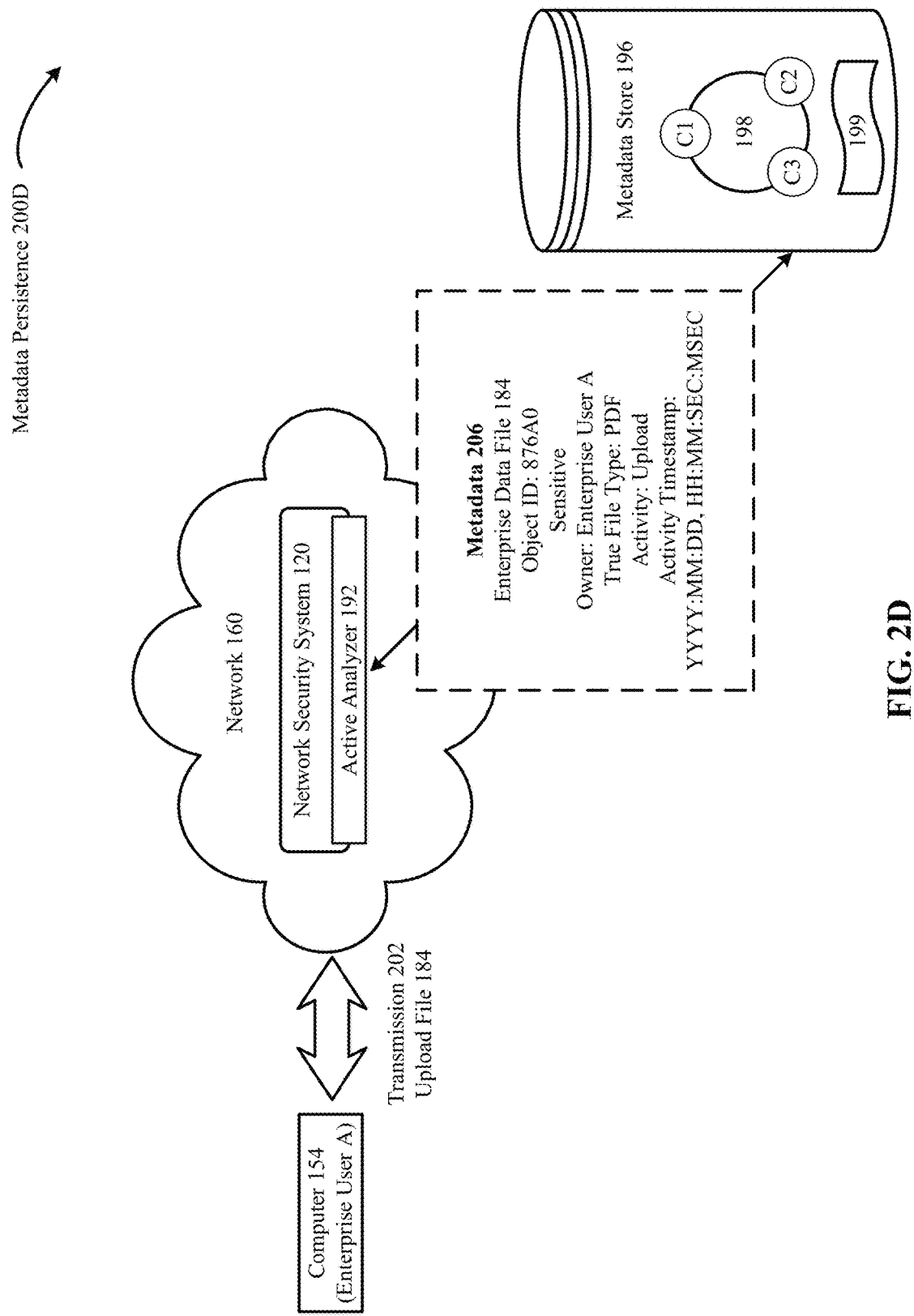
FIG. 2D depicts one implementation of an active proxy platform storing metadata of an object that traverses the active proxy platform.

FIG. 2C is one implementation of an inline transaction 200C traversing an active proxy platform. In FIG. 2C, active analyzer 192 determines that transmission 202 is permissible against the policy and, as a result, enterprise data file 184 (object ID 876A0) is transmitted to the cloud service 142 at transmission 204. FIG. 2D depicts one implementation of an active proxy platform persisting 200D metadata of an object that traverses the active proxy platform. One consequence of inline transactions traversing the active analyzer 192 during active proxy analysis is that the active analyzer 192 extracts object metadata of enterprise data file 184 (object ID 876A0) using monitor 121, as discussed supra, and stores the metadata 206 in metadata store 196. In the example shown in FIG. 2D, the persisted metadata about enterprise data file 184 (object ID 876A0) is that it has an object ID "876A0", that it is a "sensitive" document, that "enterprise user A" owns enterprise data file 184 (object ID 876A0), that the true file type of enterprise data file 184 (object ID 876A0) is "PDF", that the last activity associated with enterprise data file 184 (object ID 876A0) is "upload", and the activity timestamp is "YYYY:MM:DD, HH:MM:SEC:MSEC".

Data-Deficient Transactions and Multi-Part Policies

Sharing Transaction

Figure 3A:
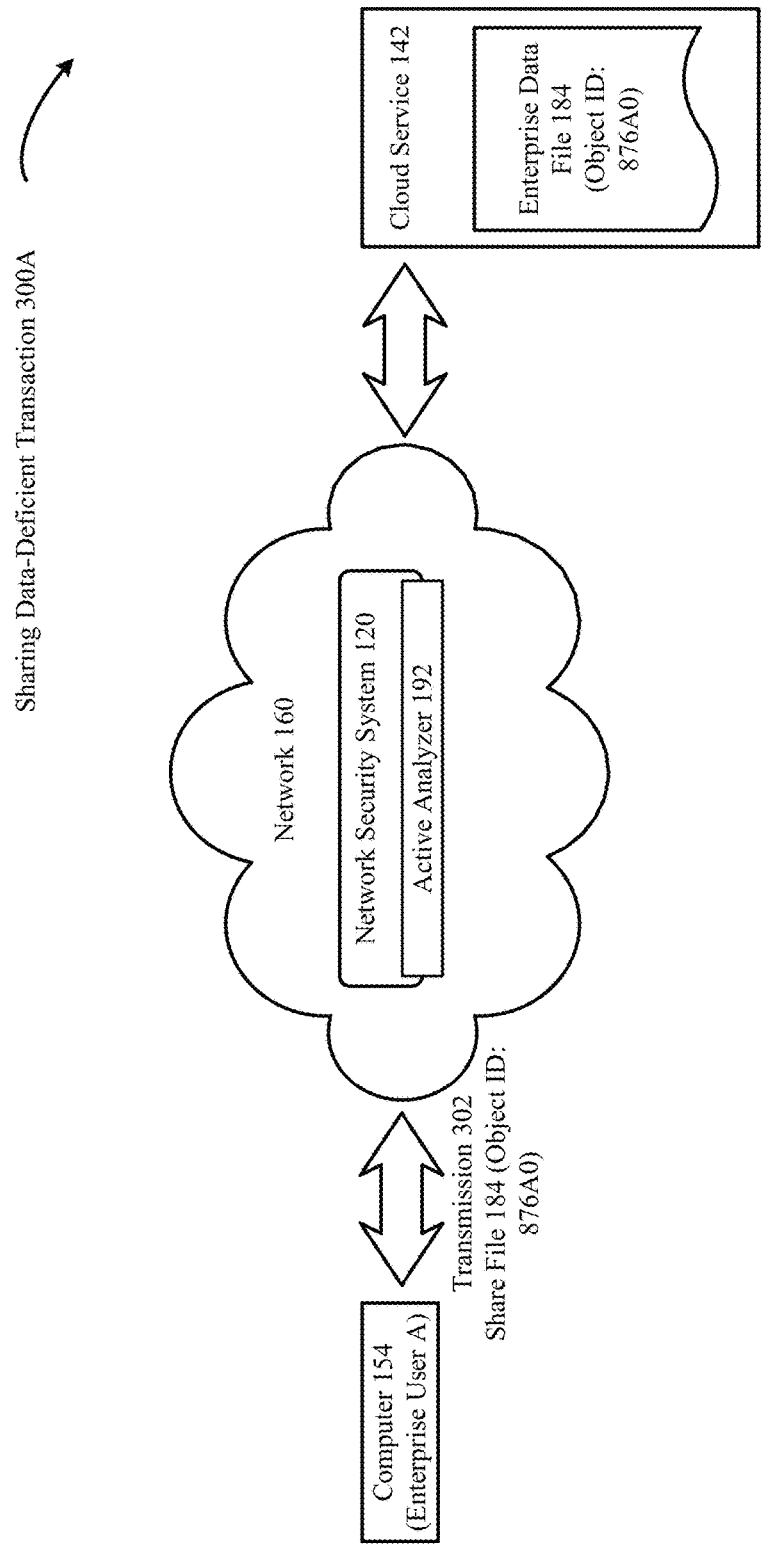
FIG. 3A illustrates one implementation of a sharing data-deficient transaction.
Figure 3B:
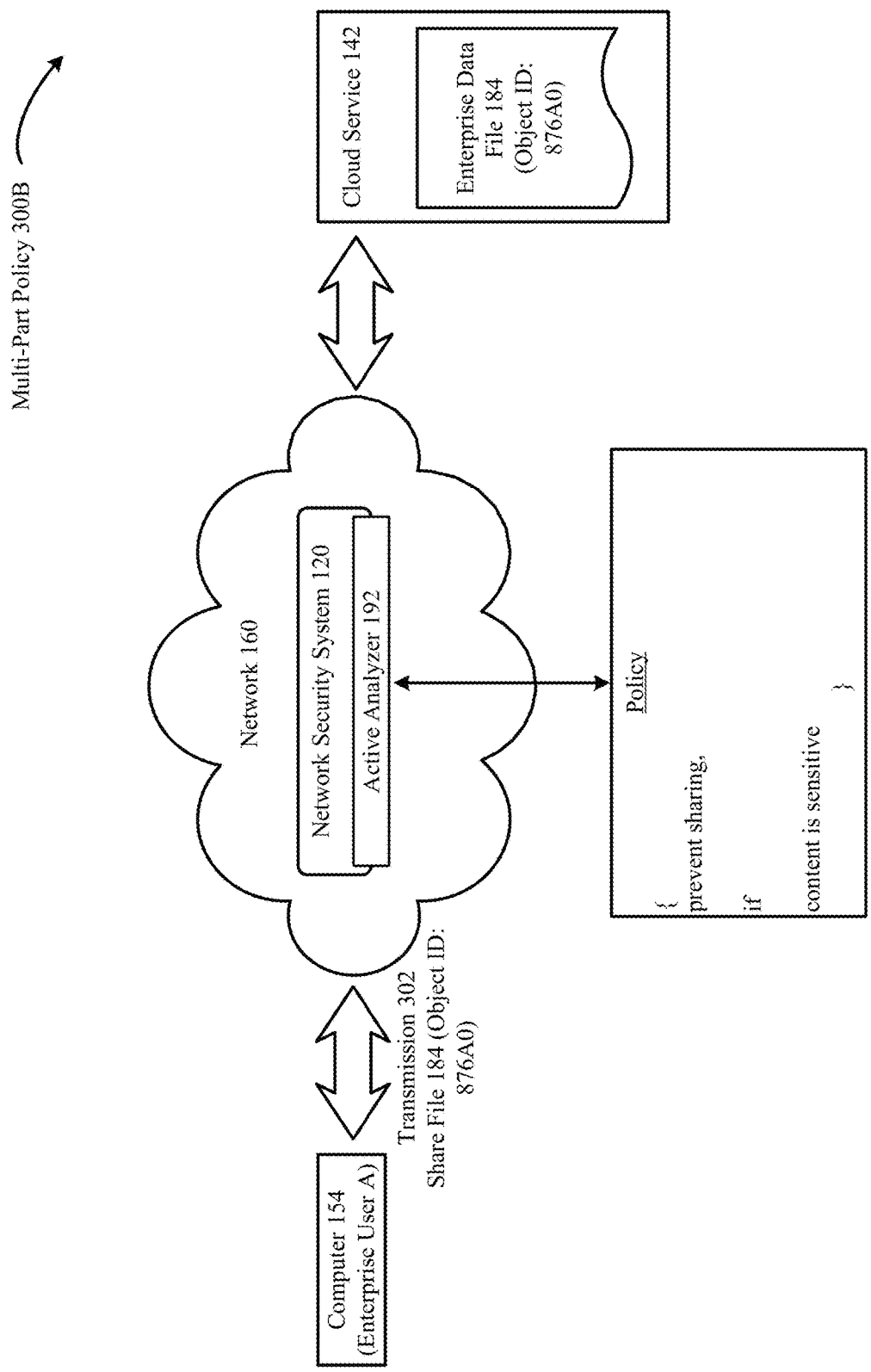
FIG. 3B shows a multi-part policy applied to the sharing data-deficient transaction of FIG. 3A.

FIG. 3A illustrates one implementation of a sharing data-deficient transaction 300A. In the example shown in FIG. 3A, an enterprise user A shares (via computer 154) enterprise data file 184 (object ID 876A0) located in a cloud service 142 via transmission 302. Transmission 302 only references the enterprise data file 184 via object ID 876A0 and does not include the body of the enterprise data file 184. FIG. 3B shows a multi-part policy applied to the sharing data-deficient transaction 300A. In the example shown in FIG. 3B, the multi-part policy is, for example, "prevent sharing of the file, if the content of the file is sensitive". However, active analyzer 192 does not have access to the content of enterprise data file 184 because enterprise user A has shared enterprise data file 184 only by a reference link i.e. object ID 876A0 and not the actual enterprise data file 184 stored in the cloud service 142. As a result, the multi-part policy 300B cannot be applied because the policy condition of whether the content in enterprise data file 184 is sensitive cannot be determined.

Figure 3C:
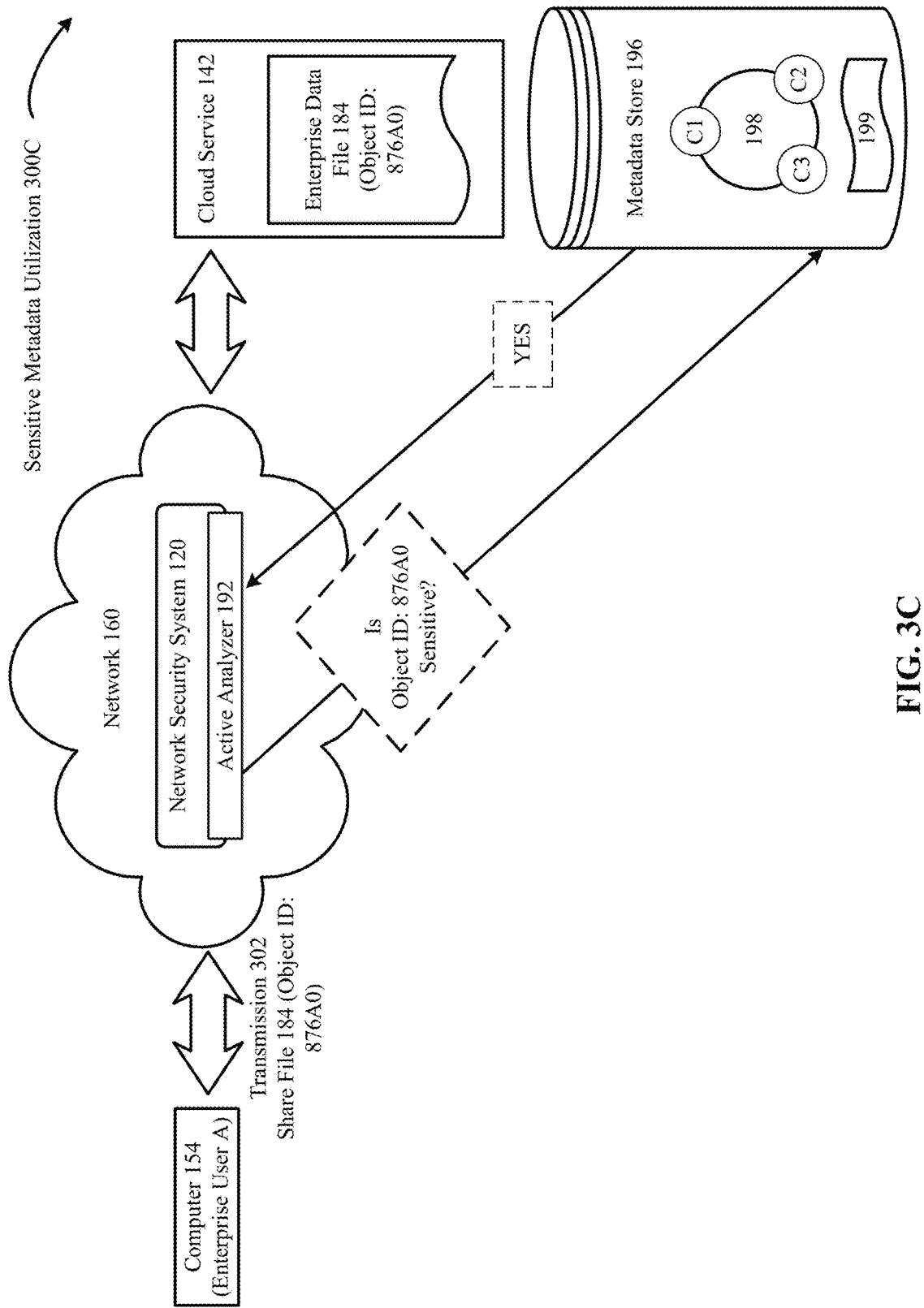
FIG. 3C depicts one implementation of an active proxy analyzer accessing persisted metadata to enforce multi-part policies on data-deficient transactions like the sharing data-deficient transaction of FIG. 3A.
Figure 3D:
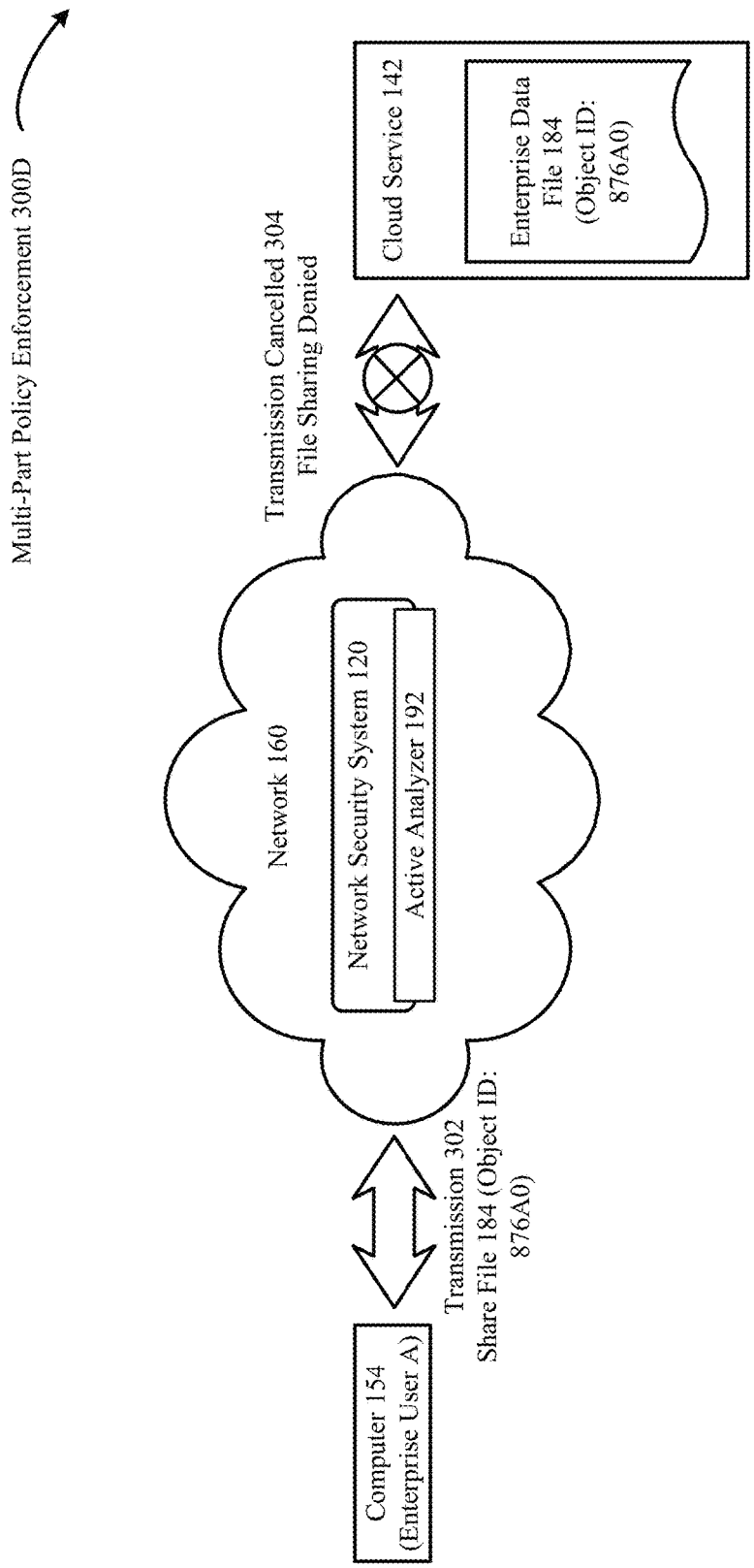
FIG. 3D is one implementation of enforcing a multi-part policy on the sharing data-deficient transaction of FIG. 3A based on object metadata accessed from a metadata store.

The technology disclosed solves the technical problem of data-deficient transactions, on which multi-part policies cannot be enforced, by persisting and accessing object metadata that provides the data required to enforce the multi-part policies on the data-deficient transactions. FIG. 3C depicts one implementation of an active proxy analyzer accessing 300C persisted metadata to enforce multi-part policies on data-deficient transactions like the sharing data-deficient transaction 300A. In the example shown in FIG. 3C, active analyzer 192 looks up the metadata store 196 to determine whether the object ID 876A0 is associated with a sensitive document. FIG. 3D is one implementation of enforcing 300D a multi-part policy on the sharing data-deficient transaction 300A based on object metadata accessed from a metadata store. When the metadata store 196 confirms that enterprise data file 184 is sensitive, the multi-part policy 300B is enforced and the enterprise data file 184 is not shared and the sharing data-deficient transaction 300A is cancelled at action 304.

Online/Cloud Accessing Transaction

Figure 3E:
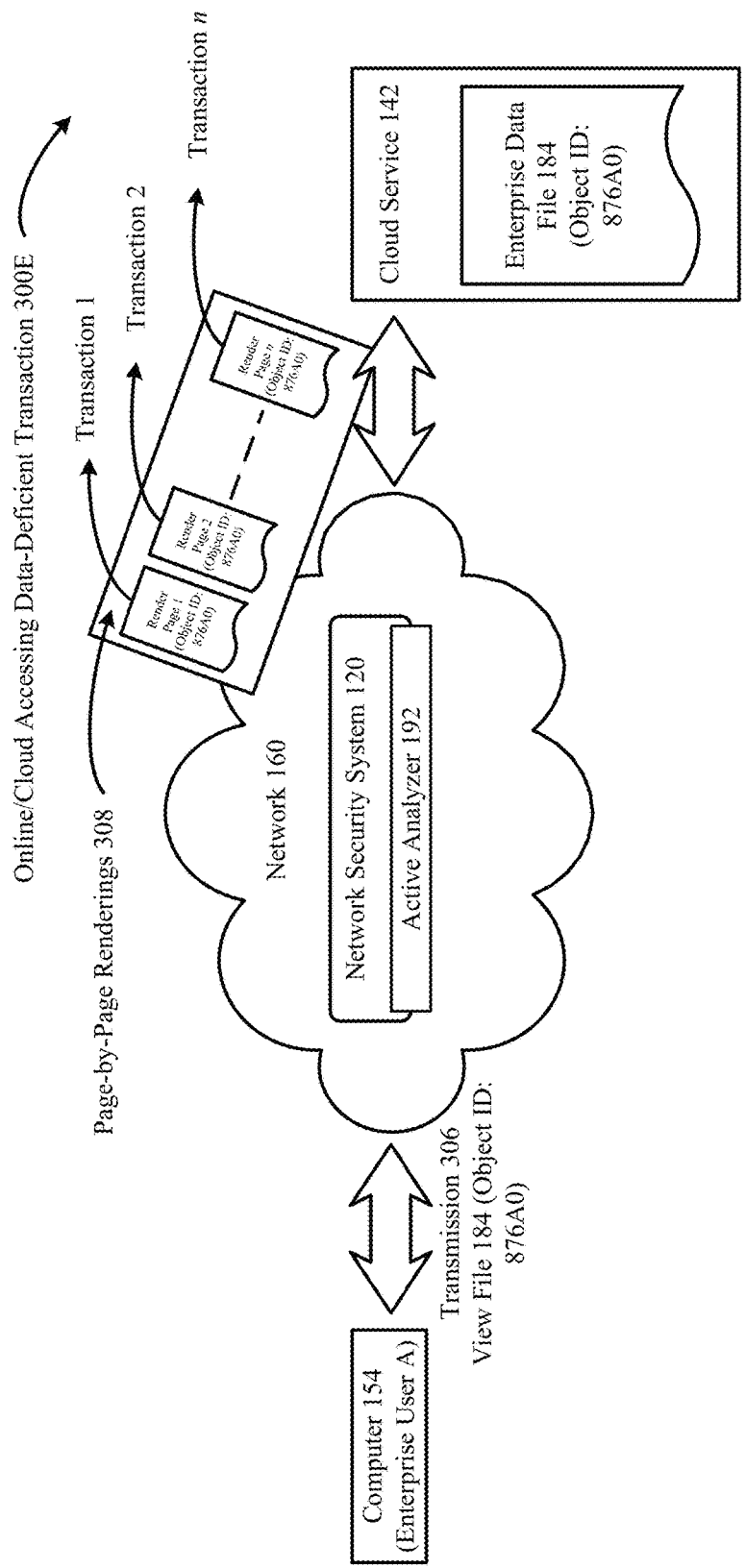
FIG. 3E illustrates one implementation of an online accessing data-deficient transaction.

FIG. 3E illustrates one implementation of an online accessing or cloud accessing data-deficient transaction 300E. In the example shown in FIG. 3E, an enterprise user A intends to view (via computer 154) enterprise data file 184 (object ID 876A0) located in a cloud service 142 via transmission 306. Contemporary cloud services like Microsoft Office365™, Google Drive™, Dropbox™, and Box™ allow users to access and manipulate (e.g., view (read-only), edit (read and write)) documents (e.g., files, data objects, links with various formats like PDF, DOC, DOCX, XLS, PPT, RTF, ODT, ODS, ODP, CSV) "online" within the cloud services itself. Thus, for example, the users using the could services can access and manipulate the documents in the browser itself without need for any third party software installed on their computers.

When a user accesses a document "online" on a cloud service, the cloud service serves or fetches the document in portions over multiple transactions, rather than serving or fetching the entire document in one transaction. So, for example, when, within a cloud service environment, a user accesses a first document with multiple pages online, the cloud service serves the first document on a page-by-page basis over multiple renderings or transactions. From a security perspective (e.g., data loss prevention (DLP), malware detection), the "online accessing" is considered herein a data-deficient transaction because the fetching of a document in portions over multiple renderings or transactions causes data deficiency in a single transaction such that content necessary or required to enforce or apply a given policy or a multi-part policy is not available in the context of the single transaction.

In the example shown in FIG. 3E, when the enterprise user A attempts to complete the online accessing data-deficient transaction 300E, the active proxy analyzer 192 evaluates the page-by-page renderings 308 (page 1 to page n) of the enterprise data file 184 (object ID 876A0) made by the cloud service 142 on a page-by-page basis over multiple transactions 1 to n.

Figure 3F:
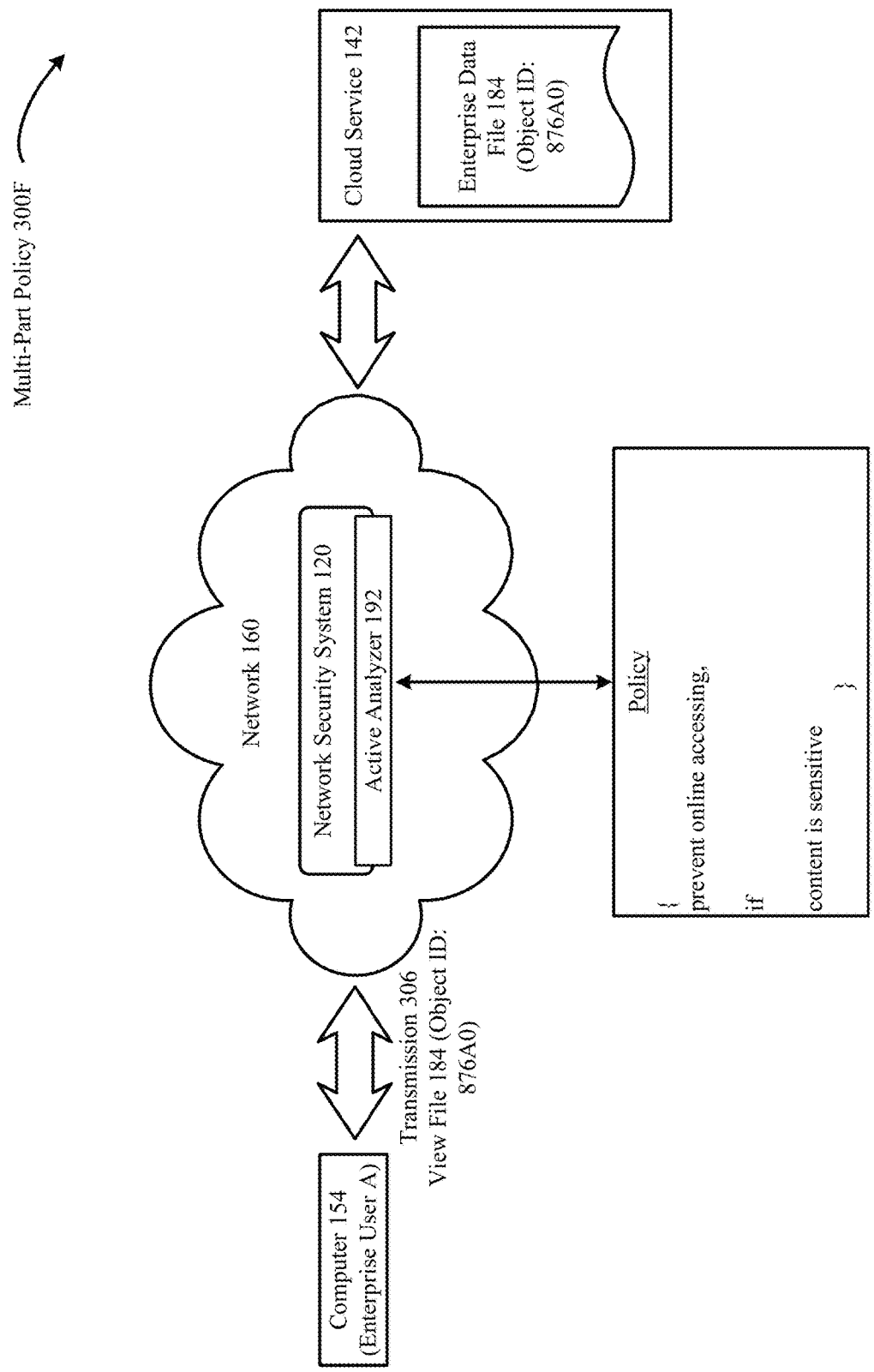
FIG. 3F shows a multi-part policy applied to the online accessing data-deficient transaction of FIG. 3E.

FIG. 3F shows a multi-part policy 300F applied to the online accessing data-deficient transaction 300E. In the example shown in FIG. 3F, the multi-part policy 300F is, for example, "prevent online accessing of documents, if the content of the documents is sensitive". However, active analyzer 192 does not have access to all the content of the enterprise data file 184 in a single transaction due to the page-by-page renderings 308 over multiple transactions 1 to n. As a result, the policy determination of whether the content in enterprise data file 184 is sensitive cannot be reliably made in a current transaction given the possibility that later portion (e.g., page) renderings of the enterprise data file 184 in subsequent transactions may include sensitive content and/or sensitive content may be distributed across multiple portions (e.g., pages) of the enterprise data file 184.

For instance, consider an exemplary policy which requires that a document be classified as sensitive only when it is found to contain at least ten (10) social security numbers (SSNs). In this case, due to the page-by-page renderings of documents by contemporary cloud services over multiple transactions, all the ten (10) SSNs may not be on the same page, and thus may not be detected in a single transaction. As a result, the document, even though containing ten (10) SSNs and meeting the policy condition, may not be classified as sensitive.

Figure 3G:
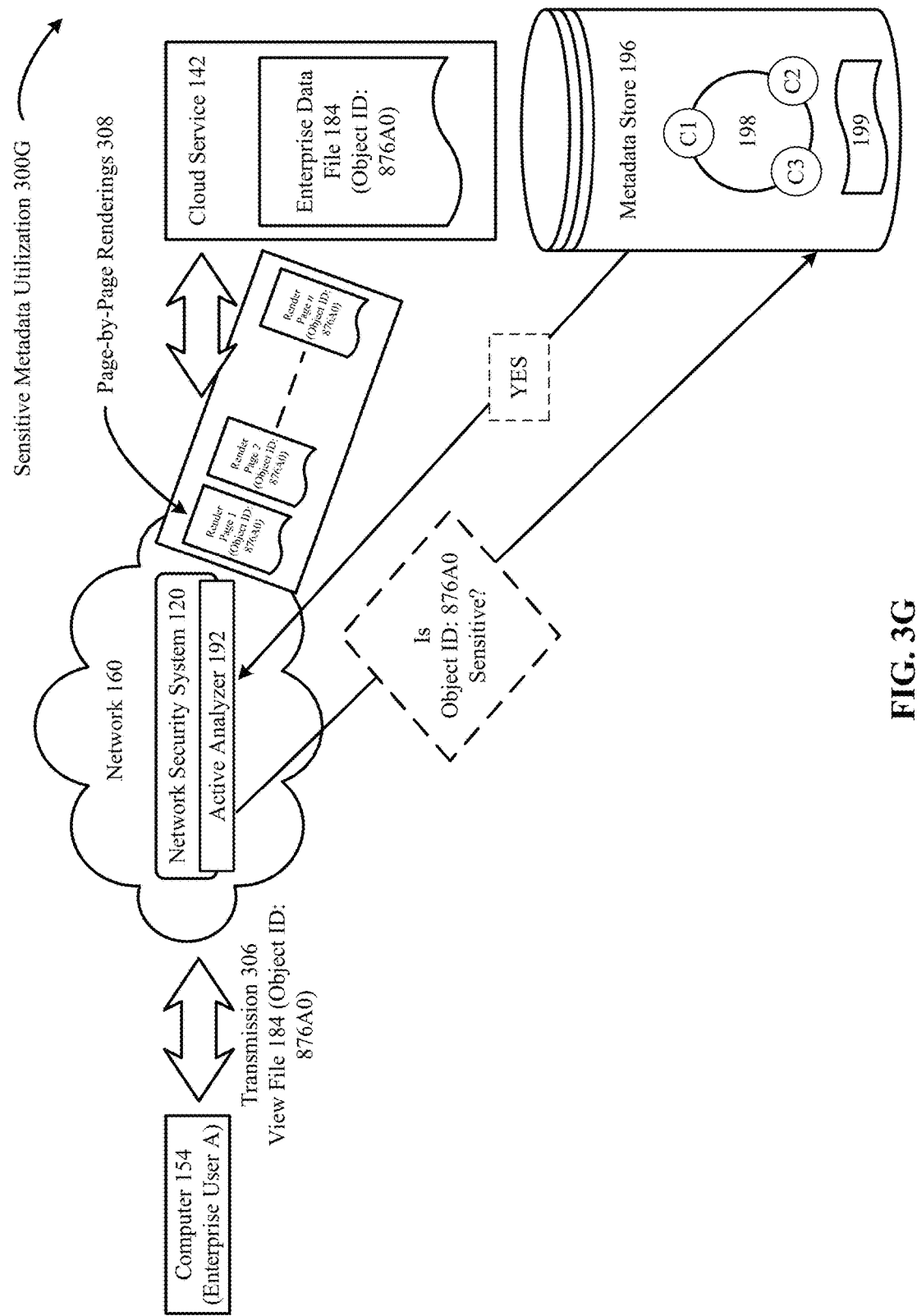
FIG. 3G depicts one implementation of an active proxy analyzer accessing persisted metadata to enforce multi-part policies on data-deficient transactions like the online accessing data-deficient transaction of FIG. 3E.

The technology disclosed solves the technical problem of online accessing data-deficient transactions, on which multi-part policies cannot be enforced, by persisting and accessing object metadata that provides the data required to enforce the multi-part policies on the online-accessing data-deficient transactions. FIG. 3G depicts one implementation of an active proxy analyzer 192 accessing 300G persisted metadata to enforce multi-part policies on the online accessing data-deficient transaction 300E. In the example shown in FIG. 3G, active analyzer 192 looks up the metadata store 196 to determine whether the object ID 876A0 is associated with a sensitive document. Accordingly, the non-enforcement of the multi-part policy 300F caused by the page-by-page rendering is avoided because the policy determination of whether the content in enterprise data file 184 is sensitive is no longer dependent on rendering of the entire document in a single transaction, and can be reliably made in a current transaction for a portion (e.g., page) of the document by looking up the metadata store 196.

Figure 3H:
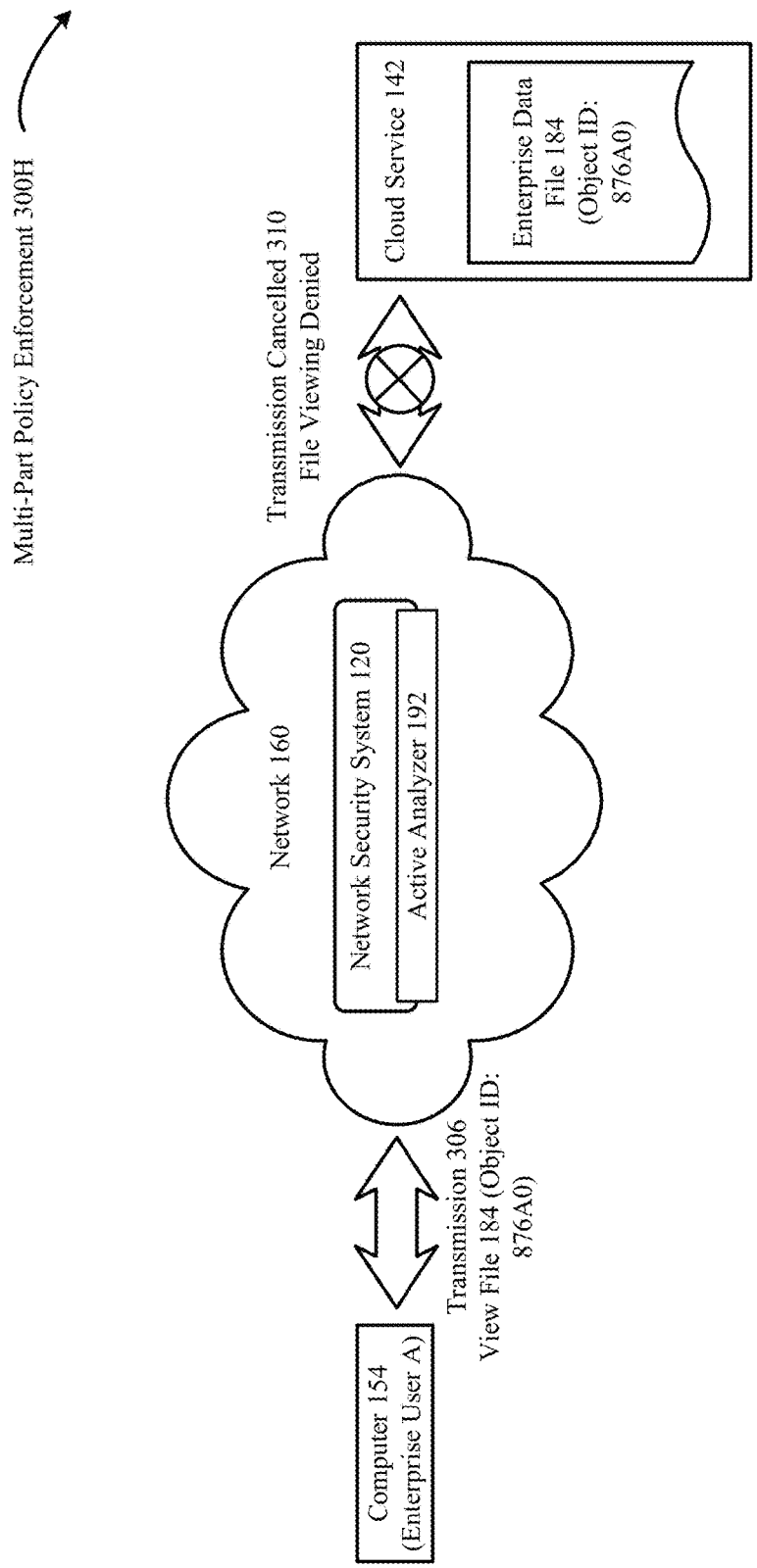
FIG. 3H is one implementation of enforcing a multi-part policy on the online accessing data-deficient transaction of FIG. 3E based on object metadata accessed from a metadata store.

FIG. 3H is one implementation of enforcing 300H the multi-part policy 300F on the online accessing data-deficient transaction 300E based on object metadata accessed from the metadata store 196. When the metadata store 196 confirms that enterprise data file 184 is sensitive, the multi-part policy 300F is enforced and the enterprise data file 184 is not allowed to be accessed online by the active analyzer 192, and the online accessing data-deficient transaction 300E is cancelled at transmission 310.

In other implementations, the inspective proxy analyzer 194 is used to enforce or apply a given policy or a multi-part policy on online accessing data-deficient transactions.

With data-deficient transactions understood in the context of accessing documents online within a cloud service environment, the discussion now turns to data-deficient transactions in the context of web-based e-mails.

Web-Based E-mail Transaction

In using contemporary web-based e-mail services like Roundcube™, SquirrelMail™, Yahoo Mail™, Google Gmail™, Hotmail™, Outlook.com™, Outlook Web Access TMAOL Mail, and Mail.Com™, users send e-mails that include attachments in the form of documents (e.g., files, data objects, links with various formats like PDF, DOC, DOCX, XLS, PPT, RTF, ODT, ODS, ODP, CSV). When, during the drafting stage, a user attaches a document to the draft e-mail, the web-based e-mail service uploads the document to a web-based e-mail store and in turn generates a link referencing the originally attached document. The link is then included in the draft e-mail in place of the originally attached document, i.e., the web-based e-mail service embeds the link in the e-mail so as to represent/identify the actual document uploaded by the user.

At the sending stage, after the link representing/identifying the attachment has been embedded, the recipient(s) of the e-mail have been identified, and/or an e-mail body included in the e-mail, an "intermediary version of the entire e-mail" is forwarded to the web-based e-mail store where the link is used to retrieve the original document uploaded by the user. Then, a "final version of the entire e-mail", with its body and the actual attachment is sent to the specified recipient(s) over a communication protocol such as Simple Mail Transfer Protocol (SMTP).

From a security perspective (e.g., data loss prevention (DLP), malware detection), the transmission of the intermediary version of the entire e-mail in a web-based e-mail transaction is considered herein a data-deficient transaction because the intermediary version just includes a link referencing the attachment document, rather than the actual document itself, as discussed supra. Consequently, the web-based e-mail transaction does not provide the content necessary or required to enforce or apply a given policy or a multi-part policy.

The technology disclosed solves the technical problem of web-based e-mail data-deficient transactions by persisting object metadata prior to a transmission of the intermediary version of the entire e-mail, and accessing the persisted object metadata prior to a transmission of the final version of the entire e-mail to determine whether the actual attachment document should be included in the final version based on a given policy or multi-part policy. As a result, the object metadata provides the data required to enforce policies and/or multi-part policies on the web-based e-mail data-deficient transactions. So, for example, if the actual attachment document is found to be sensitive based on the applicable policy and/or multi-part policy, then the actual attachment document is not transmitted.

Figure 3I:
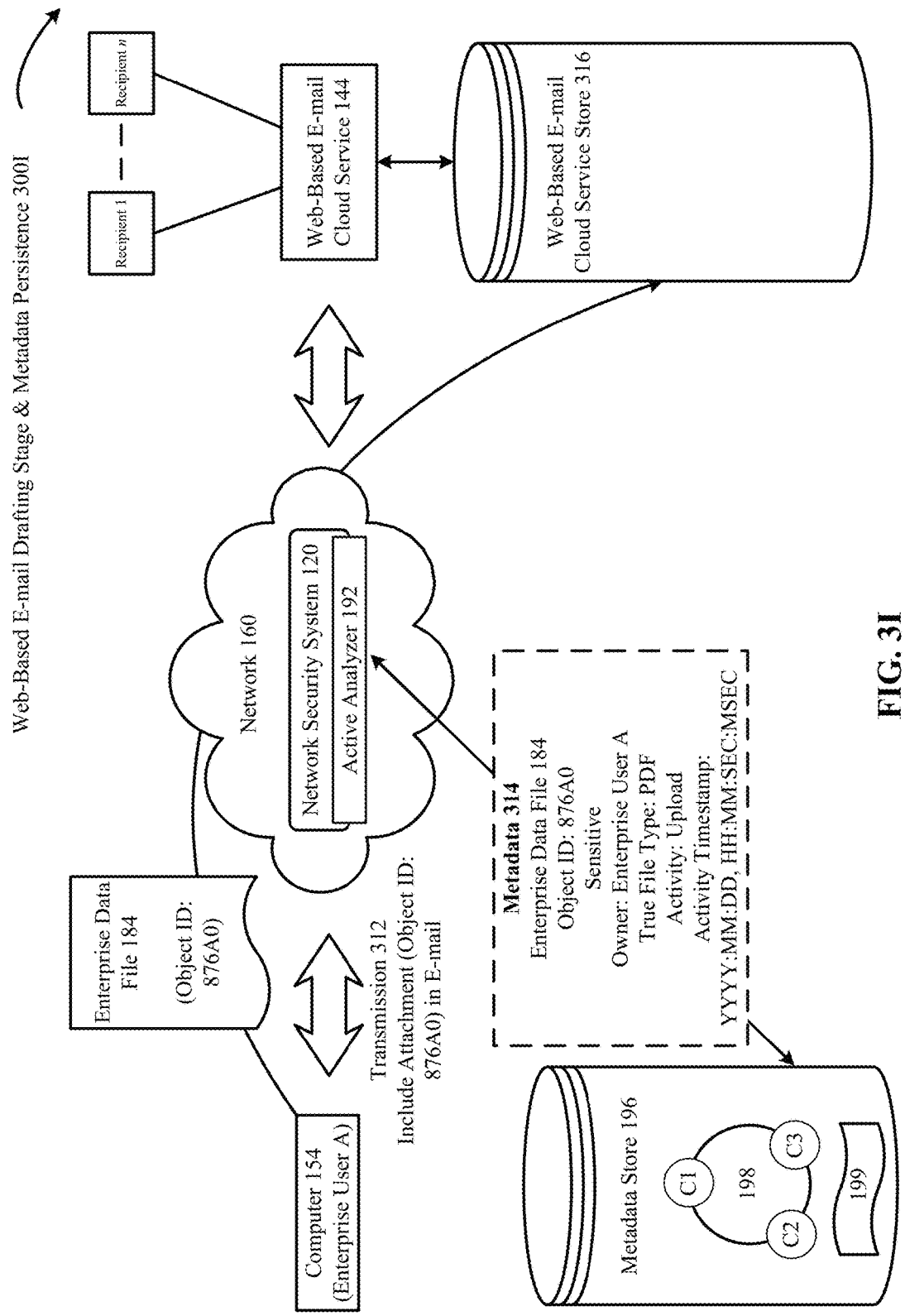
FIG. 3I illustrates one implementation of a web-based e-mail drafting stage and metadata persistence for use in a web-based e-mail data-deficient transaction shown in FIG. 3K.
Figure 3J:
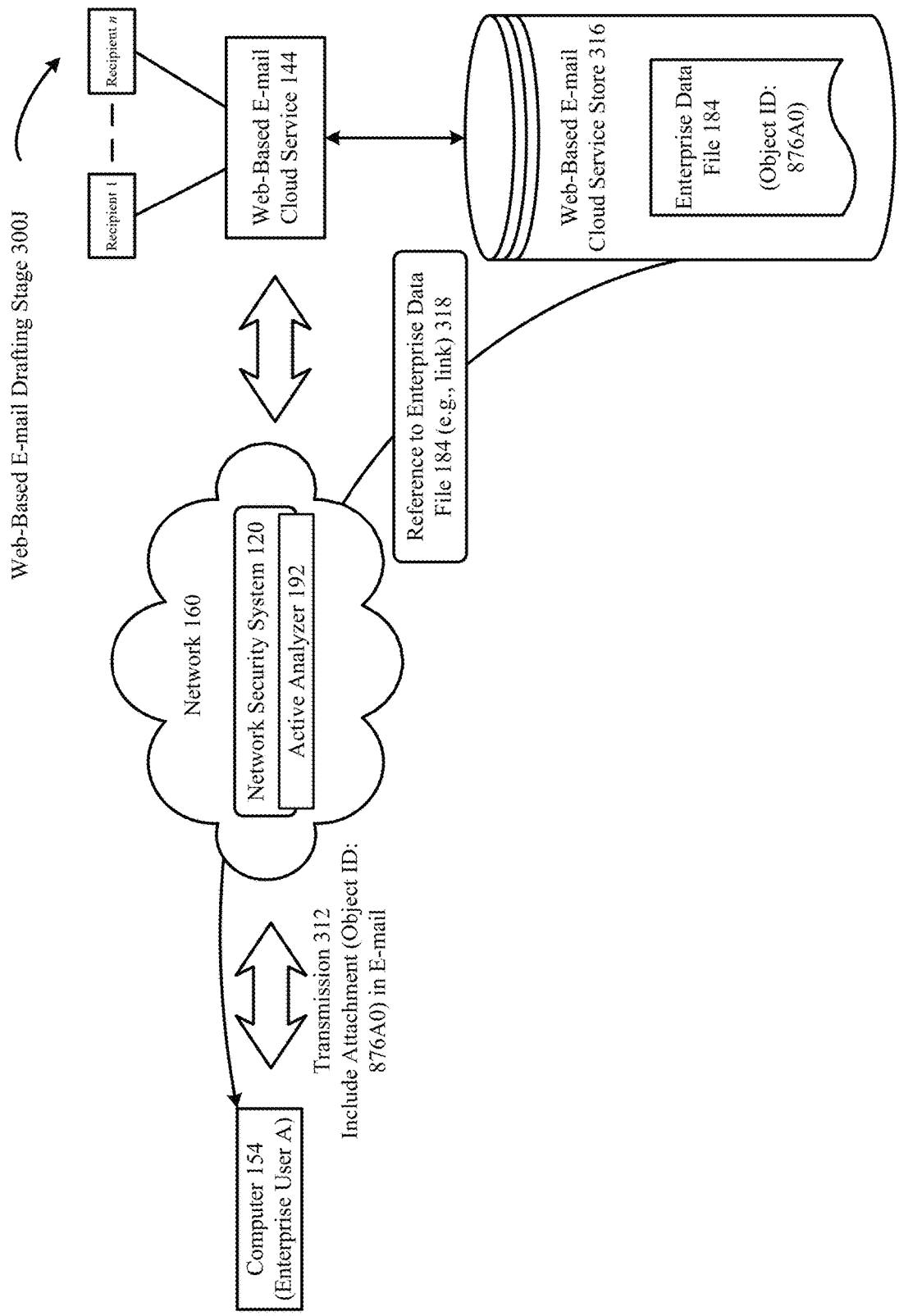
FIG. 3J shows a reference object, representing an actual document attachment, being generated by a web-based e-mail cloud service for embedding an intermediate version of the e-mail.
Figure 3K:
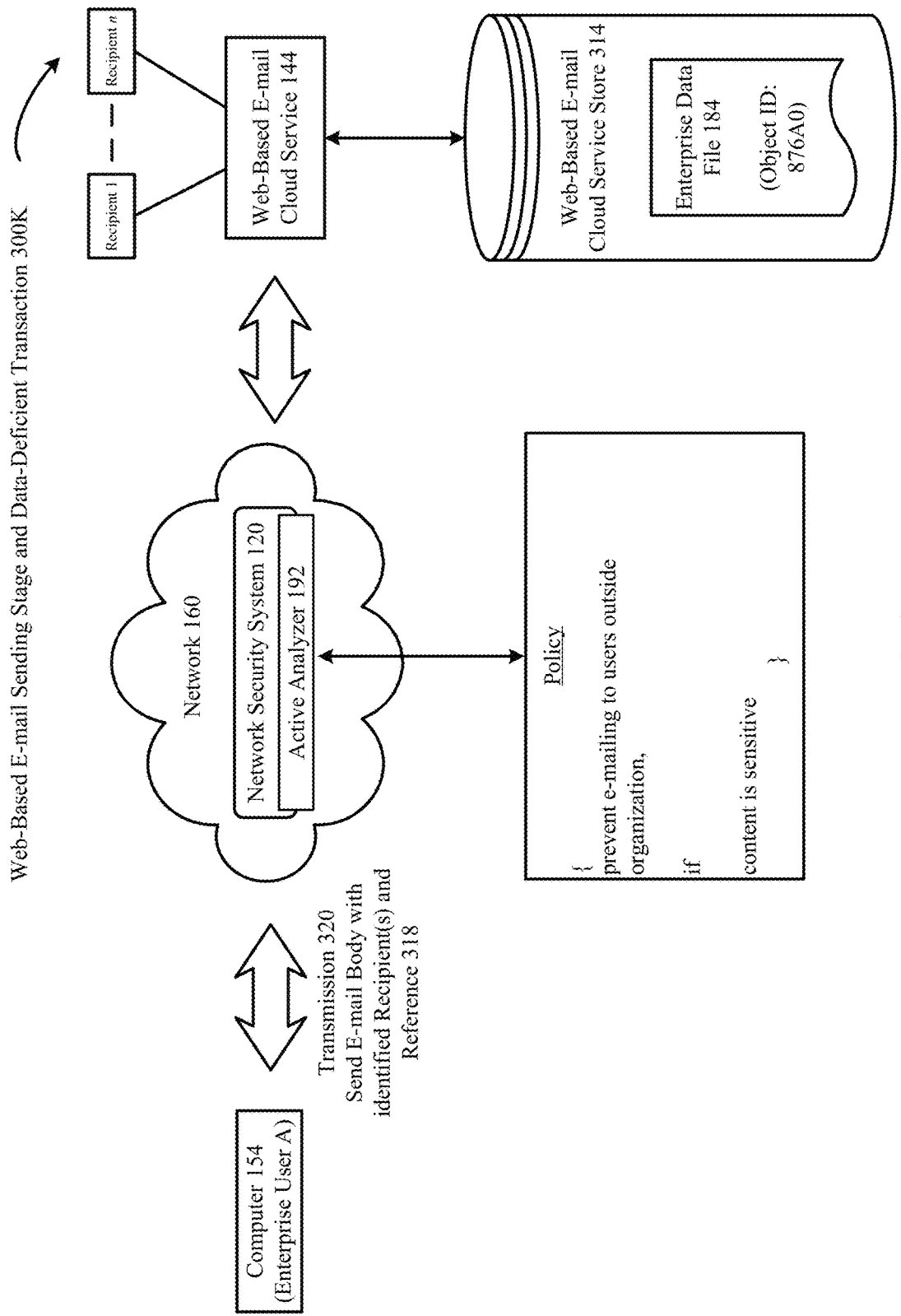
FIG. 3K depicts a multi-part policy applied to a web-based e-mail data-deficient transaction at a sending stage.

FIG. 3I illustrates one implementation of a web-based e-mail drafting stage and metadata persistence 3001 for use in a web-based e-mail data-deficient transaction shown in FIG. 3K. When, at transmission 312 of the drafting stage, an enterprise user A includes an enterprise data file 184 (object ID 876A0) attachment in a draft e-mail to be transmitted by a web-based e-mail cloud service 144, the enterprise data file 184 (object ID 876A0) is uploaded to a store 316 of the web-based e-mail cloud service 144 so that a link 318 referencing the enterprise data file 184 (object ID 876A0) can be embedded in an intermediate version of the e-mail.

At this juncture, when the actual enterprise data file 184 (object ID 876A0) attachment, with all is contents, traverses the active proxy analyzer 192, the active proxy analyzer 192 classifies the enterprise data file 184 (object ID 876A0) and the reference link 318 as being sensitive or not using content evaluation techniques described supra. Then, the sensitivity classification, along with other attributes of the enterprise data file 184 (object ID 876A0), is stored as object metadata 314 in the metadata store 196.

Then, an intermediate version of the e-mail is generated. FIG. 3J shows a reference link 318, representing/identifying the actual enterprise data file 184 (object ID 876A0) attachment, being generated 300J by the web-based e-mail cloud service 144 for embedding an intermediate version of the e-mail. The intermediate version of the e-mail includes the reference link 318 in place of the actual enterprise data file 184 (object ID 876A0) attachment, identifies one or more recipients of the e-mail, and/or includes an e-mail body.

At the sending stage in FIG. 3K, when the user sends the intermediate version of the e-mail to the recipients via transmission 320, a multi-part policy is applied to the intermediate version. The multi-part policy is, for example, "prevent e-mailing to users outside the organization, if the content of the documents is sensitive". Since the intermediate version does not have the actual enterprise data file 184 (object ID 876A0) attachment and only includes the reference link 318 representing/identifying the file 184, the policy determination of whether the file 184 contains sensitive content cannot be made.

Figure 3L:
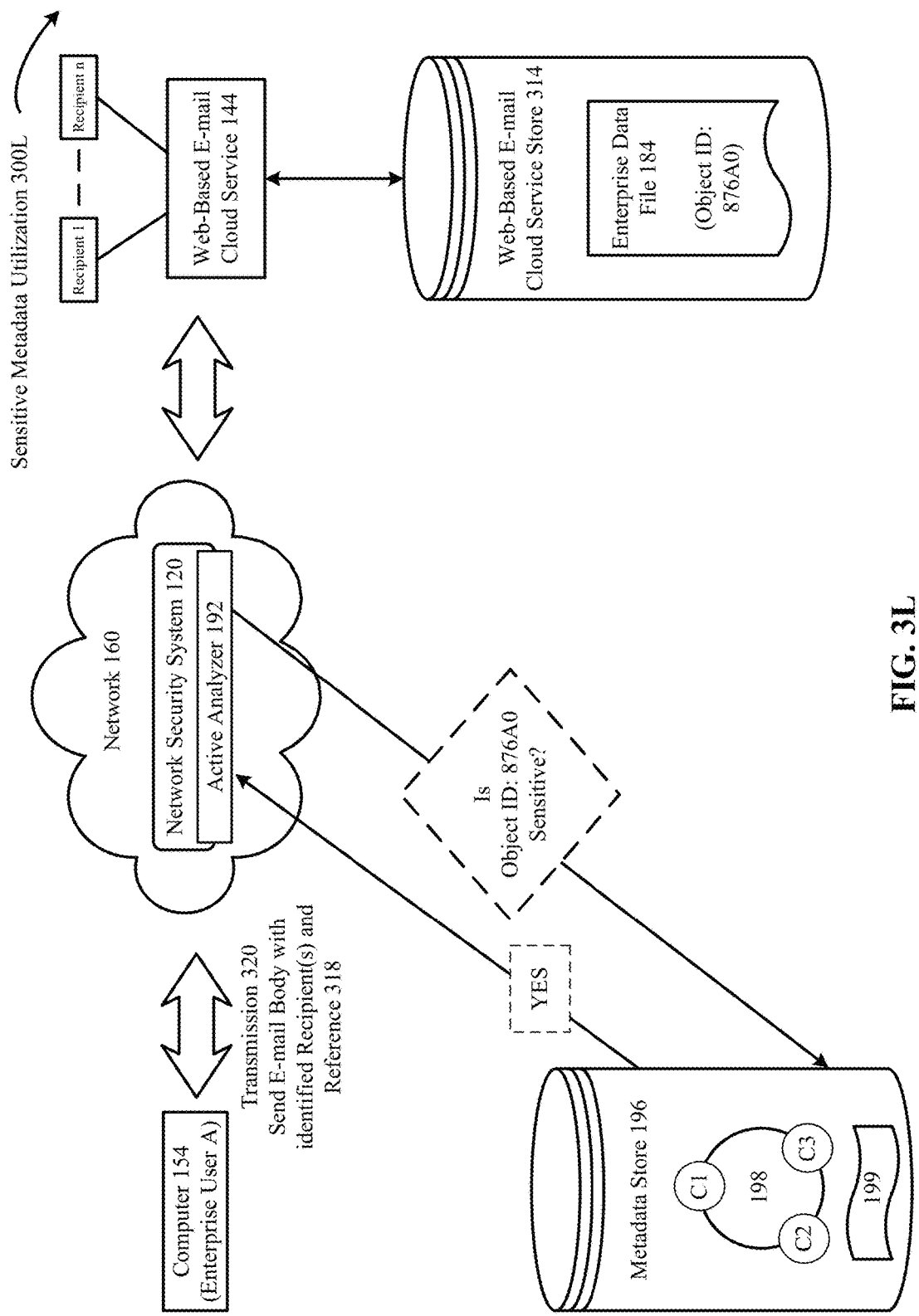
FIG. 3L illustrates one implementation of an active proxy analyzer accessing persisted metadata to enforce multi-part policies on data-deficient transactions like the web-based e-mail data-deficient transaction of FIG. 3K.

FIG. 3L depicts one implementation of an active proxy analyzer 192 accessing 300L persisted metadata to enforce multi-part policies on the web-based e-mail data-deficient transaction 300K. In the example shown in FIG. 3L, active analyzer 192 looks up the metadata store 196 to determine whether the object ID 876A0 is classified a sensitive document. Accordingly, the non-enforcement of the multi-part policy caused by the substitution of actual content with the reference link 318 is avoided because the policy determination of whether the content in enterprise data file 184 is sensitive is no longer dependent on the intermediate version of the e-mail, and can be reliably made by looking up the metadata store 196 for metadata of the enterprise data file 184 (object ID 876A0) persisted at the initial traversal of the enterprise data file 184 in FIG. 3I.

Figure 3M:
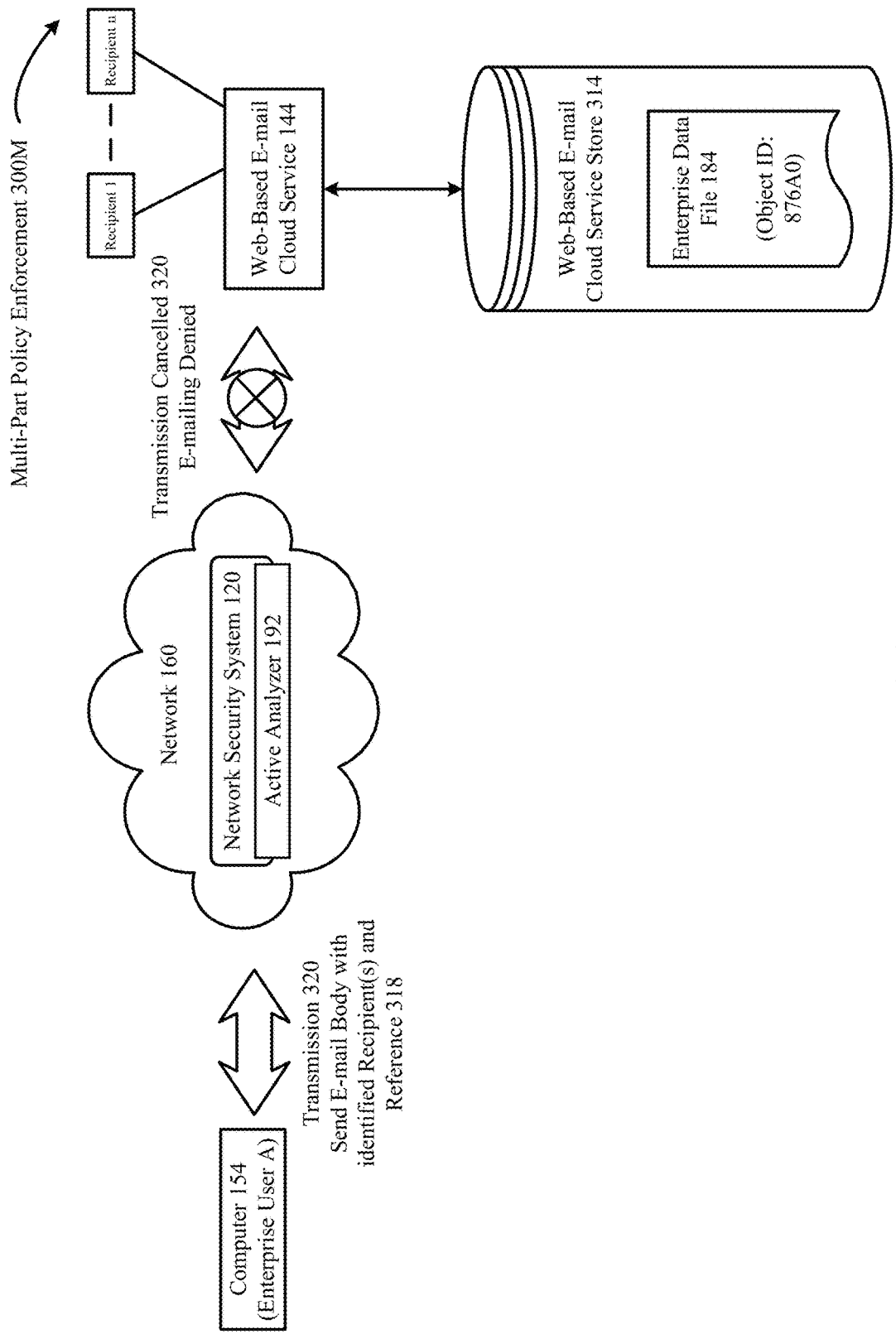
FIG. 3M is one implementation of enforcing a multi-part policy on the web-based e-mail data-deficient transaction of FIG. 3K based on object metadata accessed from a metadata store.

FIG. 3M is one implementation of enforcing 300M a multi-part policy on the web-based e-mail data-deficient transaction 300K based on object metadata 314 accessed from the metadata store 196. Assuming that the e-mail recipient(s) are outside the user's organization, and the metadata store 196 confirms that the enterprise data file 184 is sensitive, the multi-part policy is enforced and the enterprise data file 184 is not sent to the e-mail recipient(s), and the web-based e-mail data-deficient transaction 300K is cancelled at transmission 320.

Figure 3N:
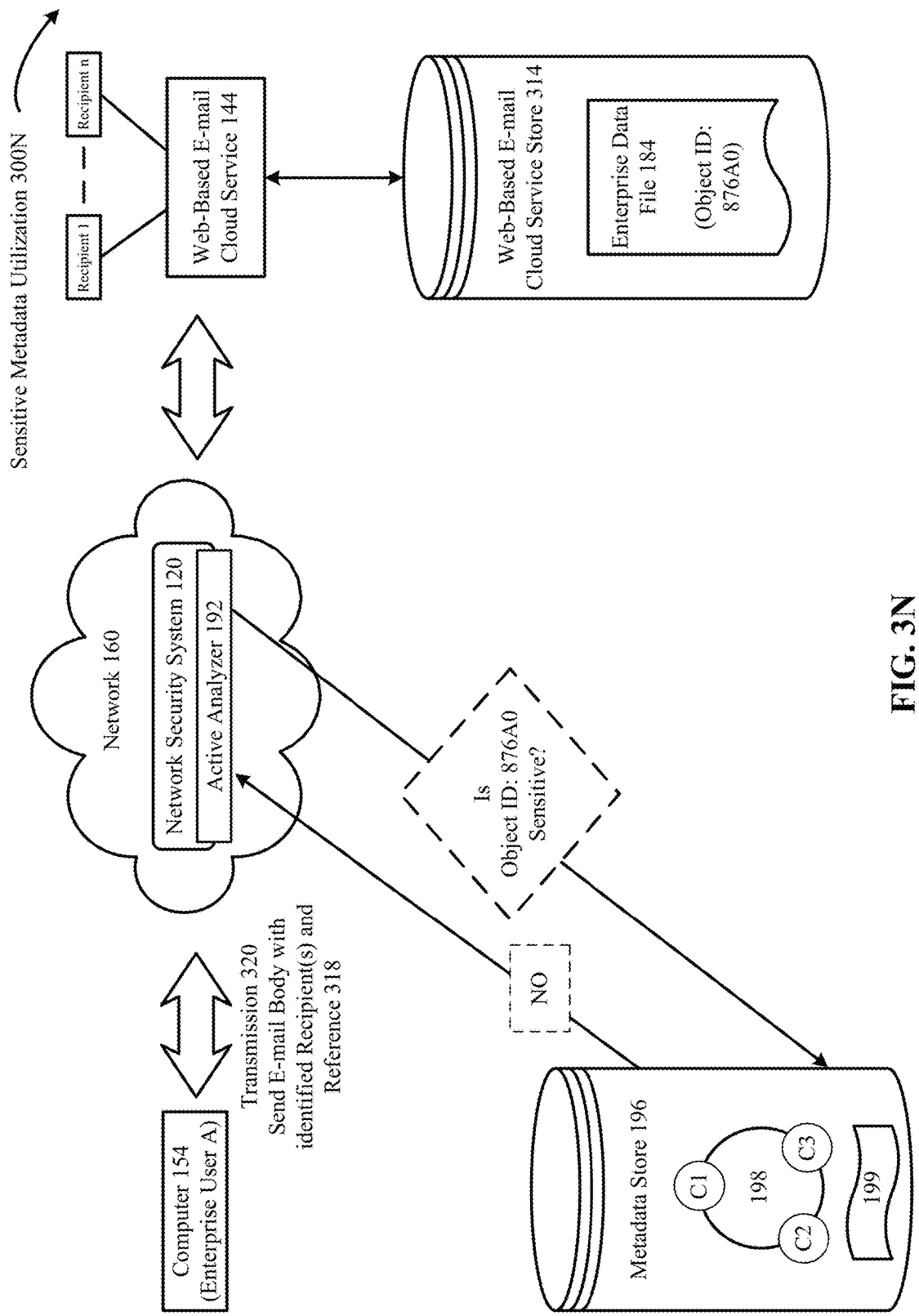
FIG. 3N shows another implementation of an active proxy analyzer accessing persisted metadata to enforce multi-part policies on data-deficient transactions like the web-based e-mail data-deficient transaction of FIG. 3K.
Figure 3O:
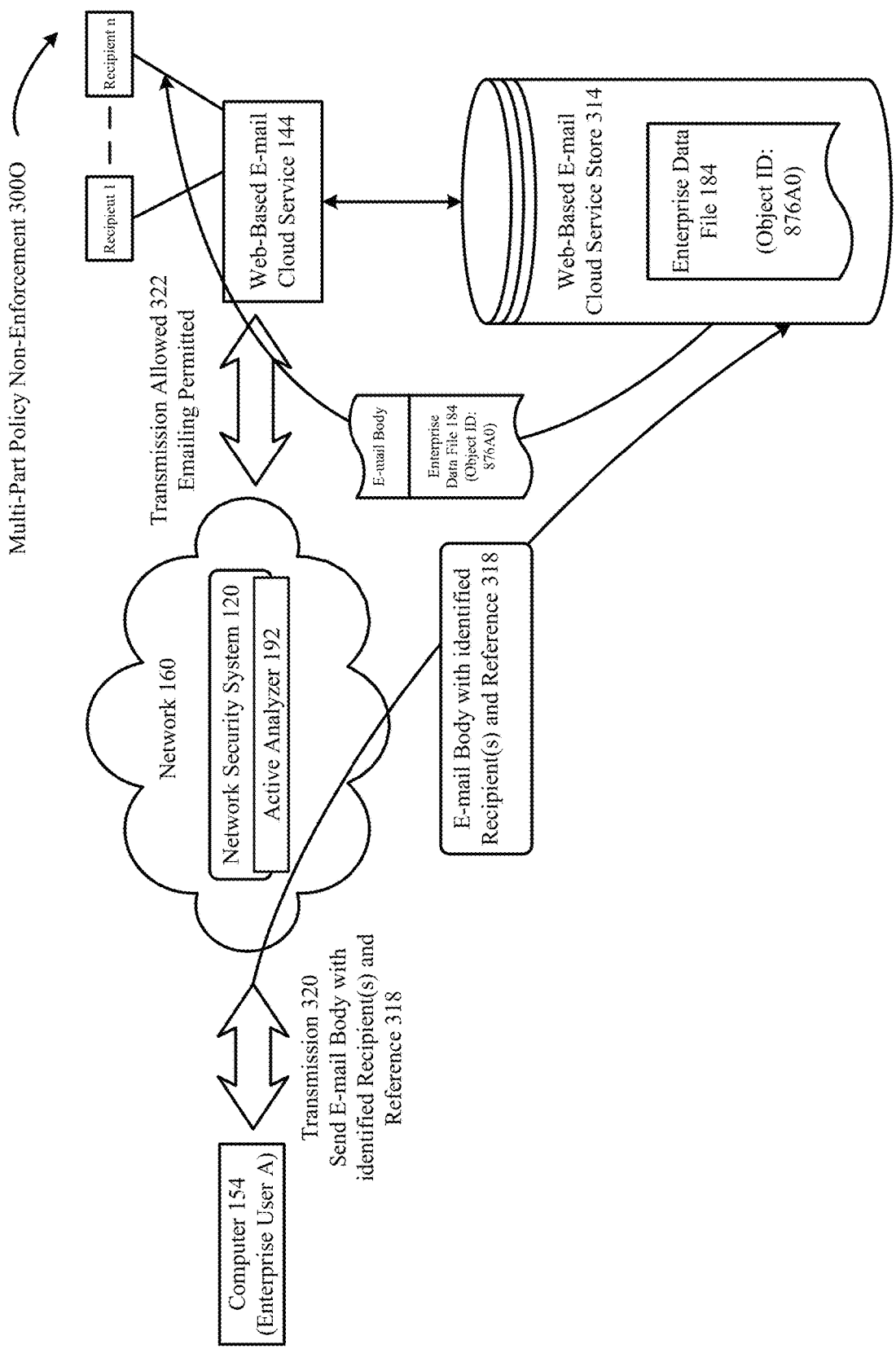
FIG. 3O depicts one implementation of not enforcing a multi-part policy on the web-based e-mail data-deficient transaction of FIG. 3K based on object metadata accessed from a metadata store.

In contrast, as shown in FIG. 3N, if the metadata store 196 confirms 300N that the enterprise data file 184 is not sensitive, then the multi-part policy is not enforced 300O and the enterprise data file 184 is sent to the e-mail recipient(s) via transmission 322. In one implementation, transmission 322 occurs over a communication protocol like SMTP and comprises the final version of the e-mail, which is created in part by using the reference link 318 to retrieve the actual attachment from the web-based e-mail cloud service store 314, as shown in FIG. 3O.

In other implementations, the inspective proxy analyzer 194 is used to enforce or apply a given policy or a multi-part policy on web-based e-mail data-deficient transactions.

Proxy-Bypassing Transactions

Figure 4A:
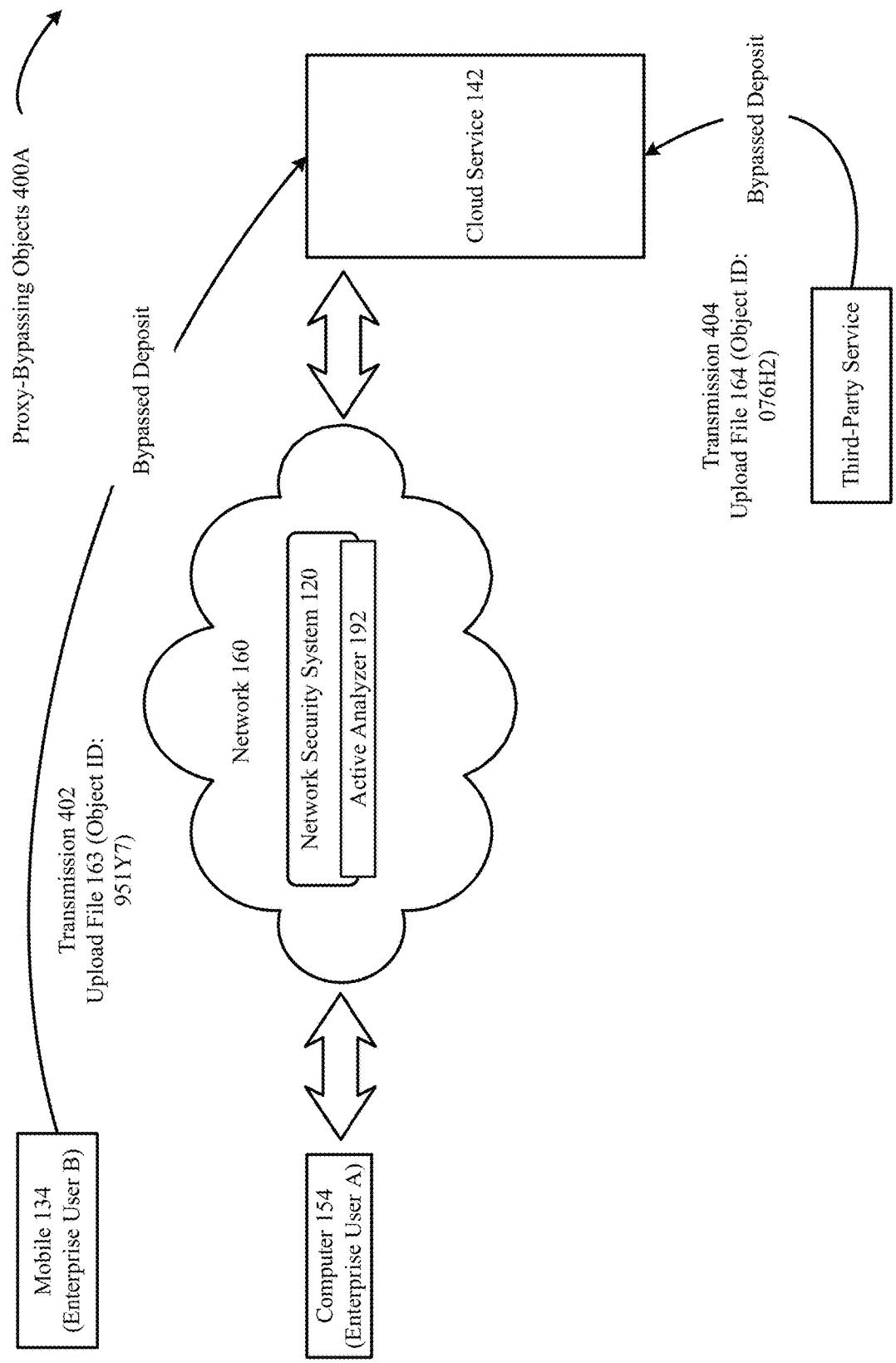
FIG. 4A illustrates one implementation of proxy-bypassing objects.

FIG. 4A illustrates one implementation of proxy-bypassing objects 400A. In particular, FIG. 4A shows deposits of content in a cloud service 142 by humans who are able to bypass an active proxy platform and machines that are not subject to the active proxy platform. In the example shown in FIG. 4A, enterprise user B uses a BYOD device mobile 134 to upload file 163 (object ID 951Y7) to the cloud service 142 via transmission 402. Consequently, transmission 402 does not traverse active analyzer 192 and thus qualifies as a "bypassed deposit".

Further, many popular cloud application vendors encourage ecosystems, or third-party applications that integrate with them to share data and enable solutions that one application by itself may not be able to achieve. Anchor tenant applications typically do this by providing application programming interfaces (APIs) to their ecosystem partners. By using those APIs, those partners can share data back and forth with the anchor tenant application. For example, the enterprise file-sharing and collaboration application, Box™, has an ecosystem of more than a thousand application partners that access and share content with Box™ to facilitate extended use cases such as electronic signature workflows, business intelligence reporting, and project management. It is important to note that, while an anchor tenant application like Box™ may have security features built in, its ecosystem applications may not be as enterprise-ready. Because those applications may share sensitive content, enterprises need to have similar visibility and control across not just the main application but the ecosystem as well. In the example shown in FIG. 4A, an ecosystem third-party service to the anchor cloud service 142 uploads file 164 (object ID 076H2) via transmission 404. Consequently, transmission 404 does not traverse active analyzer 192 and thus qualifies as a "bypassed deposit".

Combining Active Proxy Analysis with Inspection Analysis

Figure 4B:
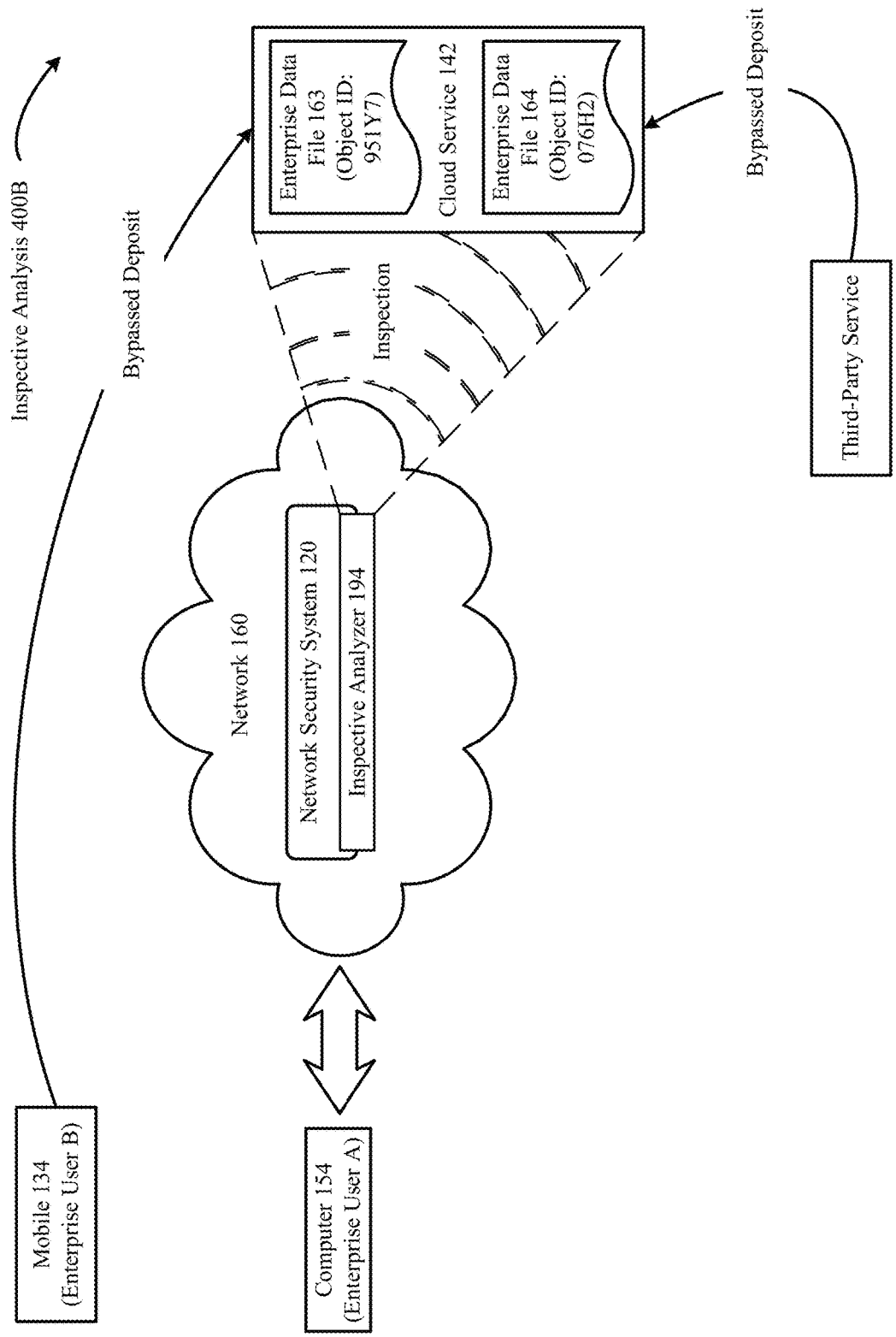
FIG. 4B depicts one implementation of inspective analyzer performing e-discovery on a cloud service.
Figure 4C:
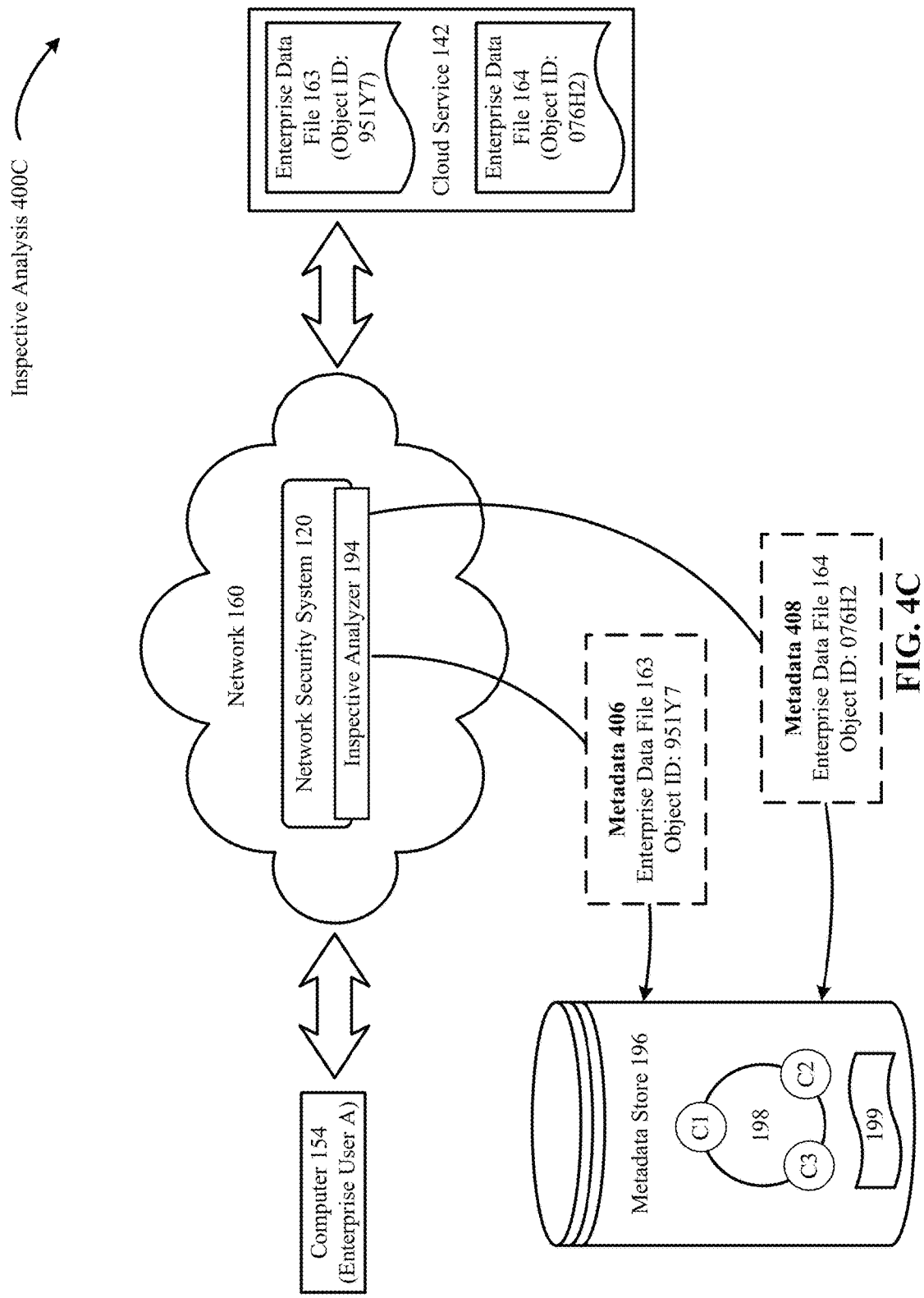
FIG. 4C is one implementation of an inspective service persisting object metadata of content objects retrieved from a cloud service.
Figure 4D:
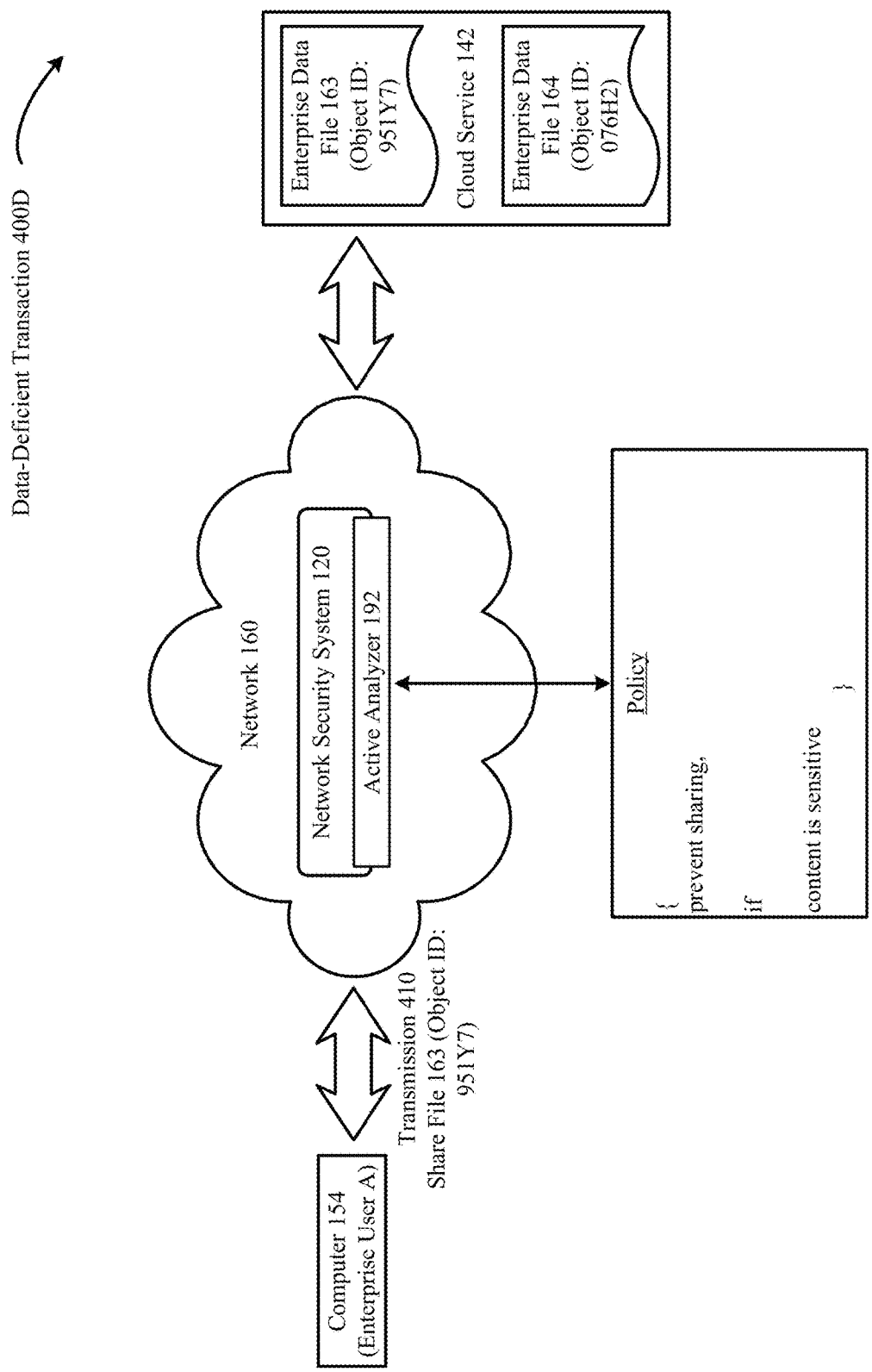
FIG. 4D illustrates one implementation of a data-deficient transaction.

FIG. 4B depicts one implementation of inspective analyzer 194 performing e-discovery 400B on a cloud service 142. As discussed supra, active analyzer 192 inspects content as it is being uploaded to and downloaded from the cloud. In contrast, the inspective analyzer 194 inspects content that resides in the cloud applications, regardless of when it was uploaded. During the e-discovery, inspective analyzer 194 inventories metadata about the objects stored in the cloud applications, as discussed supra, encrypts, or quarantine sensitive content that resides in the cloud applications. In one example, inspective analyzer 194 evaluates millions of files and folders and more than 300,000 users and retrieves the following types of metadata:

File name/owner/size/type
Application and instance name
File path
Audit trail with activity, user, access date
File version history
Encryption status
Shared link expiration
DLP policy triggers
External users and access to internal files
File access to external domains Further, inspective analyzer 194 triggers the following security actions:

DLP policies
Download files
Restrict access
Revoke access
Change ownership
Quarantine
Legal hold
Encrypt/decrypt
Notify original owner/end user
Secure collaboration FIG. 4C is one implementation of an inspective service persisting 400C object metadata of content objects retrieved from a cloud service 142. In the example shown in FIG. 4C, inspective analyzer 194 persists metadata 406 and 408 about enterprise data file 163 (object ID 951Y7) and enterprise data file 164 (object ID 076H2) in the metadata store 196. FIG. 4D illustrates one implementation of a data-deficient transaction 400D. In the example shown in FIG. 4D, an enterprise user A shares (via computer 154) enterprise data file 163 (object ID 951Y7) located in a cloud service 142 via transmission 410. Transmission 410 only references the enterprise data file 163 via object ID 951Y7 and does not include the body of the enterprise data file 163. FIG. 4D also shows a multi-part policy applied to the data-deficient transaction 400D. In the example shown in FIG. 4D, the multi-part policy is "prevent sharing of the file, if the content of the file is sensitive". However, active analyzer 192 does not have access to the content of enterprise data file 163 because enterprise user A has shared enterprise data file 163 only by a reference link i.e. object ID 951Y7 and not the actual enterprise data file 163 stored in the cloud service 142. As a result, the multi-party policy cannot be applied because the policy condition of whether the content in enterprise data file 163 is sensitive cannot be determined.

Figure 4E:
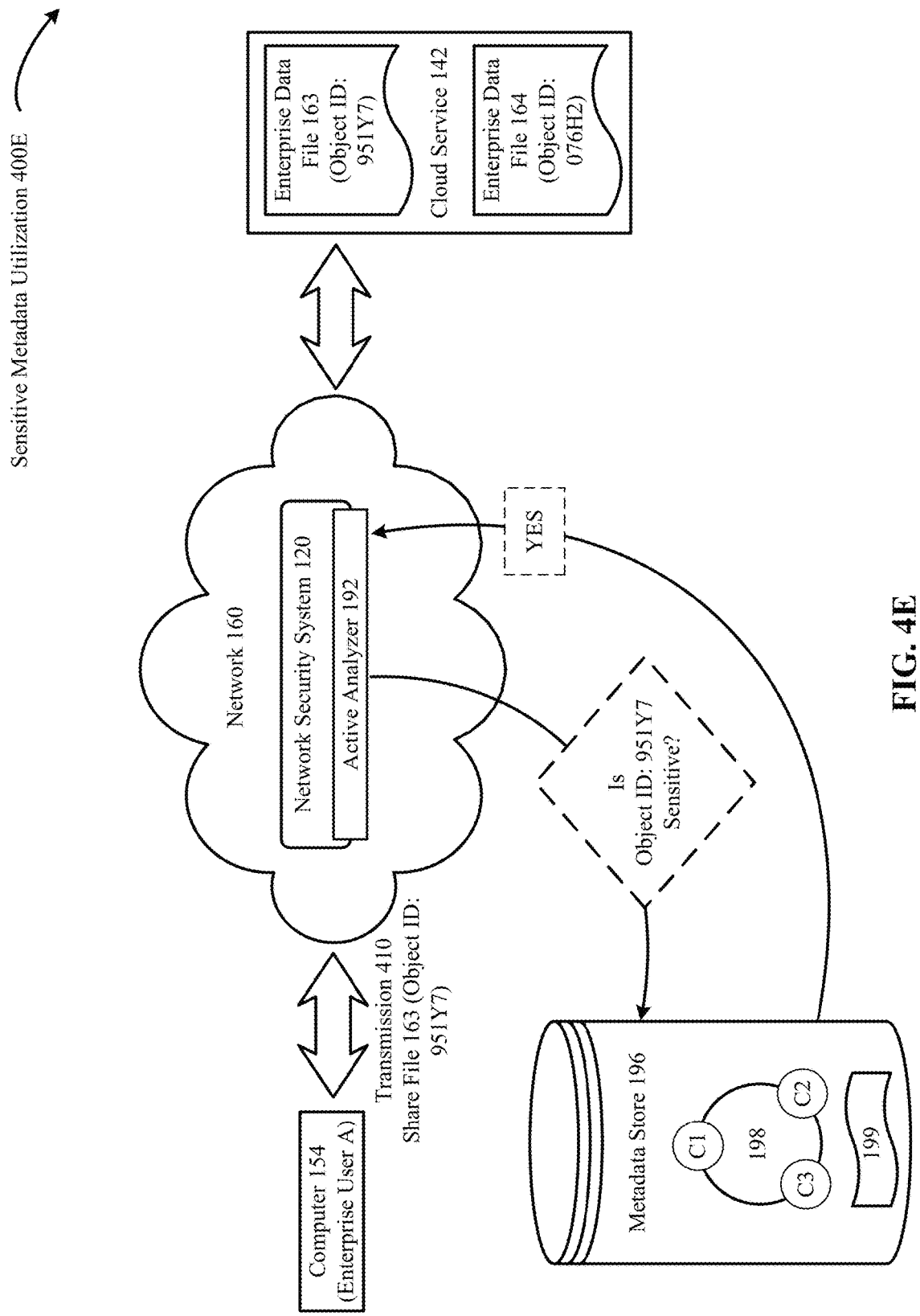
FIG. 4E depicts one implementation of an active proxy analyzer accessing metadata persisted by the inspective service in FIG. 4C to enforce multi-part policies on data-deficient transactions.
Figure 4F:
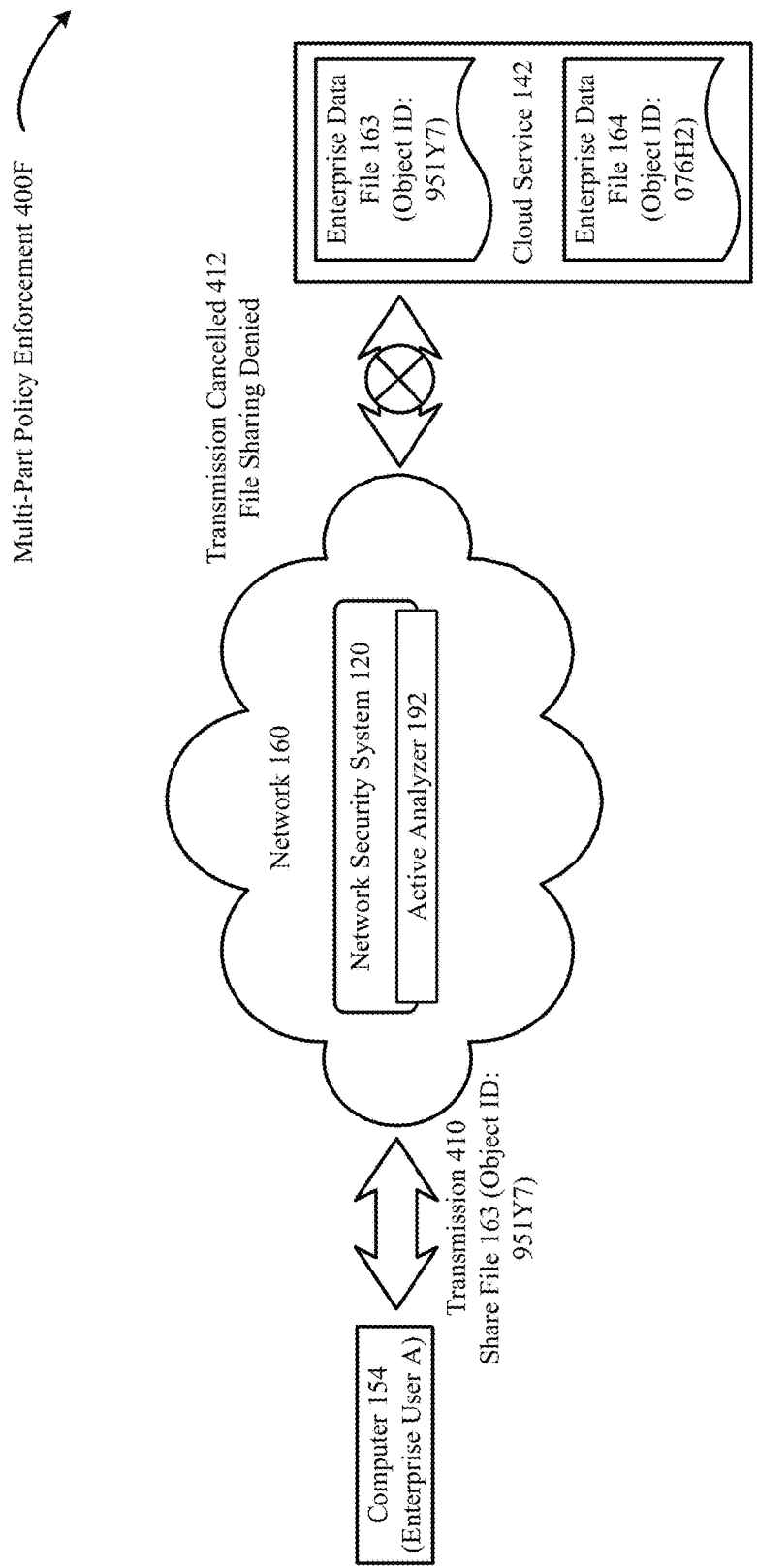
FIG. 4F is one implementation of enforcing a multi-part policy on a data-deficient transaction based on object metadata accessed from a metadata store and persisted by the inspective service in FIG. 4C.

The technology disclosed solves the technical problem of data-deficient transactions on which multi-part policies cannot be enforced by persisting and accessing object metadata that provides the data required to enforce the multi-part policies on the data-deficient transactions. FIG. 4E depicts one implementation of an active proxy analyzer accessing 400E persisted metadata to enforce multi-part policies on data-deficient transactions. In the example shown in FIG. 4E, active analyzer 192 looks up the metadata store 196 to determine whether the object ID 951Y7 is associated with a sensitive document. FIG. 4F is one implementation of enforcing 400F a multi-part policy on a data-deficient transaction based on object metadata accessed from a metadata store. When the metadata store 196 confirms that enterprise data file 163 is sensitive, the multi-part policy is enforced and the enterprise data file 163 is not shared and the data-deficient transaction 400D is cancelled at action 412.

Figure 4G:
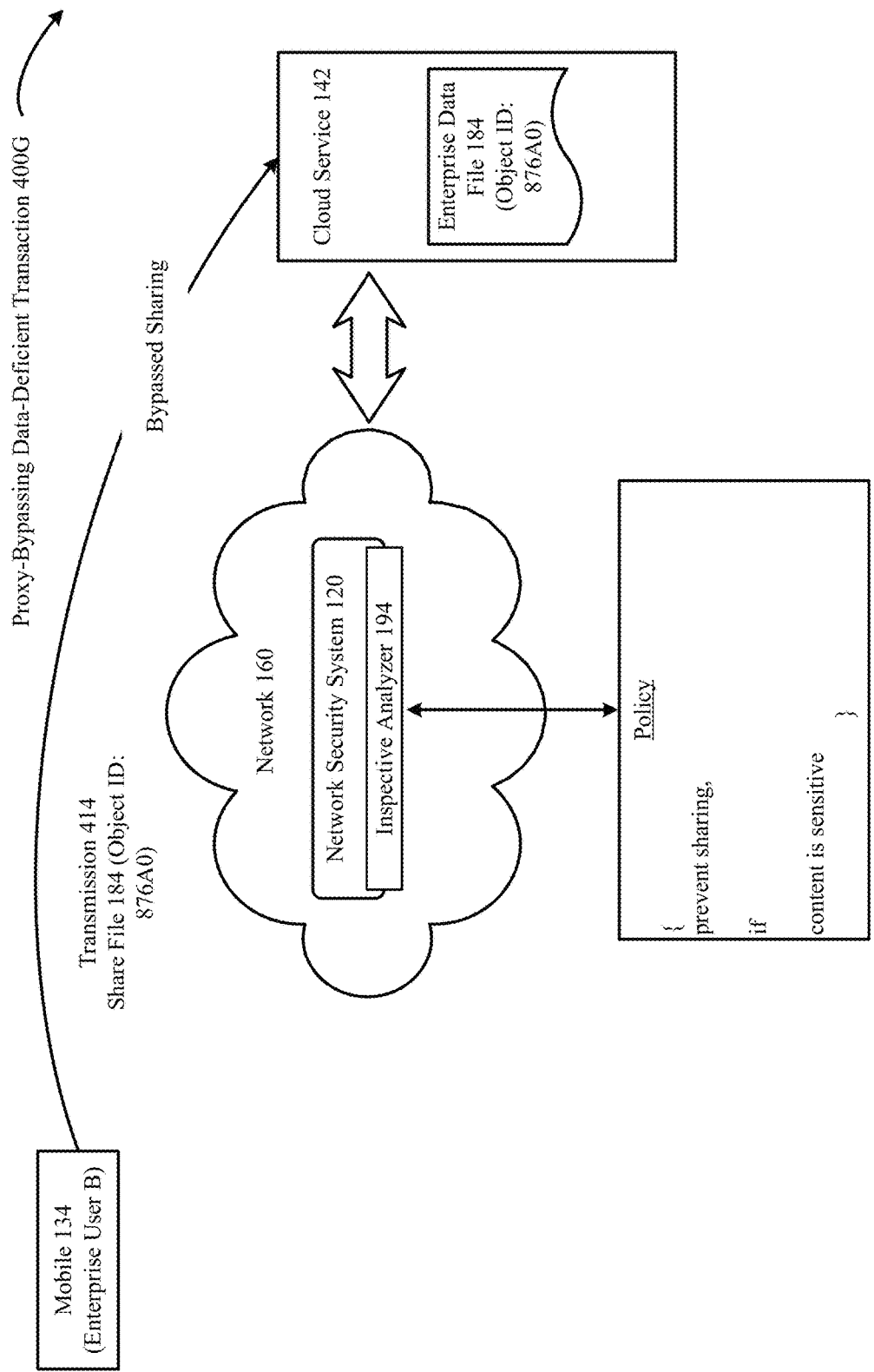
FIG. 4G illustrates one implementation of a proxy-bypassing data-deficient transaction analyzed by an inspective proxy analyzer instead of an active proxy analyzer.
Figure 4H:
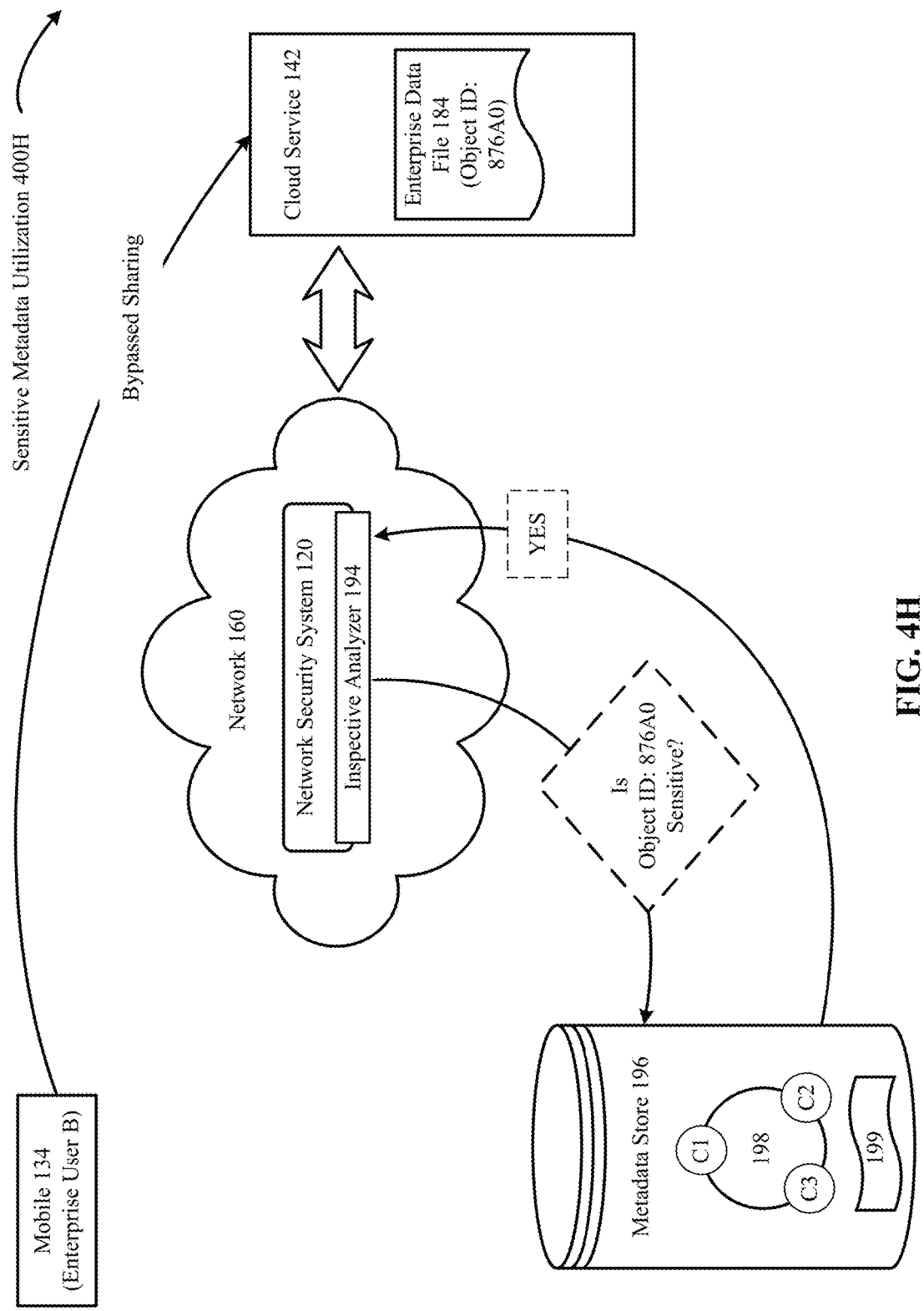
FIG. 4H depicts one implementation of an inspective proxy analyzer accessing metadata persisted by the active proxy analyzer in FIG. 2D to enforce multi-part policies on data-deficient transactions.

FIG. 4H depicts one implementation of an inspective proxy analyzer accessing metadata persisted by the active proxy analyzer in FIG. 2D to enforce multi-part policies on data-deficient transactions.

Figure 4I:
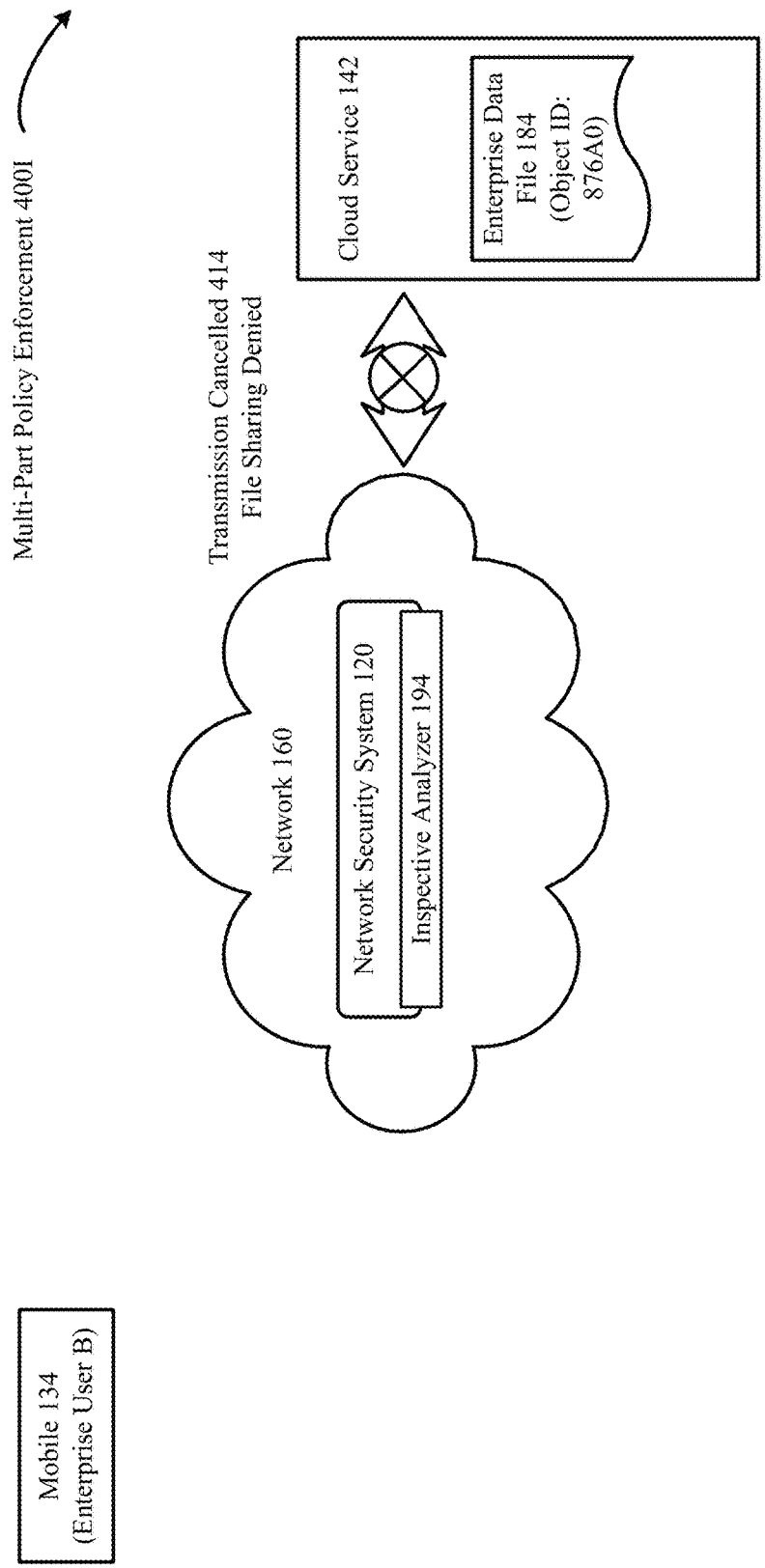
FIG. 4I is one implementation of an inspective proxy analyze enforcing a multi-part policy on a proxy-bypassing data-deficient transaction based on object metadata persisted by by the active proxy analyzer in FIG. 2D.

FIG. 4I is one implementation of an inspective proxy analyze enforcing a multi-part policy on a proxy-bypassing data-deficient transaction based on object metadata persisted by the active proxy analyzer in FIG. 2D.

FIG. 4G illustrates one implementation of a proxy-bypassing data-deficient transaction 400G analyzed by an inspective proxy analyzer 194 instead of an active proxy analyzer 192. In FIG. 4G, the proxy-bypassing data-deficient transaction 400G bypassed the active proxy analyzer 192 because it was initiated by an unmanaged device. In particular, FIG. 4G shows deposits of content in a cloud service 142 by humans who are able to bypass an active proxy platform (e.g., active proxy analyzer 192). In the example shown in FIG. 4G, enterprise user B uses a BYOD device mobile 134 to upload file 184 (object ID 876A0) to the cloud service 142 via transmission 414. Consequently, transmission 414 does not traverse the active analyzer 192 and thus qualifies as a "bypassed sharing".

FIG. 4G also shows a multi-part policy applied to the data-deficient transaction 400G by the inspective proxy analyzer 194. In the example shown in FIG. 4G, the multi-part policy is "prevent sharing of the file, if the content of the file is sensitive". However, inspective analyzer 194 does not have access to the content of enterprise data file 184 because enterprise user B has shared enterprise data file 184 only by a reference link i.e. object ID 876A0 and not the actual enterprise data file 184 stored in the cloud service 142. As a result, the multi-party policy cannot be applied because the policy condition of whether the content in enterprise data file 184 is sensitive cannot be determined.

The technology disclosed solves the technical problem of proxy-bypassing data-deficient transactions on which multi-part policies cannot be enforced by accessing object metadata persisted by the active proxy analyzer 192 (as discussed supra with reference to FIG. 2D and object ID 876A0), which provides the data required to enforce the multi-part policies on the proxy-bypassing data-deficient transactions. Accordingly, in implementations of the technology disclosed, metadata persisted in previous transactions is used to enforce multi-part policies on future data-deficient transactions and/or future trust-deficient transactions. The metadata persisted in the previous transactions can be persisted by the active proxy analyzer 192 (e.g., in FIG. 2D) and/or the inspective proxy analyzer 194 (e.g., in FIG. 4C).

FIG. 4H depicts one implementation of an inspective proxy analyzer 194 accessing 400H metadata persisted by the active proxy analyzer 192 (as discussed supra with reference to FIG. 2D and object ID 876A0) to enforce multi-part policies on proxy-bypassing data-deficient transaction 400G. In the example shown in FIG. 4H, inspective analyzer 194 looks up the metadata store 196 to determine whether the object ID 876A0 is associated with a sensitive document. FIG. 4I is one implementation of enforcing 400I a multi-part policy on proxy-bypassing data-deficient transaction 400G based on object metadata accessed from a metadata store. When the metadata store 196 confirms that enterprise data file 184 is sensitive, the multi-part policy is enforced and the enterprise data file 184 is not shared and the proxy-bypassing data-deficient transaction 400G is cancelled at transmission 414.

Process

Figure 5:
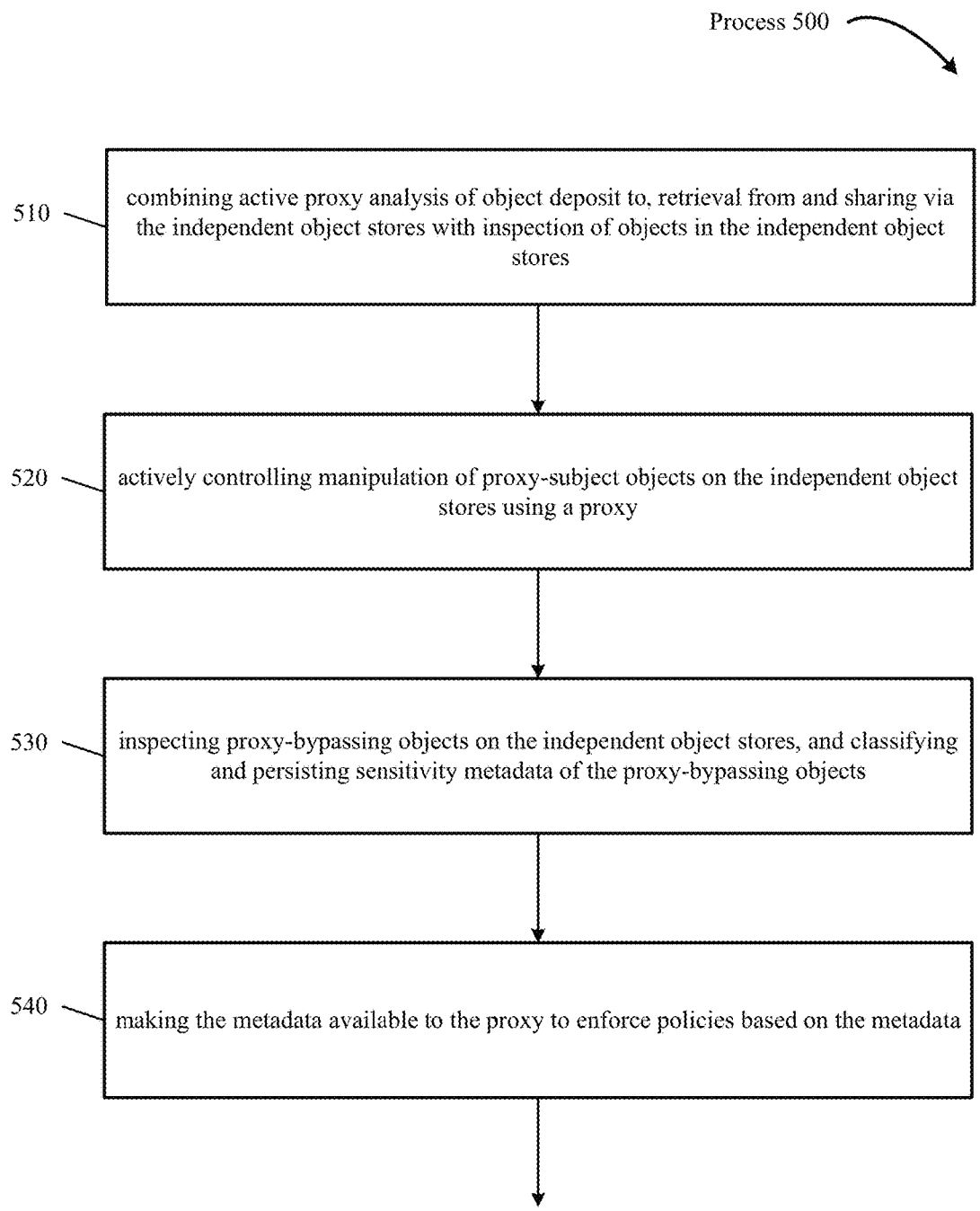
FIG. 5 is a representative method of establishing a middle ware object security layer between an organization's user systems and independent object stores.

FIG. 5 is a representative method of establishing a middle ware object security layer between an organization's user systems and independent object stores. Flowchart 500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, system architecture, deep API inspection, content monitoring, security actions, conclusion and particular implementations, etc.

FIG. 5 includes process 500 that begins at action 510, where active proxy analysis of object deposit to, retrieval from and sharing via the independent object stores is combined with inspection of objects in the independent object stores. Each of the analysis and inspection generating and persisting metadata of the objects. As discussed infra, an algorithm-based traffic analysis is performed that discovers cloud services interfacing with an organization's network by deep inspecting services transactions in real-time, including calls made to the services. In one implementation, the cloud service is hosted in at least one of a public cloud, a private cloud, and a private data center. In another implementation, the cloud service is at least one of a software as a service (SaaS), an infrastructure as a service (IaaS), and a platform as a service (PaaS).

Process 500 continues at action 520 where a proxy interposed between the user system systems and the independent object stores is used to actively control manipulation of proxy-subject objects on the independent object stores by applying rules that utilize the active proxy analysis and sensitivity metadata to actively control the deposit to and the retrieval from the independent object stores by the user systems. In one implementation, this is determined by evaluating an event log entry of the transaction during which the activity is performed, as discussed supra. In another implementation, an extraction engine 126 parses a data stream based on the CCS API and identifies activities that include manipulation of content, as discussed supra.

At action 530, proxy-bypassing objects on the independent object stores are classified and sensitivity metadata of the proxy-bypassing objects deposited to and retrieved by users able to bypass the proxy and machines not subject to the proxy is classified and persisted, as discussed supra.

At action 540, the metadata is made available to the proxy to enforce policies based on the metadata, as discussed supra.

In one implementation, the policy enforcement includes actively rejecting object sharing requests of first objects in the independent object stores by applying rules that utilize logs or current metadata store and the metadata to identify improper sharing of the first objects and using an application programming interface (API) to cancel the identified improper sharing of the first objects.

In another implementation, the policy enforcement includes retroactively cancelling object sharing of second objects from the independent object stores by inspecting logs or current metadata store from the independent object stores by applying rules that utilize logs or current metadata store and the metadata to identify improper sharing of the second objects and using an application programming interface (API) to cancel the identified improper sharing of the second objects.

In yet another implementation, the policy enforcement includes actively controlling retrieval of third objects from the independent object stores by applying rules that access object threat metadata that identifies the third objects as malicious and blocking retrieval of the identified malicious third objects.

In a further implementation, the policy enforcement includes actively controlling retrieval of fourth objects from the independent object stores by applying rules that access user system at-risk metadata that identifies user systems as compromised and blocking retrieval of the fourth objects by the identified at-risk user systems.

In another implementation, the policy enforcement includes actively controlling deposit of fifth objects to the independent object stores by applying rules that access user system at-risk metadata that identifies user systems as compromised and blocking deposit of the fifth objects by the identified at-risk user systems.

In yet another ransomware implementation, the policy enforcement includes preserving integrity of sixth objects in the independent object stores by persisting a true file type of sixth objects based on the active proxy analysis and/or inspection, determining changes in the true file type triggered by a malware like ransomware, Trojan horse, virus, and the like during the inspection of objects in the independent object stores, and triggering a security action in response to the determination.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Plane Points

Figure 6:
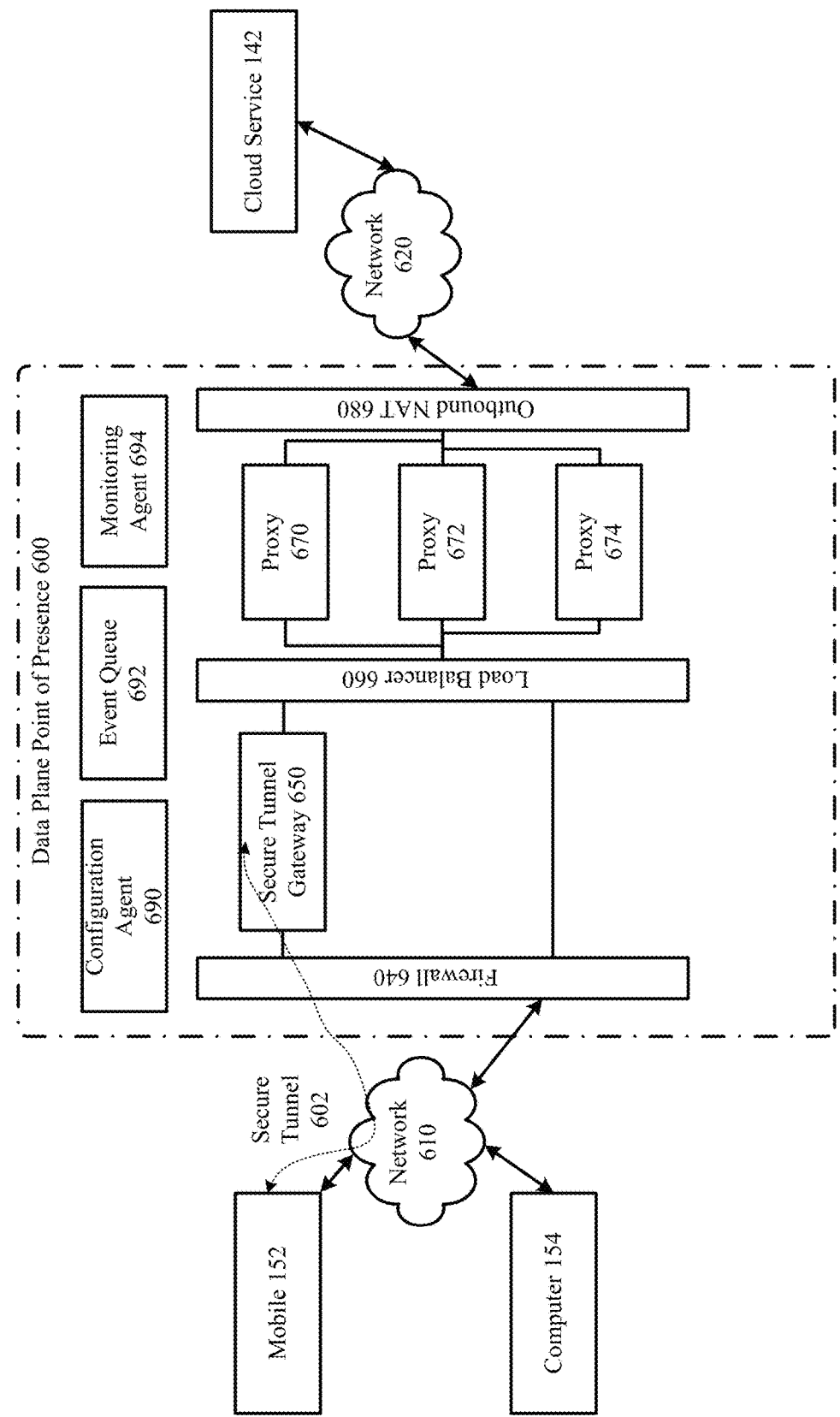
FIG. 6 portrays an architectural level schematic of a data plane point of presence.

FIG. 6 shows an architectural level schematic of a data plane point of presence (POP). FIG. 6 includes a data plane point of presence 600 (dashed-dotted box) connected to network 610 and network 620. These can be the same networks or different networks. Network 610 is also connected to client devices 150 such as mobile 152 and computer 154. Network 620 is connected to the cloud service 142. The data plane functionality is implemented according to one implementation with multiple computers, storage, and networking gear across multiple POPs such as data plane POP 600. The elements of data plane POP 600 include a firewall 640, a secure tunnel gateway 650 (see discussion of mobile clients, supra), a load balancer 660, multiple proxies 670, 672, and 674 (each proxy implements the policies according to the current configuration), and an outbound NAT 680. The architecture can be further scaled, e.g. multiple firewalls, etc. The proxies 670, 672 and 674 implement the specific policy, e.g. drop, reset, redirect, requests (or entire flows), as well as generate the logging messages.

The data plane POP 600 also includes a configuration agent 690 for receiving configuration and policy information from the management plane, an event queue 692 for recording and/or storing events to be sent to the management plane, and a monitoring agent 694 for monitoring the performance and status of the data plane POP 600. These items are generally coupled in communication with one or more management plane POPs, e.g. management plane POP 700 of FIG. 7, as well as the other elements of the data plane (not shown in order to focus on the data flow). Similarly, the configuration systems are not shown here. The difference between configuration and policy is that configuration information is information provided by the operator of the network security system 120, e.g. how many data plane POPs to have active, what version of the proxy software to load, etc., while policy information is provided by administrative users of the system, e.g. corporate IT personnel.

Also shown in FIG. 6 is an example of the secure tunnel 602 used by mobile 152 and other mobile clients. In contrast, the data from computer 154 is routed directly from the firewall 640 to the load balancer 660. As discussed some client types use secure tunnels (here one is being used for mobile) and others do not (here one without a secure tunnel is being used for the computer).

Figure 7:
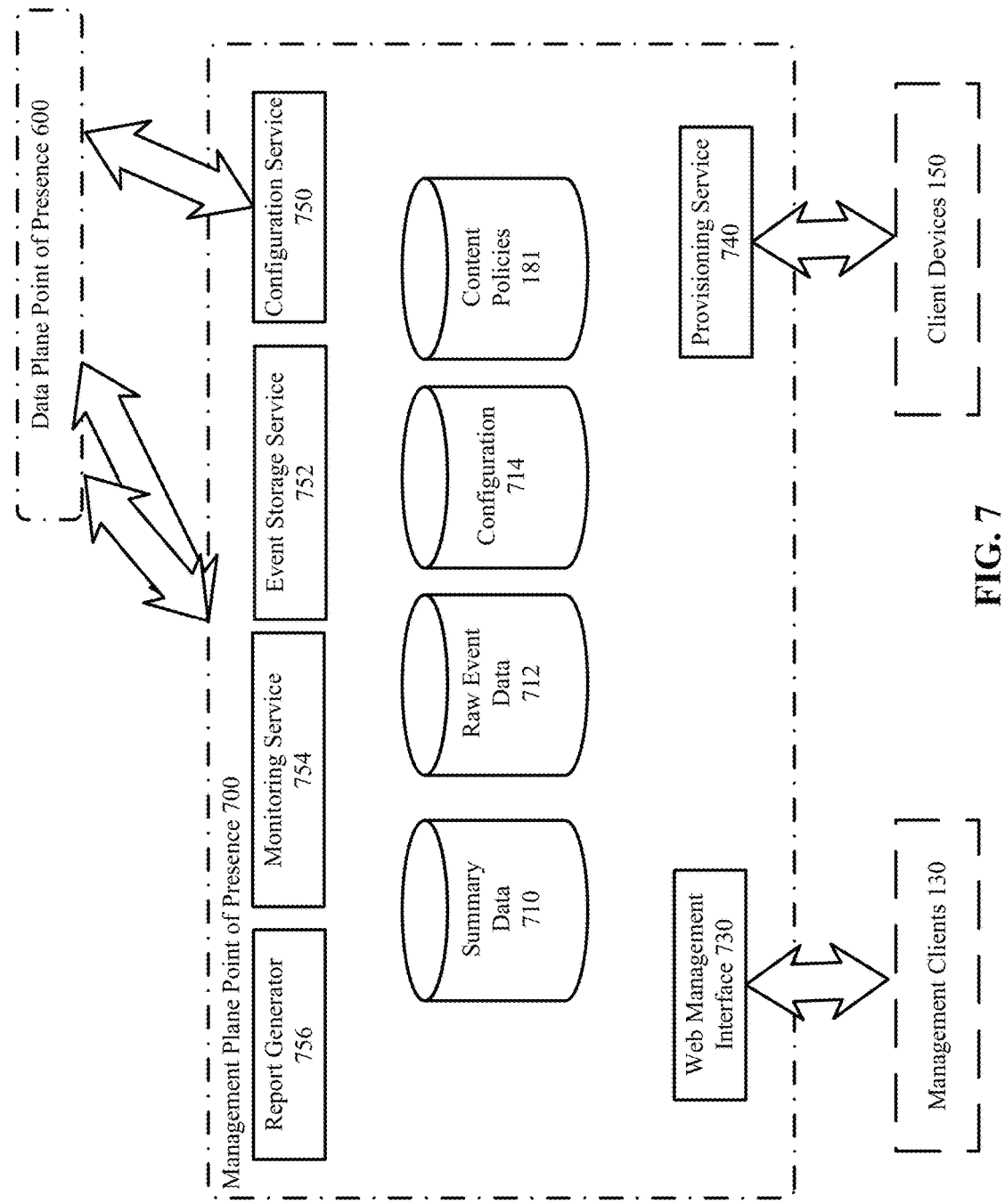
FIG. 7 depicts an architectural level schematic of a management plane point of presence.

FIG. 7 shows an architectural level schematic of a management plane point of presence. FIG. 7 includes a management plane POP 700 to implement the management plane 129 functionality. Some implementations may have only a single management plane POP, while others may have multiple POPs. The inter-relationship and communications with the data plane POP 600 are shown in FIG. 7 with large double-headed arrows. The communications between management clients 131 and the client devices 150 and the management plane POP 700 are similarly represented.

Management plane POP 700 includes: summary data 710, raw event data 712, configuration 714, policies 181, web management interface 730, provisioning service 740, configuration service 750, event storage service 752, monitoring service 754, and report generator 756. The services bridge the management/data planes: configuration service 750 communicates with configuration agent 690; event storage service 752 communicates with event queue 692; monitoring service 754 communicates with configuration agent 690. The report generator 756 is a management-plane-only item in this implementation, combing the raw event data 712 to generate summary data 710 for reporting. The web management interface 730 enables administration and reporting via web browsers. The provisioning service 740 provides client devices with the appropriate client (e.g. client 155 or VPN on demand 158 from clients 185) as discussed, supra, for configuration. The provisioning service 740 may also be responsible for providing policy updates to client devices 150. In other implementations, event storage service 752 and/or monitoring service 754 may accept data directly from cloud services and/or other sources for unified logging and reporting.

While architectures 600-700 are described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Metadata Models

Figure 8:
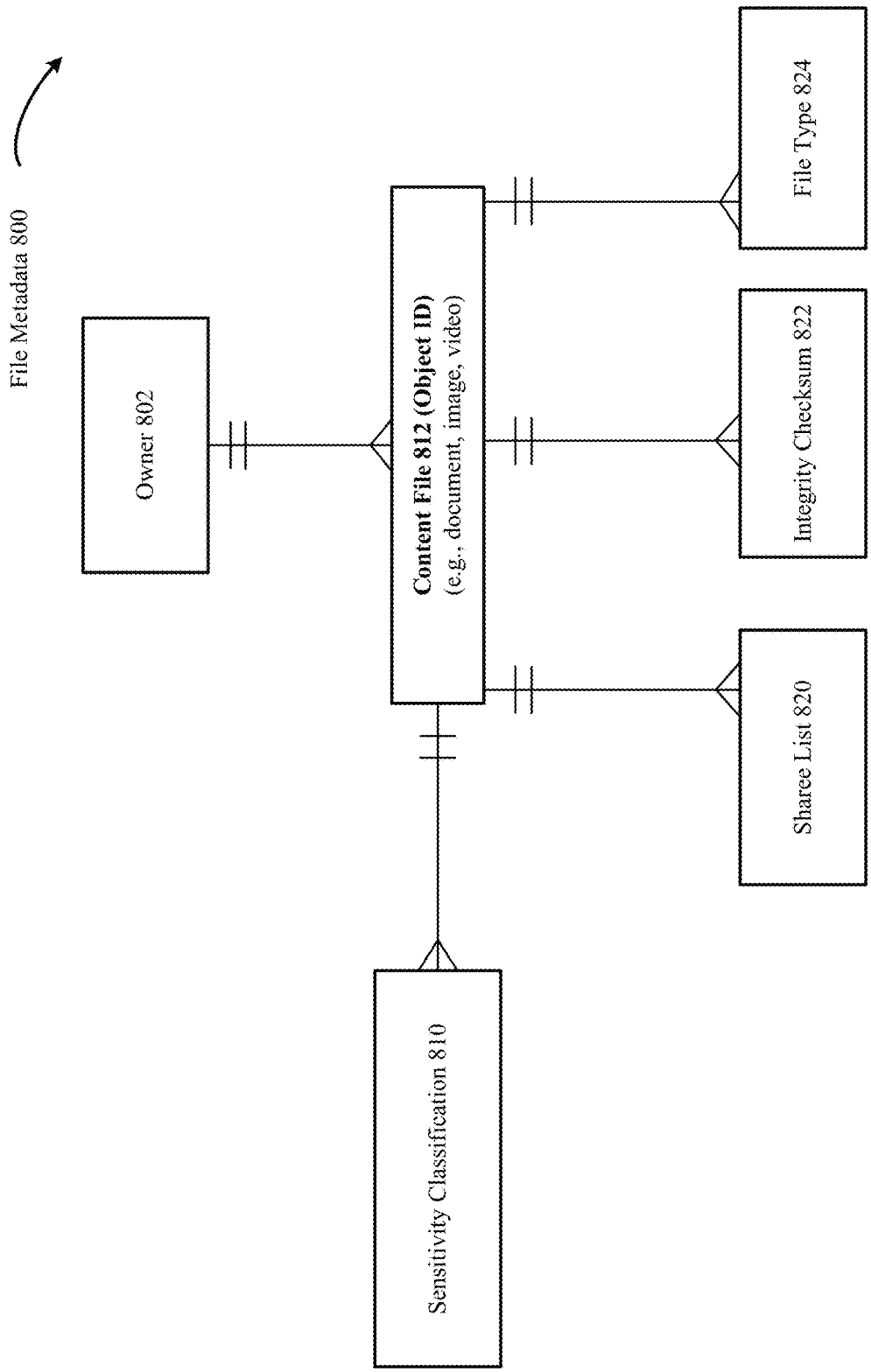
FIG. 8 shows a high level view of the data model of a file in accordance with an implementation of the technology disclosed.

FIG. 8 shows a high level view of the data model 800 of a file in accordance with an implementation of the technology disclosed. Data model 800 serves as a schema that describes various attributes of a file. In particular, FIG. 8 shows that a content file 812 such as a document, image, or video is identified by an object ID. Further, content file 812 is also stored with a sensitivity classification identifier 810, owner identifier 802, share list 820, a unique integrity checksum 822 based on secure hash algorithms and message digest algorithms like MD5, SHA-256, SHA-384, SHA-512, HAVAL 160, and CRC and a file type 824. FIG. 8 is only one possible data model used by an implementation; other data models may be used. It should be understood that the data model in FIG. 8 can be implemented in one or more databases, object relational mapping (ORM) systems, and/or any other appropriate data storage. If a SQL-style database is used, each box in FIG. 8 loosely corresponds to a table with rows of the tables containing the appropriate contents. The data and data model of FIG. 8 is stored in the Cassandra cluster 198 or Hadoop cluster 199 and assembled by active analyzer 192 and inspective analyzer 194. In other implementations, different database architectures are used to store the data and data model of FIG. 8 such as MongoDB, CouchDB, Redis, Riak, Couchbase, OrientDB, Aerospike, Neo4j, Hypertable, ElasticSearch, Accumulo, VoltDB, Scalaris, RethinkDB, and others.

Figure 9:
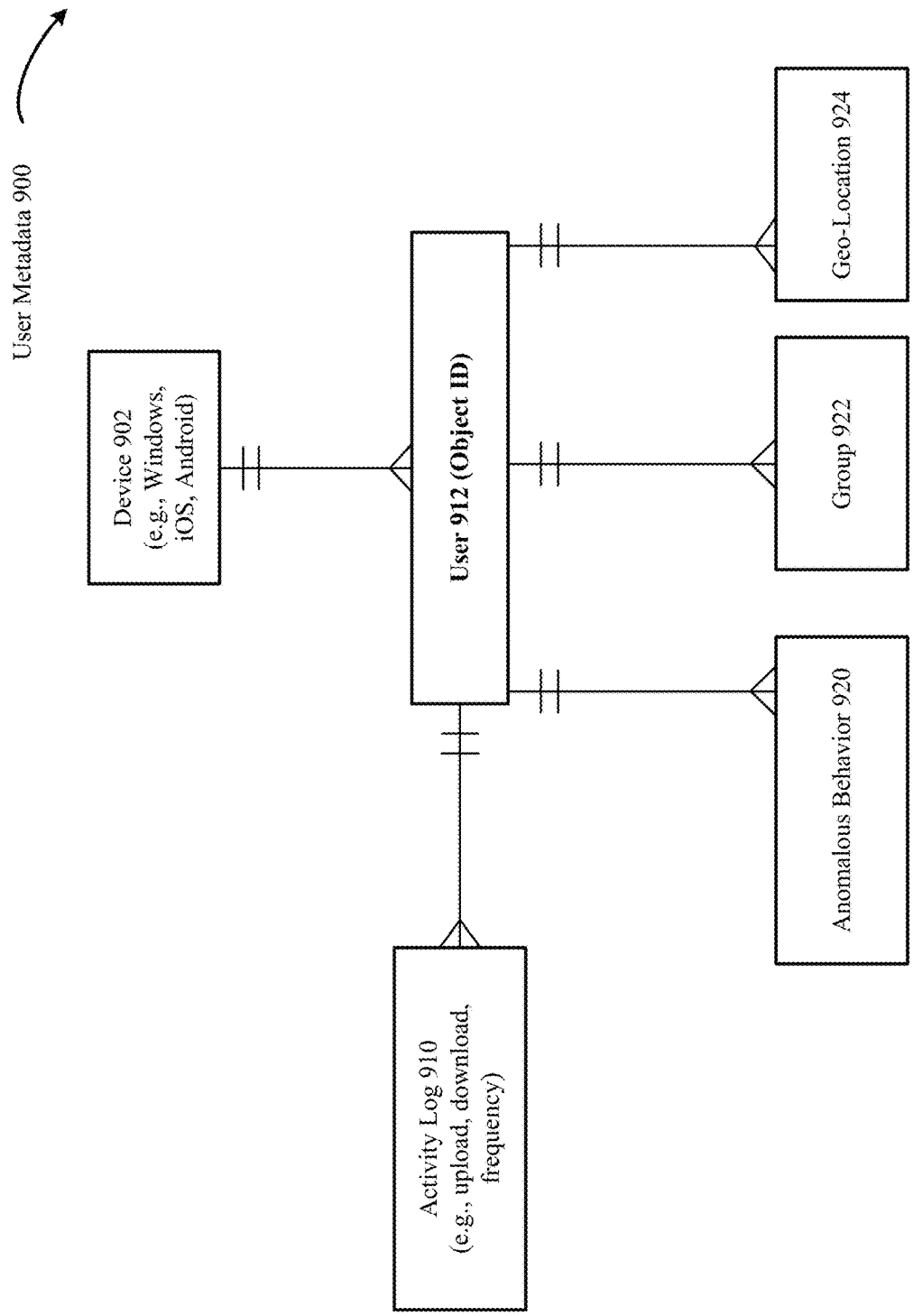
FIG. 9 shows a high level view of the data model of a user in accordance with an implementation of the technology disclosed.

FIG. 9 shows a high level view of the data model 900 of a user in accordance with an implementation of the technology disclosed. Data model 900 serves as a schema that describes various attributes of an enterprise user. In particular, FIG. 9 shows that a user 912 is identified by an object ID. Further, various attributes of user 912 are also identified, including the device type 902 used by the user 912, activity log 910 of the user 912, anomalous behavior 920 of the user 912, the group 922 to which the user 912 belongs, and geo-location 924 of the user 912. FIG. 9 is only one possible data model used by an implementation; other data models may be used. It should be understood that the data model in FIG. 9 can be implemented in one or more databases, object relational mapping (ORM) systems, and/or any other appropriate data storage. If a SQL-style database is used, each box in FIG. 9 loosely corresponds to a table with rows of the tables containing the appropriate contents. The data and data model of FIG. 9 is stored in the Cassandra cluster 198 or Hadoop cluster 199 and assembled by active analyzer 192 and inspective analyzer 194.

Figure 10:
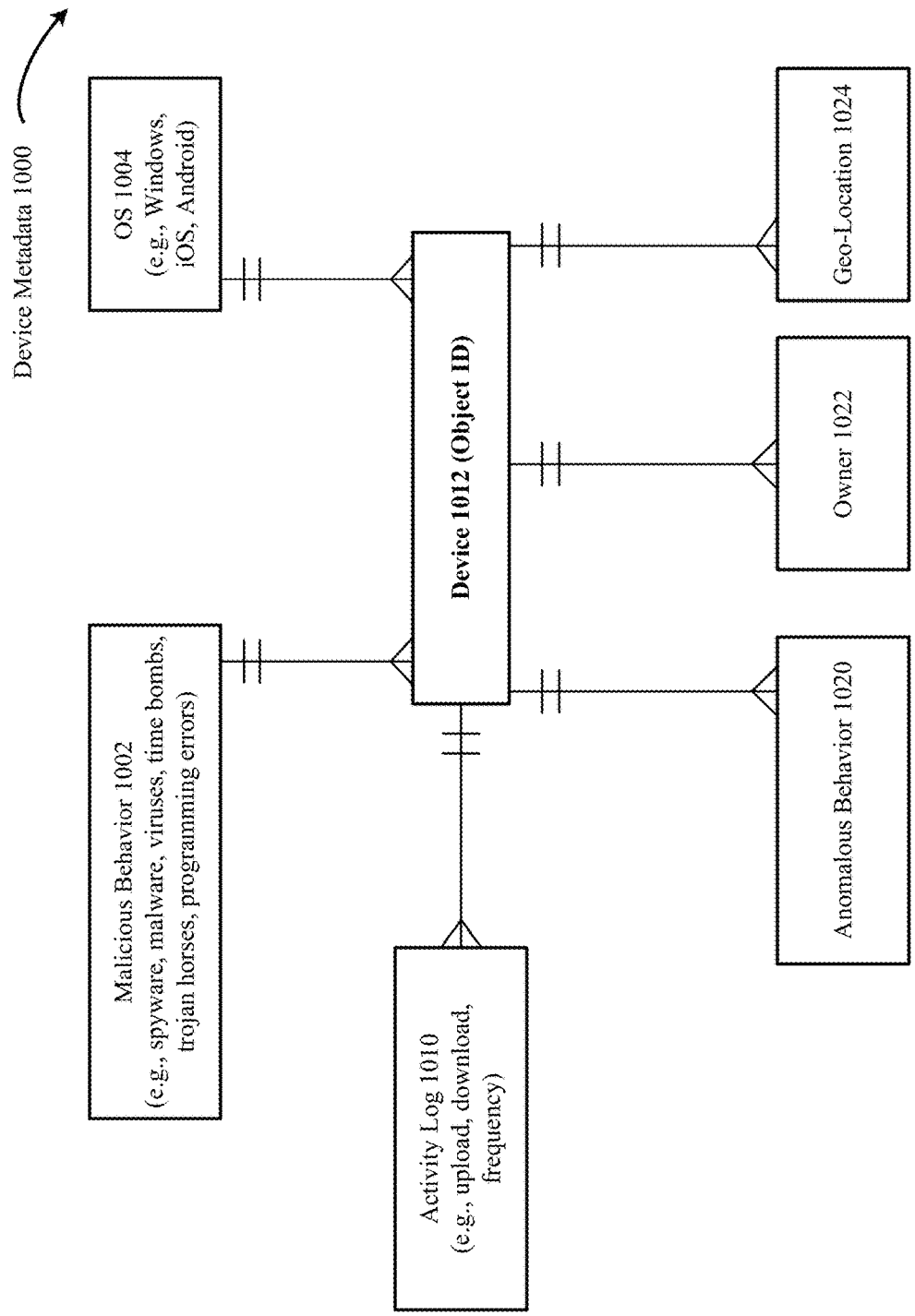
FIG. 10 shows a high level view of the data model of a device in accordance with an implementation of the technology disclosed.

FIG. 10 shows a high level view of the data model 1000 of a device in accordance with an implementation of the technology disclosed. Data model 1000 serves as a schema that describes various attributes of an enterprise device. In particular, FIG. 10 shows that a user 1012 is identified by an object ID. Further, various attributes of device 1012 are also identified, including operating system (OS) 1004 of the device 1012, activity log 1010 of the device 1012, malicious behavior 1002 of the device 1012, anomalous behavior 1020 of the device 1012, owner 1022 of the device 1012, and geo-location 1024 of the device 1012. FIG. 10 is only one possible data model used by an implementation; other data models may be used. It should be understood that the data model in FIG. 10 can be implemented in one or more databases, object relational mapping (ORM) systems, and/or any other appropriate data storage. If a SQL-style database is used, each box in FIG. 10 loosely corresponds to a table with rows of the tables containing the appropriate contents. The data and data model of FIG. 10 is stored in the Cassandra cluster 198 or Hadoop cluster 199 and assembled by active analyzer 192 and inspective analyzer 194.

Figure 11:
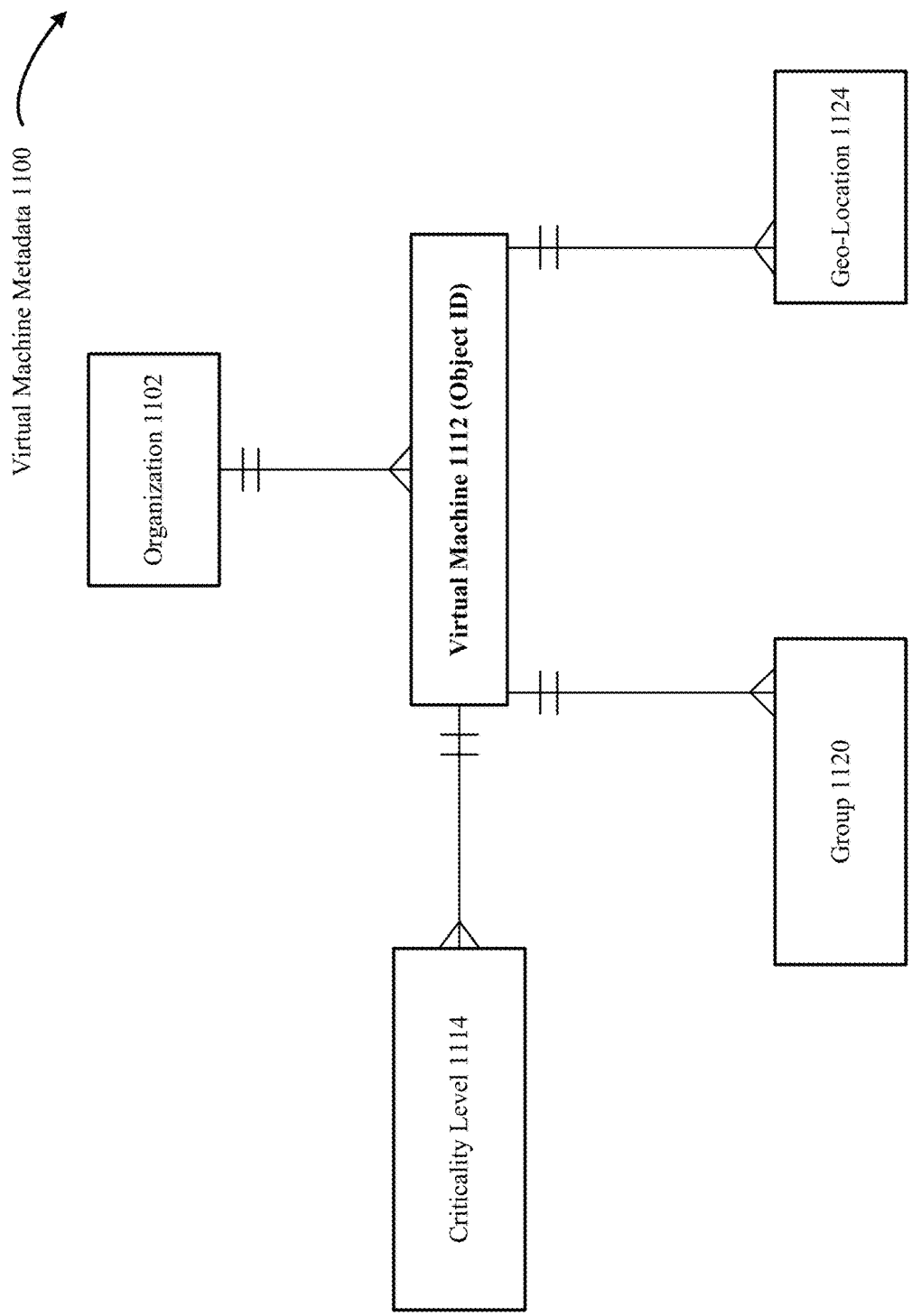
FIG. 11 shows a high level view of the data model of a virtual machine (VM) in accordance with an implementation of the technology disclosed.

FIG. 11 shows a high level view of the data model 1100 of a virtual machine (VM) in accordance with an implementation of the technology disclosed. Data model 1100 serves as a schema that describes various attributes of a VM. In particular, FIG. 11 shows that a VM 1112 is identified by an object ID. Further, various attributes of VM 1112 are also identified, including organization 1102 that owns the VM 1112, criticality level 1114 of the VM 1112, group 1120 to which VM 1112 belongs, and geo-location 1124 of the VM 1112. FIG. 11 is only one possible data model used by an implementation; other data models may be used. It should be understood that the data model in FIG. 11 can be implemented in one or more databases, object relational mapping (ORM) systems, and/or any other appropriate data storage. If a SQL-style database is used, each box in FIG. 11 loosely corresponds to a table with rows of the tables containing the appropriate contents. The data and data model of FIG. 11 is stored in the Cassandra cluster 198 or Hadoop cluster 199 and assembled by active analyzer 192 and inspective analyzer 194.

Figure 12:
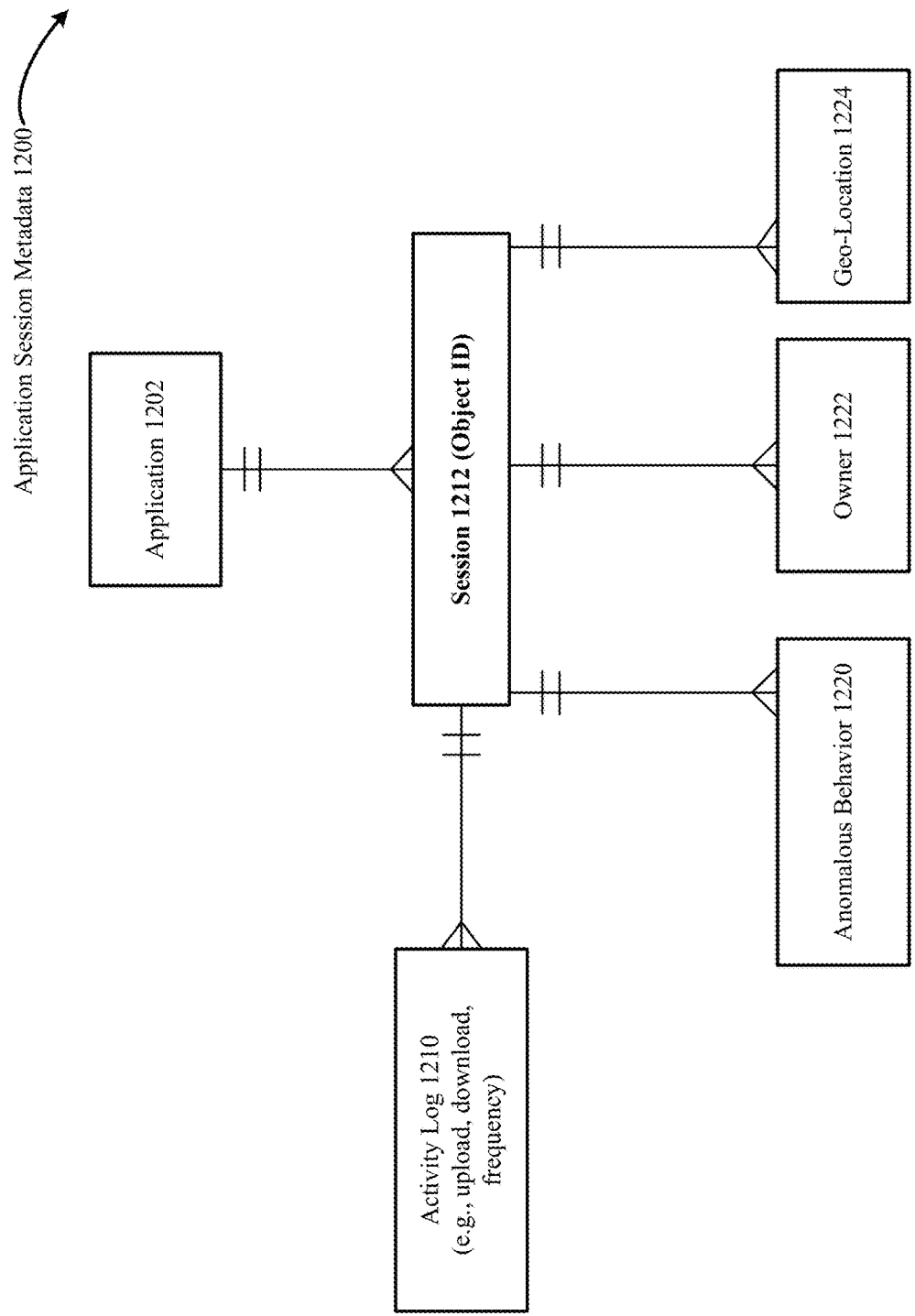
FIG. 12 shows a high level view of the data model of an application session in accordance with an implementation of the technology disclosed.

FIG. 12 shows a high level view of the data model 1200 of an application session of an application 1202 in accordance with an implementation of the technology disclosed. Data model 1200 serves as a schema that describes various attributes of an application session. In particular, FIG. 12 shows that a session 1212 is identified by an object ID. Further, various attributes of session 1212 are also identified, including activity log 1210 of the session 1212, anomalous behavior 1220 of the session 1212, owner of the session 1222, and geo-location 1224 of the session 1212. FIG. 12 is only one possible data model used by an implementation; other data models may be used. It should be understood that the data model in FIG. 12 can be implemented in one or more databases, object relational mapping (ORM) systems, and/or any other appropriate data storage. If a SQL-style database is used, each box in FIG. 12 loosely corresponds to a table with rows of the tables containing the appropriate contents. The data and data model of FIG. 12 is stored in the Cassandra cluster 198 or Hadoop cluster 199 and assembled by active analyzer 192 and inspective analyzer 194.

FIG. 13 illustrates object metadata being stored in a Cassandra data model 1300 in accordance with an exemplary implementation of the technology disclosed. Cassandra data model 1300 is described as one example of database architecture in which object metadata can be stored. In other implementations of the technology disclosed, different database architectures can be used to store object metadata, for example, MongoDB, CouchDB, Redis, Riak, Couchbase, OrientDB, Aerospike, Neo4j, Hypertable, ElasticSearch, Accumulo, VoltDB, Scalaris, RethinkDB, and others. Cassandra data model 1300 uses the first column name as the partition key. For example, in FIG. 13, the "object_id" 1302, which uniquely represents a content object, is the primary key and is used as a partitioning key that determines on which node C1-C3 of the Cassandra cluster 198. Cassandra data model 1300 also includes one or more additional columns that determine clustering, referred to as "clustering columns". In FIG. 13, the "attribute_1" 1304 is the clustering column. The data for each partition is clustered by the remaining column or columns. On a physical mode, when rows for a partition key are stored in order based on the clustering columns, retrieval of rows is very efficient.

Processes

Figure 14:
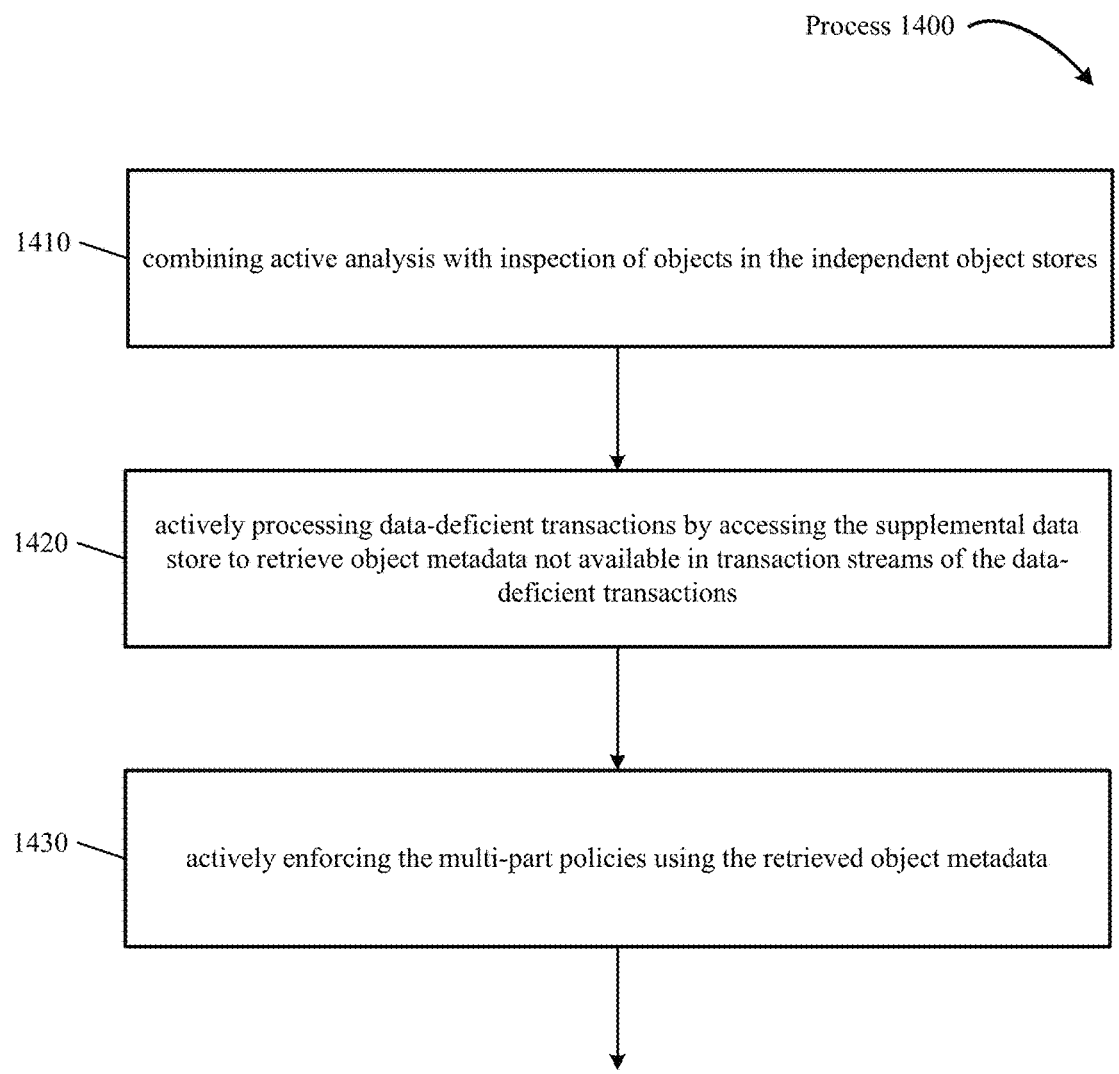
FIG. 14 is a representative method of actively enforcing multi-part policies on data-deficient transactions of independent data stores.

FIG. 14 is a representative method of actively enforcing multi-part policies on data-deficient transactions of independent data stores. Flowchart 1400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 14. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, system architecture, deep API inspection, content monitoring, security actions, conclusion and particular implementations, etc.

At action 1410, active analysis of access requests for the independent object stores is combined with inspection of objects in the independent object stores. Each analysis and inspection generates and persists object metadata in a supplemental data store, also referred herein as a "metadata store".

At action 1420, data-deficient transactions that apply to the objects are actively processed by accessing the supplemental data store to retrieve object metadata not available in transaction streams of the data-deficient transactions.

At action 1430, the multi-part policies are actively enforced using the retrieved object metadata.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 15:
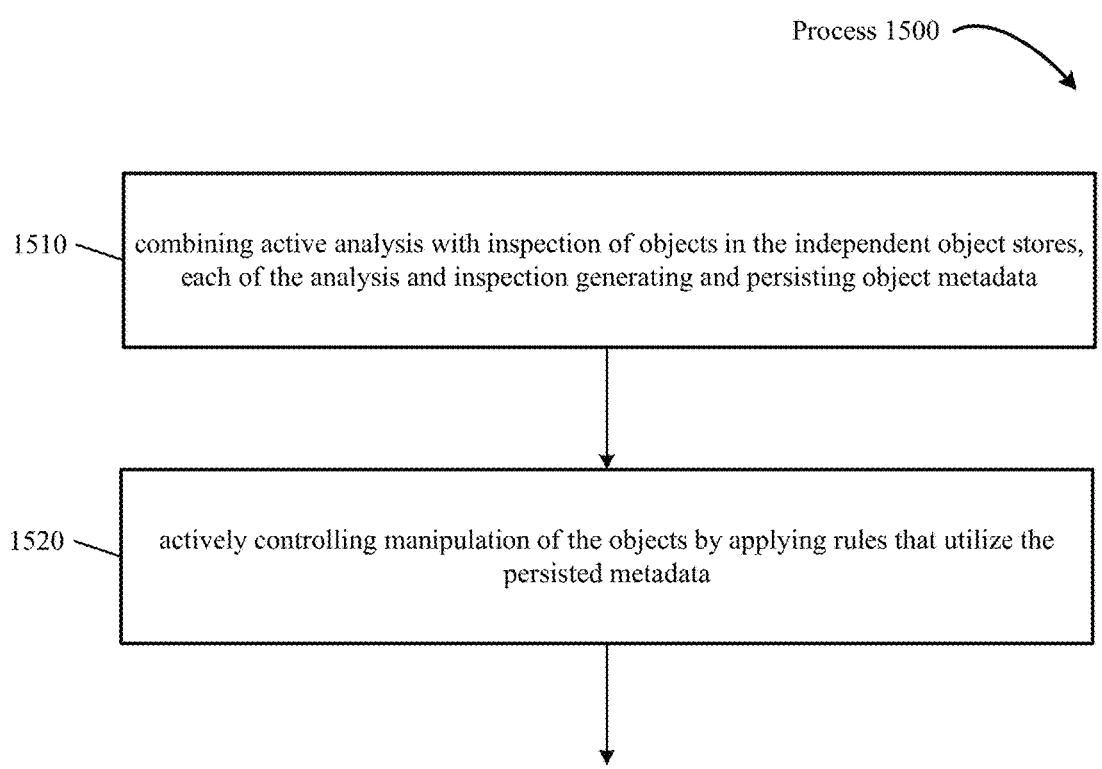
FIG. 15 is a representative method of establishing a middle ware object security layer between an organization's user systems and independent object stores.

FIG. 15 is a representative method of establishing a middle ware object security layer between an organization's user systems and independent object stores. Flowchart 1500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, system architecture, deep API inspection, content monitoring, security actions, conclusion and particular implementations, etc.

At action 1510, active analysis of access requests for the independent object stores is combined with inspection of objects in the independent object stores. Each analysis and inspection generates and persists object metadata.

At action 1520, manipulation of the objects is actively controlled by applying rules that utilize the persisted metadata.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 16:
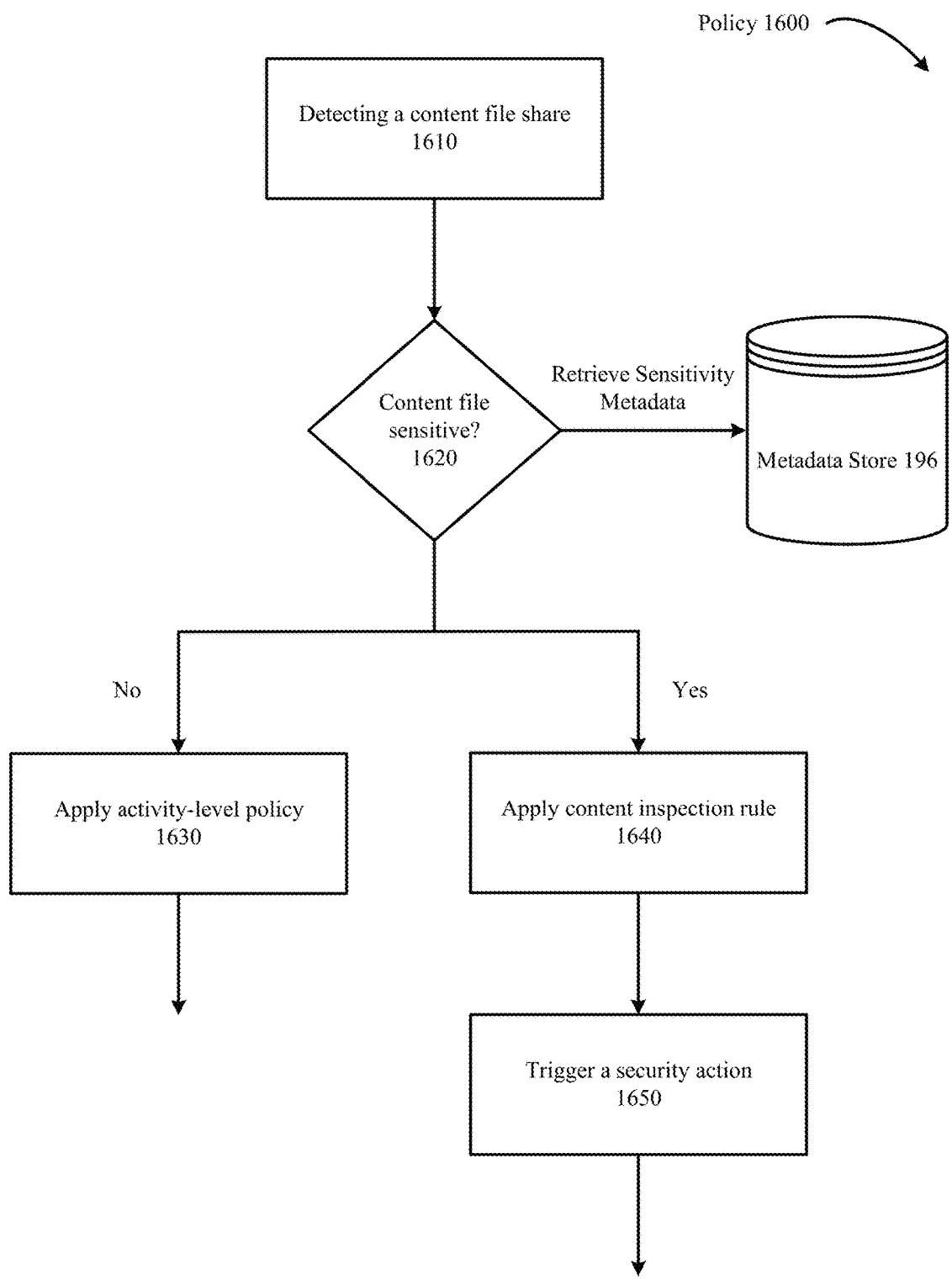
FIG. 16 is a representative method of enforcing a multi-part policy on a content file share data-deficient transaction.

FIG. 16 is a representative method of enforcing a multi-part policy on a content file share data-deficient transaction. Flowchart 1600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 16. Multiple actions can be combined in some implementations. For convenience, this flowchart is described with reference to the system that carries out a method. The system is not necessarily part of the method.

At action 1610, a content file share activity is detected. In one implementation, this is detected by evaluating an event log entry of the transaction during which the activity is performed, as discussed supra. In another implementation, an extraction engine 126 parses a data stream based on a CCS API and identifies activities that include manipulation of content, as discussed supra.

Process 1600 continues at action 1620 where a determination is made whether the content file being attempted to share is sensitive. This determination is made by retrieving metadata about the content file from metadata store 196 that confirms if the content file includes sensitive data. In one implementation, the metadata is retrieved by looking up a file profile of the content file in the supplemental data store or metadata store 196.

In other implementations, if the function or activity being performed is determined to be non-content-based, an activity-level policy is applied at action 1630, according to one implementation. One example of an activity-level policy being applied to a non-content based activity includes preventing sharing of an already uploaded document outside the organization that set the activity-level policy. Another example of an activity-level policy includes performing application signature generation that extracts a domain name and URL of the CCS from the HTTP request and if the domain name or the URL is on a "blacklist", then the URL is selectively routed according to the applicable activity-level policy. In other implementations, an activity-level policy can be applied to content-based functions and activities.

At action 1640, based on the multi-part policy, a content inspection rule is applied to find strings and interrelated strings in the sensitive content that are subject to content control, as discussed supra. In one implementation, a classification engine 127 is used to determine if the extracted content matches the arguments defined in the applicable content inspection rule, as discussed supra.

In some implementations, the content inspection rule is applied to find strings and interrelated strings in metadata associated with content that are subject to content control, as discussed supra. In some implementations, a content inspection profile is defined based on a plurality of content inspection rules and is included in a policy applicable to the CCS. In addition, the security action is triggered based on a plurality of condition variables defined in the policy applicable to the CCS.

In one implementation, the content inspection rule includes at least one multi-part string search pattern that matches two or more non-contiguous strings that collectively identify content that is subject to content control. In some implementations, at least one subpart of the multi-part string search pattern is a custom pattern tailored to a particular customer need. In other implementations, at least one subpart of the multi-part string search pattern is a standard pattern from a data classification library.

In one implementation, the multi-part string search pattern matches the two or more non-contiguous strings based on semantic proximity between the two or more non-contiguous strings. In some implementations, the content inspection rule includes a plurality of multi-part string search patterns directed to compliance with Health Insurance Portability and Accountability Act (HIPAA) privacy or security regulations. In other implementations, the content inspection rule includes a plurality of multi-part string search patterns directed to compliance with payment card industry (PCI) data security standards. In yet other implementations, the content inspection rule includes a plurality of multi-part string search patterns directed to compliance with personally identifiable information (PII) data security standards.

In one implementation, the content inspection rule includes a plurality of multi-part string search patterns directed to trade secret data identified as confidential. In another implementation, the content inspection rule includes a plurality of multi-part string search patterns directed to source code. In yet another implementation, the content inspection rule includes a plurality of multi-part string search patterns directed to technical specifications. In a further implementation, the content inspection rule includes a plurality of multi-part string search patterns directed to customer or employee lists with financial data regarding the customer or employees.

At action 1650, a security action is triggered based on the multi-part policy responsive to finding the strings and interrelated strings subject to content control in the parsed stream, as discussed supra. In some implementations, a security engine 128 access one or more content policies 181 to determine which ones of the security action should be take based on the type of the classified content. In other implementations, the security engine 128 can include a plurality of sub-engines for each of the different types of security actions, including a block sub-engine, a bypass sub-engine, a remediate sub-engine, a justification sub-engine, a quarantine sub-engine, an encryption sub-engine, and other suitable security action engines.

In one implementation, the security action is triggered responsive to finding threshold occurrences of the strings and interrelated strings subject to content control in the parsed stream. In some implementations, the security action includes quarantining the content. In one implementation, a quarantine folder is created at the CCS in which the content is conditionally stored pending ratification or rejection by a quarantine approver. In one implementation, conditionally storing the content item in the quarantine folder includes generating data representing a tombstone file for the content that identifies the content and storing the tombstone file at a destination (file path or folder) where the uploading user desired to upload the content. In another implementation, conditionally storing the content item in the quarantine folder includes encrypting the content item. In some implementations, the quarantine folder is created in a second CCS different from the CCS to which the content could have been transmitted.

The decision of the quarantine approver regarding transmission of the content to the CCS is stored and subsequent requests for transmitting the content to the CCS are processed based on the decision of the quarantine approver. In some implementations, responsive to ratification or rejection by the quarantine approver, the tombstone file is either replaced with the content or it is deleted.

In one implementation, data identifying at least one multi-part string search pattern is generated and presented to the quarantine approver. This data identifies at least one string in the quarantined content that is subject to content control.

In some implementations, the security action includes requiring justification of using the CCS API in use for the content in the parsed stream as a condition of completing the function or the activity being performed.

In other implementations, the security action includes generating one or more coaching messages that identify a more enterprise-ready alternative to the CCS API in use. In one implementation, the enterprise-ready alternative to the CCS API is identified using a cloud confidence Index™ (CCI) that is determined based on at least one of data encryption policies of a CCS, disaster management policies of the CCS, number of data centers supporting the CCS, and compliance certifications of the data centers.

In some implementations, the security action includes document specific encryption of the content. In one implementation, the document specific encryption includes accessing a key-manager with a triplet of organization identifier, application identifier and region identifier and receiving a triplet-key and a triplet-key identifier used to uniquely identify the triplet-key. For a document that has a document identifier (ID), the method further includes deriving a per-document key from a combination of the triplet-key, the document ID and a salt, using the per-document key to encrypt the document, and forwarding the encrypted document, the document ID, the salt, and the triplet-key identifier.

In some implementations, a hash key derivation function (HKDF) is used to derive the per-document key from the combination of the triplet-key, the document ID and the salt.

In one implementation, the HKDF is executed at a trusted platform module (TPM). In another implementation, it is executed at a hardware security module (HSM).

In one implementation, a document classification tag is applied to the document based on content inspection of the document and is used to control access to the document.

In one implementation, a data integrity tag is generated that authenticates integrity of the document and is persisted for use during further processing of the document.

In one implementation, the key-manager is a key management interoperability protocol (KMIP) compliant key management system.

In some implementations, the key-manager is hosted at a local data center of an organization that uses a cloud computing service (CCS).

In other implementations, the key-manager is hosted at a cloud computing service (CCS). In yet other implementations, the key-manager is region specific.

In yet another implementation, the method includes authorizing a user for decryption based on a plurality of condition variables, including at least one data classification tag. The method further includes accessing a key-manager with a key identifier and region identifier and receiving a master-key using the key identifier that uniquely identifies the master-key. For a document that has a document identifier (ID), the method includes deriving a per-document key from a combination of the master-key, the document ID and a salt, using the per-document key to decrypt the document, and forwarding the decrypted document to the user.

In some implementations, a data integrity tag associated with the document is verified. The data integrity tag authenticates integrity of the document.

In one implementation, the key identifier includes at least one of an organization identifier and an application identifier.

In some implementations, a hash key derivation function (HKDF) is used to derive the per-document key from the combination of the triplet-key, the document ID and the salt.

In one implementation, the HKDF is executed at a trusted platform module (TPM). In another implementation, it is executed at a hardware security module (HSM).

In one implementation, the key-manager is a key management interoperability protocol (KMIP) compliant key management system.

In some implementations, the key-manager is hosted at a local data center of an organization that uses a cloud computing service (CCS).

In other implementations, the key-manager is hosted at a cloud computing service (CCS). In yet other implementations, the key-manager is region specific.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 17:
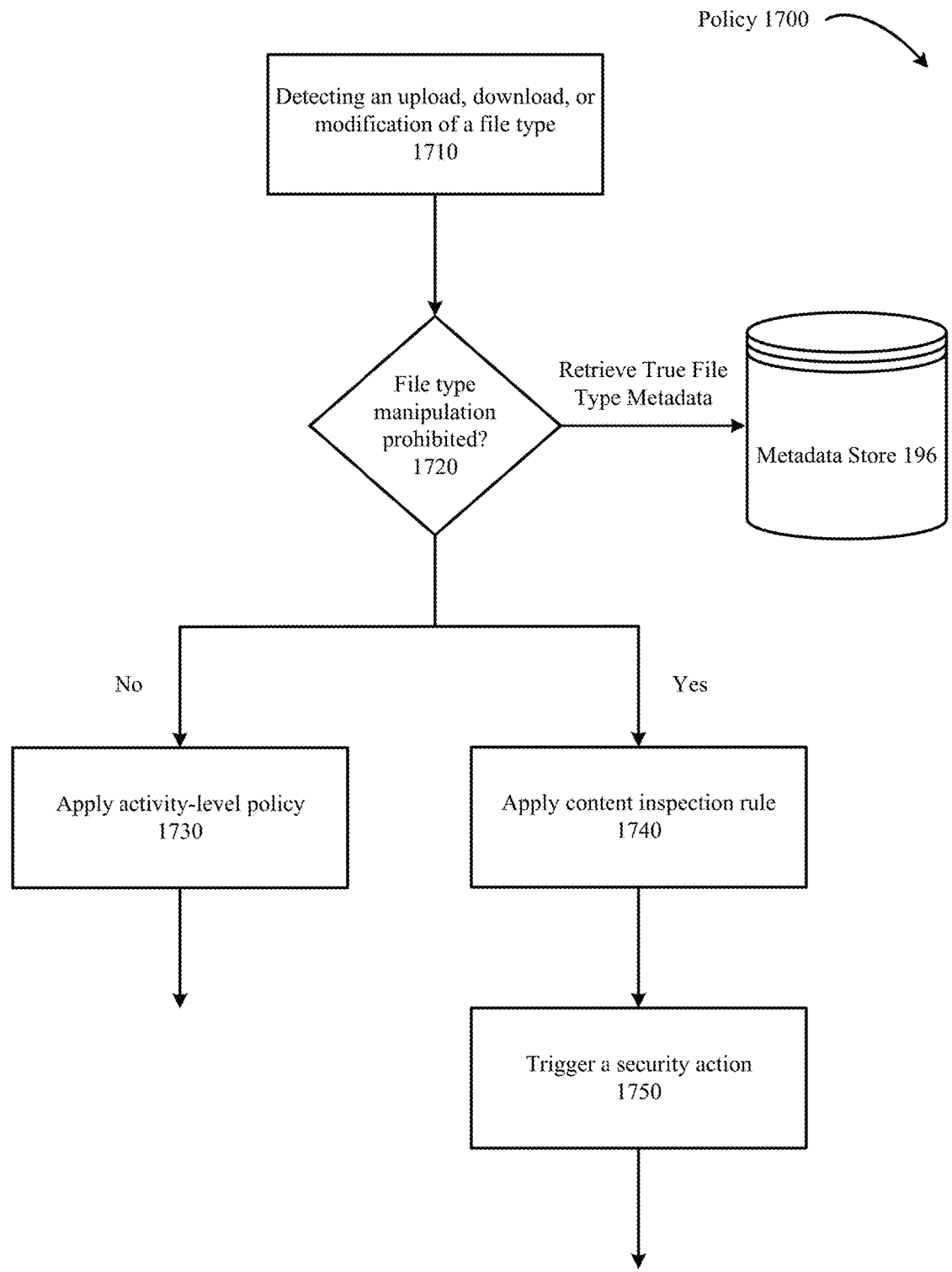
FIG. 17 is a representative method of enforcing a multi-part policy on a content file upload, download, or modification trust-deficient transaction with a particular file type.

FIG. 17 is a representative method of enforcing a multi-part policy on a content file upload, download, or modification trust-deficient transaction with a particular file type. Flowchart 1700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 17. Multiple actions can be combined in some implementations. For convenience, this flowchart is described with reference to the system that carries out a method. The system is not necessarily part of the method.

At action 1710, a content file upload, download, or modification activity is detected. In one implementation, this is detected by evaluating an event log entry of the transaction during which the activity is performed, as discussed supra. In another implementation, an extraction engine 126 parses a data stream based on a CCS API and identifies activities that include manipulation of content, as discussed supra.

Process 1700 continues at action 1720 where a determination is made whether the content file type being attempted to share is sensitive. This determination is made by retrieving metadata about the content file from metadata store 196 that confirms if the content file type is prohibited from being uploaded, downloaded, or modified. In one implementation, this is done by determining a true file type of the content file when it first traversed the active proxy platform and storing the true file type in the metadata store 196.

In other implementations, if the function or activity being performed is determined to be non-content-based, an activity-level policy is applied at action 1730, according to one implementation. One example of an activity-level policy being applied to a non-content based activity includes preventing sharing of an already uploaded document outside the organization that set the activity-level policy. Another example of an activity-level policy includes performing application signature generation that extracts a domain name and URL of the CCS from the HTTP request and if the domain name or the URL is on a "blacklist", then the URL is selectively routed according to the applicable activity-level policy. In other implementations, an activity-level policy can be applied to content-based functions and activities.

At action 1740, based on the multi-part policy, a content inspection rule is applied to find strings and interrelated strings in the sensitive content that are subject to content control, as discussed supra. In one implementation, a classification engine 127 is used to determine if the extracted content matches the arguments defined in the applicable content inspection rule, as discussed supra.

At action 1750, a security action is triggered based on the multi-part policy responsive to finding that the retrieved true file type matches the prohibited file type. For example, if the detected file type is ".text" but the true file type is ".PDF" and the prohibited file type is ".PDF," then a security action that prevents upload, download, and modification of the content file is triggered. In some implementations, a security engine 128 access one or more content policies 181 to determine which ones of the security action should be take based on the type of the classified content. In other implementations, the security engine 128 can include a plurality of sub-engines for each of the different types of security actions, including a block sub-engine, a bypass sub-engine, a remediate sub-engine, a justification sub-engine, a quarantine sub-engine, an encryption sub-engine, and other suitable security action engines.

Figure 18:
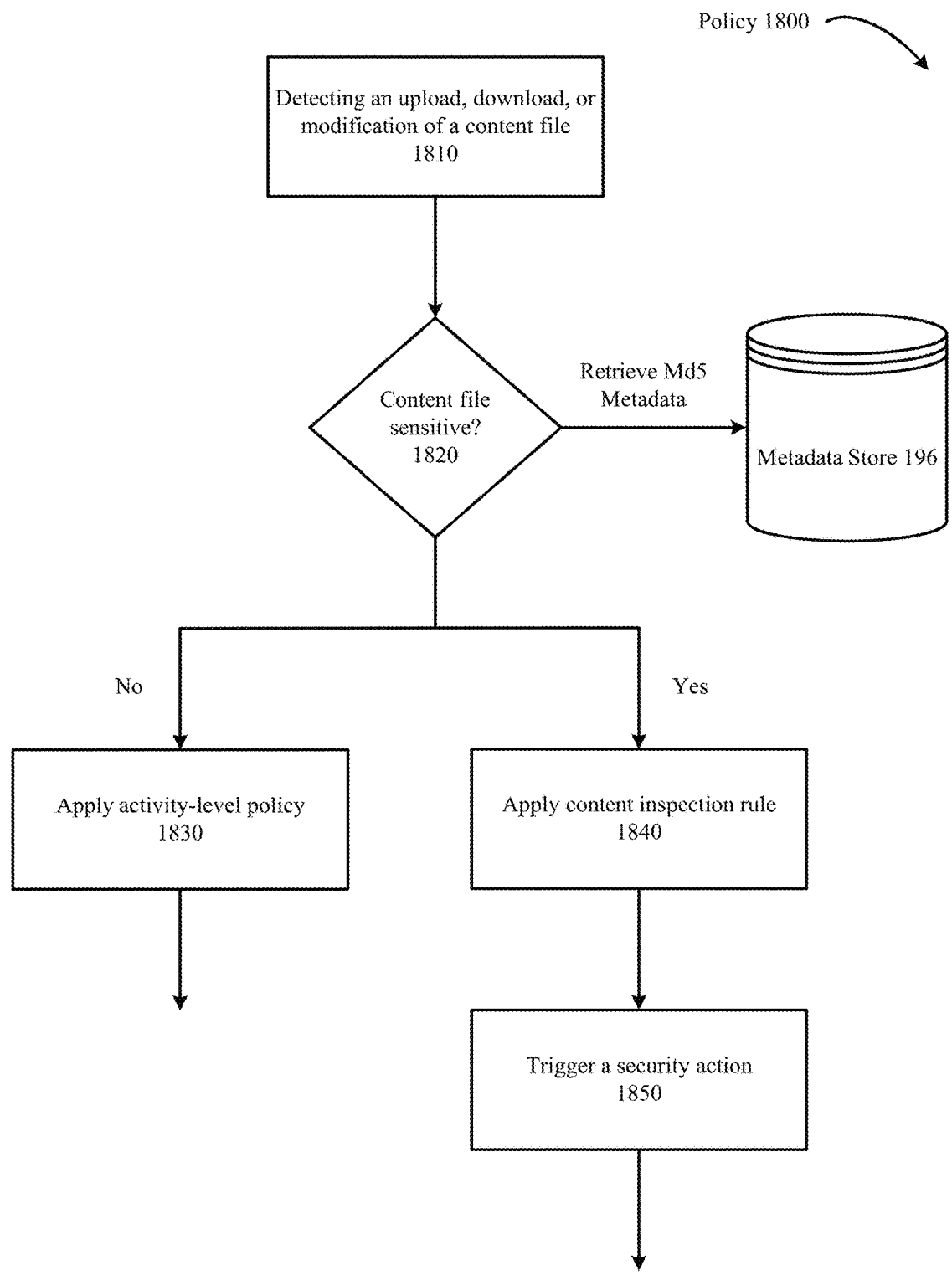
FIG. 18 is a representative method of handling an attempt to bypass a multi-part policy using a trust-deficient transaction that modifies a file identifier (ID) (e.g., a file name, a file type, a file extension, and other file attributes and metadata such as archive, hidden, system, read-only) of a content file.

FIG. 18 is a representative method of handling an attempt to bypass a multi-part policy using a trust-deficient transaction that modifies a file identifier (ID) (e.g., a file name, a file type, a file extension, and other file attributes and metadata such as archive, hidden, system, read-only) of a content file. Flowchart 1800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 18. Multiple actions can be combined in some implementations. For convenience, this flowchart is described with reference to the system that carries out a method. The system is not necessarily part of the method.

At action 1810, a content file upload, download, or modification activity is detected. In one implementation, this is detected by evaluating an event log entry of the transaction during which the activity is performed, as discussed supra. In another implementation, an extraction engine 126 parses a data stream based on a CCS API and identifies activities that include manipulation of content, as discussed supra.

Process 1800 continues at action 1820 where a determination is made whether the content file being attempted to share is sensitive. This determination is made by retrieving integrity checksum metadata (persisted using secure hash algorithms and message digest algorithms like MD5, SHA-256, SHA-384, SHA-512, HAVAL 160, and CRC) about the content file from metadata store 196 that confirms if the content file is sensitive. This way if a first user downloads a sensitive content file from a first cloud application and changes the object ID of the first content file by uploading it to a second cloud application in an attempt to bypass the metadata profile, then the integrity checksum can thwart such an attempt because content file is still identified as sensitive even though its object ID has been modified.

In another implementation, if the function or activity being performed is determined to be non-content-based, an activity-level policy is applied at action 1830, according to one implementation. One example of an activity-level policy being applied to a non-content based activity includes preventing sharing of an already uploaded document outside the organization that set the activity-level policy. Another example of an activity-level policy includes performing application signature generation that extracts a domain name and URL of the CCS from the HTTP request and if the domain name or the URL is on a "blacklist", then the URL is selectively routed according to the applicable activity-level policy. In other implementations, an activity-level policy can be applied to content-based functions and activities.

At action 1840, based on the multi-part policy, a content inspection rule is applied to find strings and interrelated strings in the sensitive content that are subject to content control, as discussed supra. In one implementation, a classification engine 127 is used to determine if the extracted content matches the arguments defined in the applicable content inspection rule, as discussed supra.

At action 1850, a security action is triggered based on the multi-part policy responsive to finding the strings and interrelated strings subject to content control in the parsed stream, as discussed supra. In some implementations, a security engine 128 access one or more content policies 181 to determine which ones of the security action should be take based on the type of the classified content. In other implementations, the security engine 128 can include a plurality of sub-engines for each of the different types of security actions, including a block sub-engine, a bypass sub-engine, a remediate sub-engine, a justification sub-engine, a quarantine sub-engine, an encryption sub-engine, and other suitable security action engines.

Figure 19:
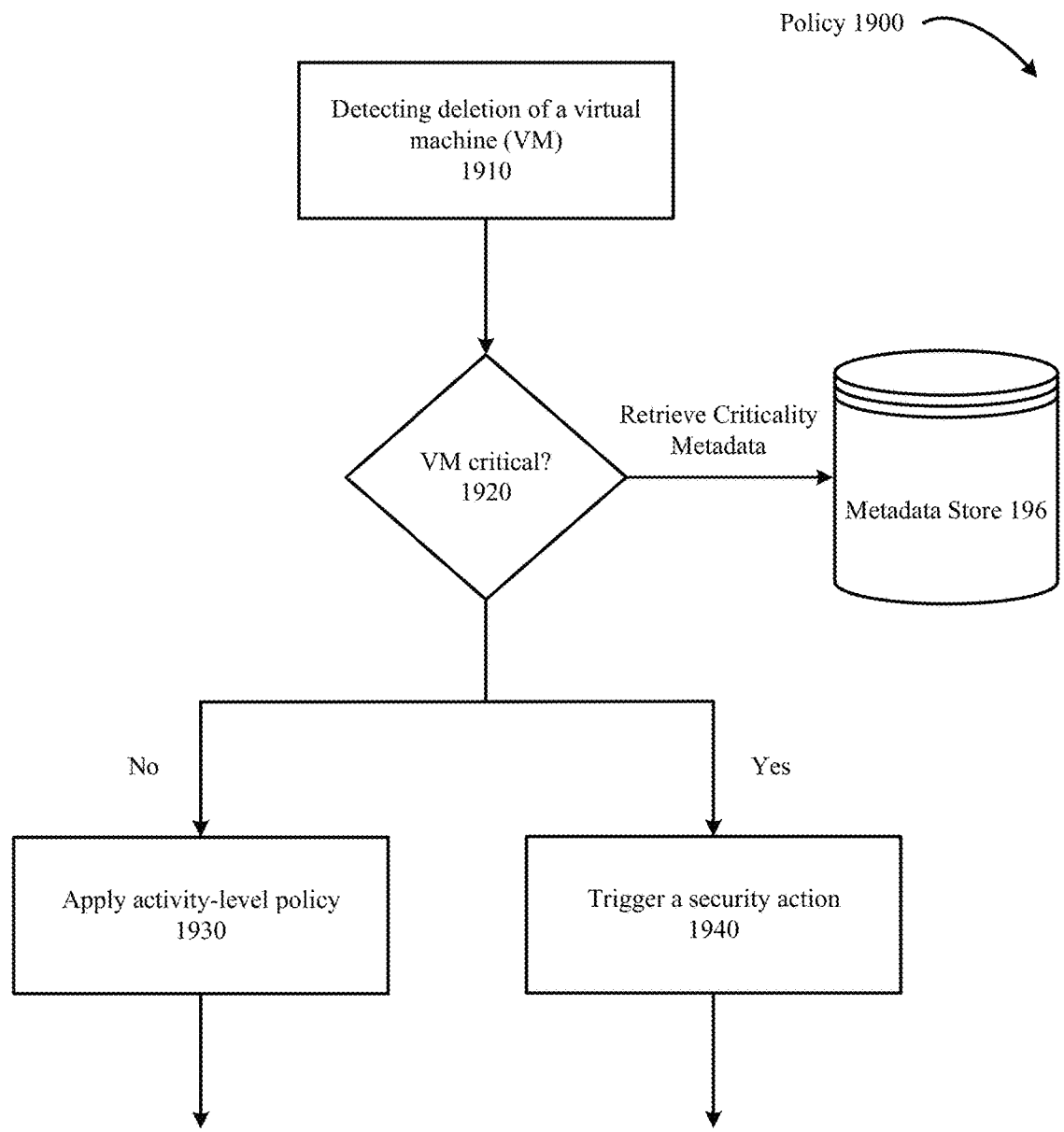
FIG. 19 is a representative method of enforcing a multi-part policy on a virtual machine (VM) manipulation data-deficient transaction.

FIG. 19 is a representative method of enforcing a multi-part policy on a virtual machine (VM) manipulation data-deficient transaction. Flowchart 1900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 19. Multiple actions can be combined in some implementations. For convenience, this flowchart is described with reference to the system that carries out a method. The system is not necessarily part of the method.

At action 1910, a virtual machine manipulation activity is detected. In one implementation, this is detected by evaluating an event log entry of the transaction during which the activity is performed, as discussed supra. In another implementation, an extraction engine 126 parses a data stream based on a CCS API and identifies activities that include manipulation of content, as discussed supra.

Process 1900 continues at action 1920 where a determination is made whether the virtual machine is critical. This determination is made by retrieving metadata about the virtual machine from metadata store 196 that confirms if the virtual machine is critical. In one implementation, the metadata is retrieved by looking up a machine profile of the virtual machine in the supplemental data store or metadata store 196. In some implementations, the virtual machine is assigned a criticality tag by a systems administrator, based on which criticality of the virtual machine is determined and stored in the metadata store 196.

In another implementation, if the function or activity being performed is determined to be non-content-based, an activity-level policy is applied at action 1930, according to one implementation. One example of an activity-level policy being applied to a non-content based activity includes preventing sharing of an already uploaded document outside the organization that set the activity-level policy. Another example of an activity-level policy includes performing application signature generation that extracts a domain name and URL of the CCS from the HTTP request and if the domain name or the URL is on a "blacklist", then the URL is selectively routed according to the applicable activity-level policy. In other implementations, an activity-level policy can be applied to content-based functions and activities.

At action 1940, a security action is triggered based on the multi-part policy responsive to finding the virtual machine is critical, as discussed supra. In some implementations, a security engine 128 access one or more content policies 181 to determine which ones of the security action should be take based on the type of the classified content. In other implementations, the security engine 128 can include a plurality of sub-engines for each of the different types of security actions, including a block sub-engine, a bypass sub-engine, a remediate sub-engine, a justification sub-engine, a quarantine sub-engine, an encryption sub-engine, and other suitable security action engines.

Figure 20:
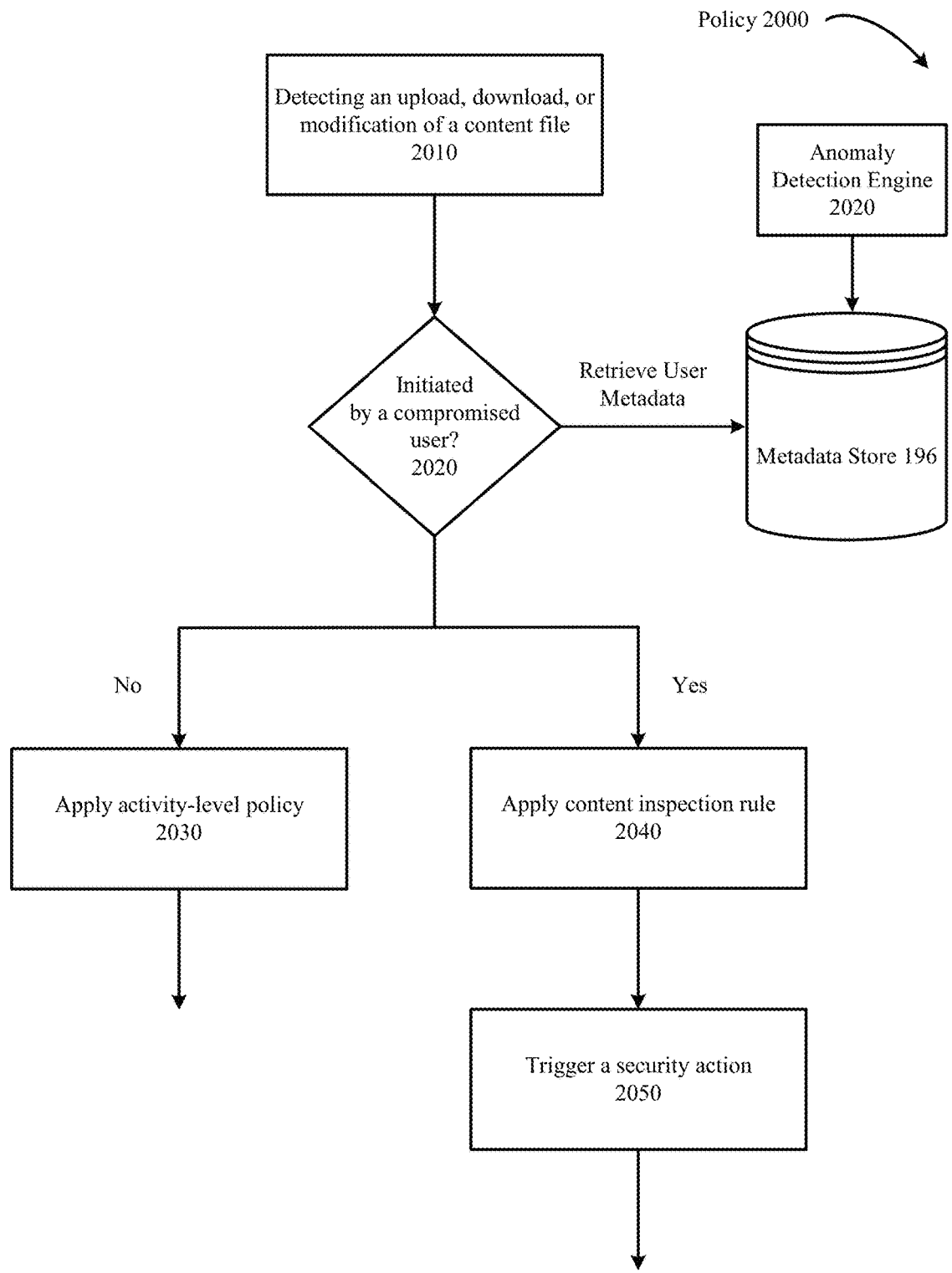
FIG. 20 is a representative method of enforcing a multi-part policy on a content file upload, download, or modification trust-deficient transaction initiated by a user.

FIG. 20 is a representative method of enforcing a multi-part policy on a content file upload, download, or modification trust-deficient transaction initiated by a user. Flowchart 2000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 20. Multiple actions can be combined in some implementations. For convenience, this flowchart is described with reference to the system that carries out a method. The system is not necessarily part of the method.

At action 2010, a content file upload, download, or modification activity by a user is detected. In one implementation, this is detected by evaluating an event log entry of the transaction during which the activity is performed, as discussed supra. In another implementation, an extraction engine 126 parses a data stream based on a CCS API and identifies activities that include manipulation of content, as discussed supra.

Process 2000 continues at action 2020 where a determination is made whether the user is compromised. This determination is made by retrieving metadata about the user from metadata store 196 that confirms if the user has demonstrated any anomalous behavior as determined by an anomaly detection engine 2020. Examples of anomalous behavior include temporally proximate logins from geographically distant locations, numerous downloads within a time window, and others.

In other implementations, if the function or activity being performed is determined to be non-content-based, an activity-level policy is applied at action 2030, according to one implementation. One example of an activity-level policy being applied to a non-content based activity includes preventing sharing of an already uploaded document outside the organization that set the activity-level policy. Another example of an activity-level policy includes performing application signature generation that extracts a domain name and URL of the CCS from the HTTP request and if the domain name or the URL is on a "blacklist", then the URL is selectively routed according to the applicable activity-level policy. In other implementations, an activity-level policy can be applied to content-based functions and activities.

At action 2040, based on the multi-part policy, a content inspection rule is applied to find strings and interrelated strings in the sensitive content that are subject to content control, as discussed supra. In one implementation, a classification engine 127 is used to determine if the extracted content matches the arguments defined in the applicable content inspection rule, as discussed supra.

At action 2050, a security action is triggered based on the multi-part policy responsive to finding that the content file upload, download, or modification was initiated by a compromised user, as discussed supra. In some implementations, a security engine 128 access one or more content policies 181 to determine which ones of the security action should be take based on the type of the classified content. In other implementations, the security engine 128 can include a plurality of sub-engines for each of the different types of security actions, including a block sub-engine, a bypass sub-engine, a remediate sub-engine, a justification sub-engine, a quarantine sub-engine, an encryption sub-engine, and other suitable security action engines.

Figure 21:
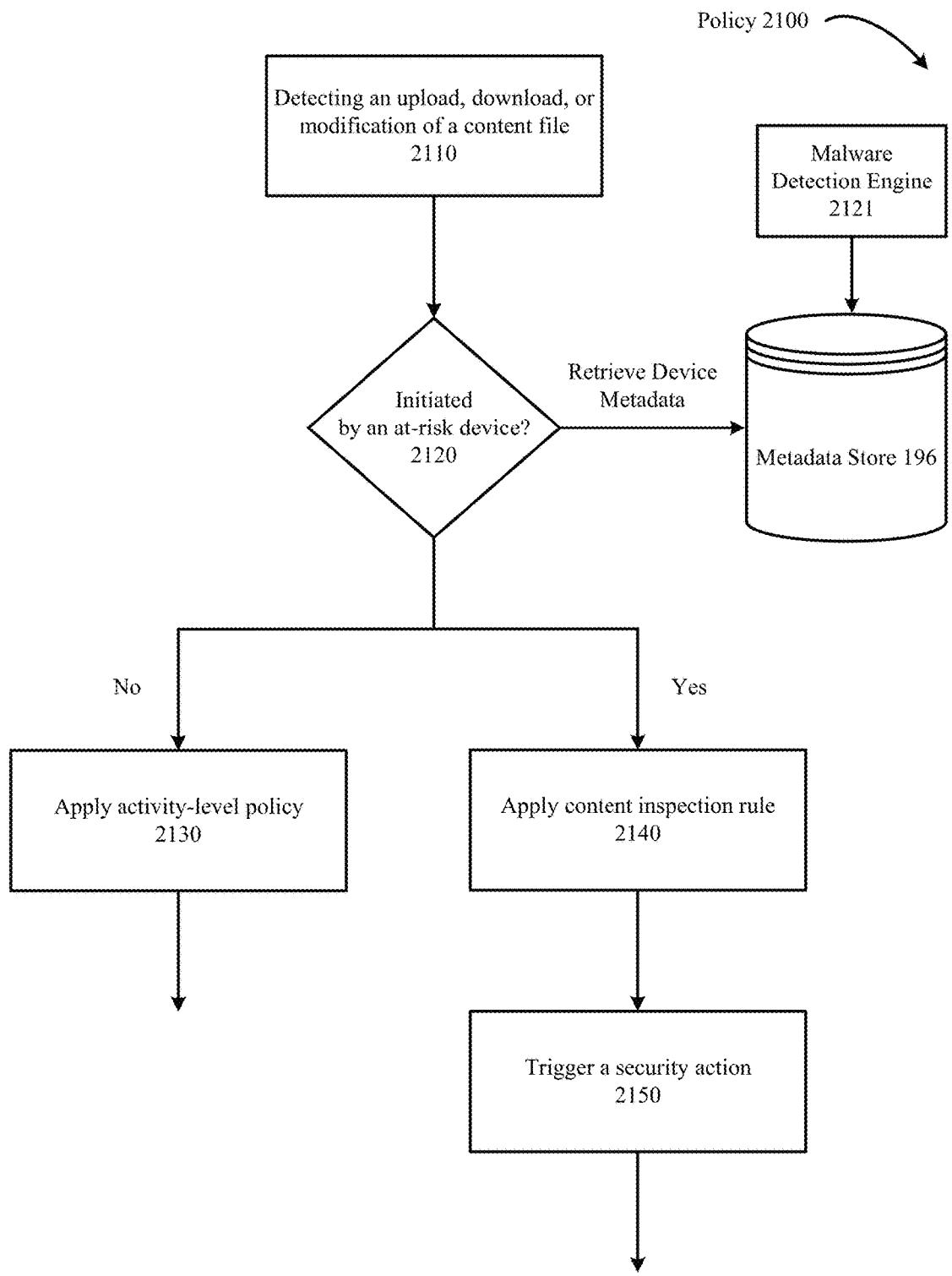
FIG. 21 is a representative method of enforcing a multi-part policy on a content file upload, download, or modification trust-deficient transaction initiated by a device.

FIG. 21 is a representative method of enforcing a multi-part policy on a content file upload, download, or modification trust-deficient transaction initiated by a device. Flowchart 2100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 21. Multiple actions can be combined in some implementations. For convenience, this flowchart is described with reference to the system that carries out a method. The system is not necessarily part of the method.

At action 2110, a content file upload, download, or modification activity by a device is detected. In one implementation, this is detected by evaluating an event log entry of the transaction during which the activity is performed, as discussed supra. In another implementation, an extraction engine 126 parses a data stream based on a CCS API and identifies activities that include manipulation of content, as discussed supra. In other implementations, an endpoint posture assessment of the device is performed using an agent to collect attributes of the device indicating conduct and health of the device. In one implementation, some device attributes specify the endpoint device-type and operating system and other attributes specify various security applications present on the device, such as antivirus (AV), anti-spyware, and firewall scanning software. In another implementation, the endpoint posture assessment provides a log of device activity that identifies content manipulation activities like content file upload, download, or modification performed using the device.

Process 2100 continues at action 2120 where a determination is made whether the device is at-risk. This determination is made by retrieving metadata about the device from metadata store 196 that confirms if the device has demonstrated any malicious behavior as determined by a malware detection engine 2121. Examples of malicious behavior include presence of malware, spyware, viruses, time bombs, Trojan horses, programming errors, temporally proximate logins from geographically distant locations, numerous downloads within a time window, and others.

In other implementations, if the function or activity being performed is determined to be non-content-based, an activity-level policy is applied at action 2130, according to one implementation. One example of an activity-level policy being applied to a non-content based activity includes preventing sharing of an already uploaded document outside the organization that set the activity-level policy. Another example of an activity-level policy includes performing application signature generation that extracts a domain name and URL of the CCS from the HTTP request and if the domain name or the URL is on a "blacklist", then the URL is selectively routed according to the applicable activity-level policy. In other implementations, an activity-level policy can be applied to content-based functions and activities.

At action 2140, based on the multi-part policy, a content inspection rule is applied to find strings and interrelated strings in the sensitive content that are subject to content control, as discussed supra. In one implementation, a classification engine 127 is used to determine if the extracted content matches the arguments defined in the applicable content inspection rule, as discussed supra.

At action 2150, a security action is triggered based on the multi-part policy responsive to finding that the content file upload, download, or modification was initiated by an at-risk device, as discussed supra. In some implementations, a security engine 128 access one or more content policies 181 to determine which ones of the security action should be take based on the type of the classified content. In other implementations, the security engine 128 can include a plurality of sub-engines for each of the different types of security actions, including a block sub-engine, a bypass sub-engine, a remediate sub-engine, a justification sub-engine, a quarantine sub-engine, an encryption sub-engine, and other suitable security action engines.

Visibility Dashboard

Figure 22:
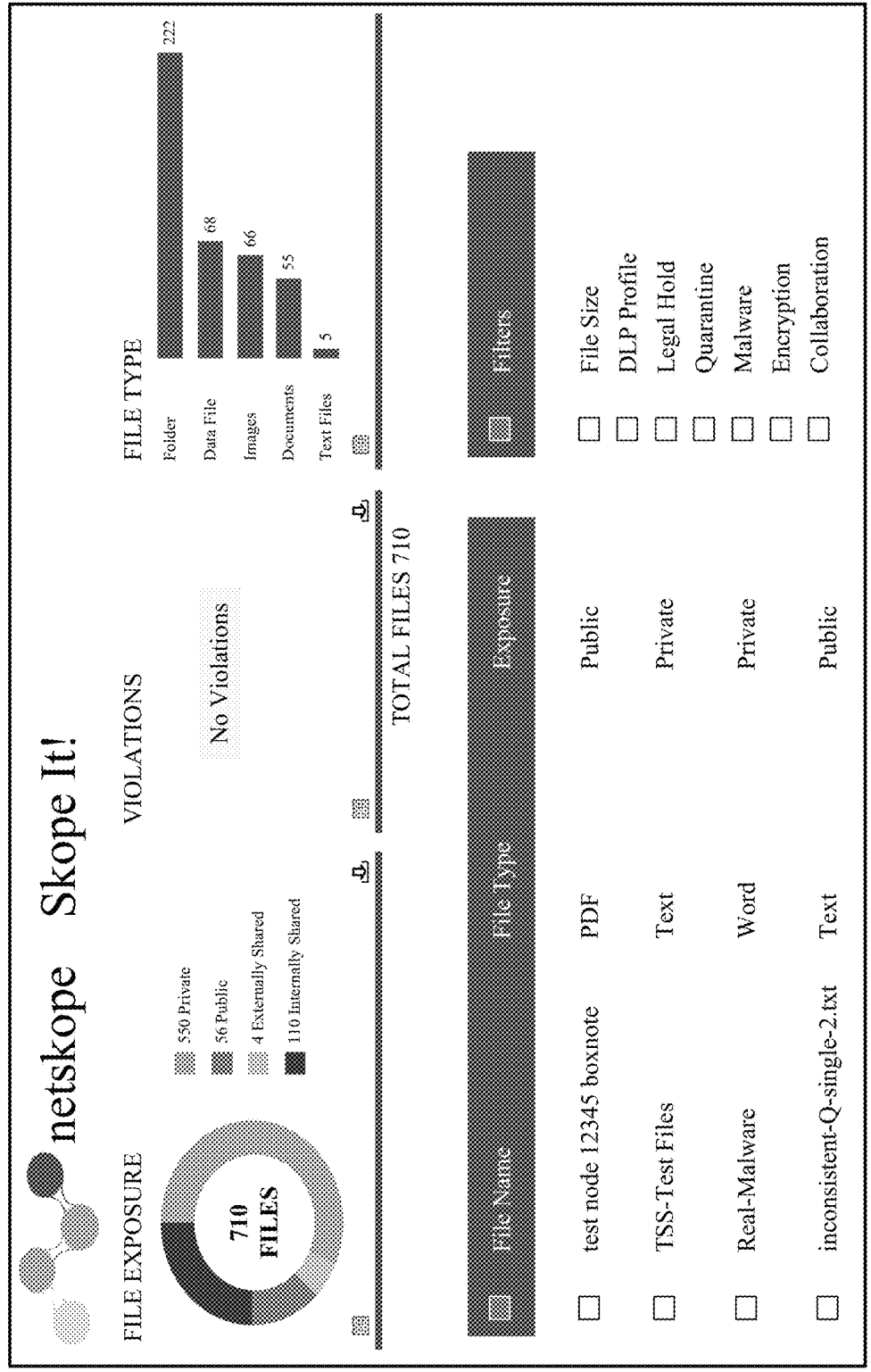
FIG. 22 illustrates one implementation of a visibility dashboard that provides visibility of enterprise information stored on a cloud computing service (CCS).

FIG. 22 illustrates one implementation of a visibility dashboard 2200 that provides visibility of enterprise information stored on a cloud computing service (CCS). In one implementation, inspective analyzer 194 identifies all objects stored in a CCS and determines a plurality of metadata associated with the objects, as discussed supra. Further, the assembled metadata is depicted using the visibility dashboard 2200 that generates a graphical summary of the number of privately owned objects, number of publicly accessible objects, number of intra-organizationally shared objects, number of extra-organizationally shared objects, true file types of the objects, and number of policy violations.

CONCLUSION AND PARTICULAR IMPLEMENTATIONS

We describe a system and various implementations for providing security for cloud services. As discussed, this provides for a type of virtual network between clients and cloud services with fine-grained filtering linked to content-type and application-level semantics.

In one implementation, described is a method of actively enforcing multi-part policies on data-deficient transactions of independent data stores. The method includes combining active analysis of access requests for the independent object stores with inspection of objects in the independent object stores, each of the analysis and inspection generating and persisting object metadata in a supplemental data store, actively processing data-deficient transactions that apply to the objects by accessing the supplemental data store to retrieve object metadata not available in transaction streams of the data-deficient transactions, and actively enforcing the multi-part policies using the retrieved object metadata.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, system architecture, deep API inspection, content monitoring, security actions, active proxy analysis, proxy-bypassing objects, combining active proxy analysis with inspection analysis, metadata models, plane points, visibility dashboard, and conclusion and particular implementations, etc.

In one implementation, the objects are content files and the object metadata identify sensitivity of the content files. In one implementation, the data-deficient transaction is content file share of a first content file and the multi-part policy prevents sharing of a content file that is sensitive and the method includes identifying a file identifier (ID) from the data-deficient transaction, looking up a file profile of the first content file in the supplemental data store, determining sensitivity of the first content file based on corresponding object metadata, and triggering a security action based on the multi-part policy.

In one implementation, the objects are content files and the object metadata identify sharee lists for the content files. In one implementation, the objects are content files and the object metadata identify owners of the content files. In one implementation, the objects are content files and the object metadata identify a true file type of the content files.

In one implementation, the trust-deficient transaction is content file upload, download, or modification of a first content file having a first file type and the multi-part policy prevents upload, download, or modification of a particular file type different from the first file type and the method includes identifying the first content file from the trust-deficient transaction, looking up a file profile of the first content file in the supplemental data store, determining a true file type of the content file based on corresponding object metadata, and when the true file type fails to match the particular file type, determining the first content file to be compromised and triggering a security action based on the multi-part policy.

In one implementation, the trust-deficient transaction is content file upload, download, or modification of a first content file having a first file type and the multi-part policy prevents upload, download, or modification of a particular file type different from the first file type and the method includes identifying the first content file from the trust-deficient transaction, looking up a file profile of the first content file in the supplemental data store, determining a true file type of the content file based on corresponding object metadata, and when the true file type matches the particular file type, triggering a security action based on the multi-part policy.

In one implementation, the objects are content files and the object metadata identify an integrity checksum of the content files.

In one implementation, the method includes detecting an attempt to transfer a content file from a sanctioned cloud computing service (CCS) to an unsanctioned CCS through modification of a file identifier (ID) of the content file by using an integrity checksum of the content file to look up a file profile of the first content file in the supplemental data store, determining sensitivity of the first content file based on corresponding object metadata, and triggering a security action based on the multi-part policy.

In one implementation, the method includes detecting an attempt to bypass the multi-part policy with modification of a file identifier (ID) of a first content file by using an integrity checksum of the first content file to look up a file profile of the first content file in the supplemental data store, determining sensitivity of the first content file based on corresponding object metadata, and triggering a security action based on the multi-part policy.

In one implementation, the objects are virtual machines and the object metadata identify criticality levels of the virtual machines. In some implementations, the data-deficient transaction is deletion of a first virtual machine and the multi-part policy prevents deletion of a virtual machine if the virtual machine is critical and the method includes identifying the first virtual machine from the data-deficient transaction, looking up a machine profile of the first virtual machine in the supplemental data store, determining a criticality level of the first virtual machine based on corresponding object metadata, and triggering a security action based on the multi-part policy.

In one implementation, the objects are user profiles and the object metadata identify anomalous user activity determined by an anomaly detection engine. In some implementations, the trust-deficient transaction is content file upload, download, or modification by a first user and the multi-part policy prevents upload, download, or modification of a content file initiated by a compromised user and the method includes identifying the first user from the trust-deficient transaction, looking up a user profile of the first user in the supplemental data store, determining anomalous user activity of the first user based on corresponding object metadata, and triggering a security action based on the multi-part policy.

In one implementation, the objects are user profiles and the object metadata identify locations of users. In another implementation, the objects are application sessions and the object metadata identify at-risk application sessions determined by an anomaly detection engine.

In one implementation, the objects are devices and the object metadata identify malicious devices determined by a malware detection engine. In some implementations, the trust-deficient transaction is content file upload, download, or modification by a first device and the multi-part policy prevents upload, download, or modification of a content file initiated by an at-risk device and the method includes identifying the first device from the trust-deficient transaction, looking up a device profile of the first device in the supplemental data store, determining malicious activity via the first device based on corresponding object metadata, and triggering a security action based on the multi-part policy.

Other implementations of the methods described in this section can include a non-transitory computer readable storage medium storing instructions executable by a processor to perform any of the methods described above. Yet another implementation of the methods described in this section can include a system including memory and one or more processors operable to execute instructions, stored in the memory, to perform any of the methods described above.

In another implementation, described is a method of enforcing multi-part policies on proxy-bypassing data-deficient transactions of independent data stores. The method includes combining active analysis of access requests for the independent object stores with inspection of objects in the independent object stores, each of the analysis and inspection generating and persisting object metadata in a supplemental data store, during inspection, processing proxy-bypassing data-deficient transactions that apply to the objects by accessing the supplemental data store to retrieve object metadata persisted during the active analysis and not available in transaction streams of the proxy-bypassing data-deficient transactions, and during inspection, enforcing the multi-part policies using the retrieved object metadata.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, system architecture, deep API inspection, content monitoring, security actions, active proxy analysis, proxy-bypassing objects, combining active proxy analysis with inspection analysis, metadata models, plane points, visibility dashboard, and conclusion and particular.

Other implementations of the methods described in this section can include a non-transitory computer readable storage medium storing instructions executable by a processor to perform any of the methods described above. Yet another implementation of the methods described in this section can include a system including memory and one or more processors operable to execute instructions, stored in the memory, to perform any of the methods described above.

These methods can be implemented at least partially with a database system, e.g., by one or more processors configured to receive or retrieve information, process the information, store results, and transmit the results. Other implementations may perform the actions in different orders and/or with different, fewer or additional actions than those discussed. Multiple actions can be combined in some implementations. For convenience, these methods are described with reference to the system that carries out a method. The system is not necessarily part of the method.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of controlling data accesses to a data object based upon content of the data object between an organization's user systems and independent object stores, the method including:
    receiving first data packets at a proxy interposed between a user system and an independent object store during transfer of a data object from the user system to the independent object store;
    determining by the proxy that the data object is subject to content control by applying content inspection rules to the first data packets;
    generating by the proxy, object metadata based on the applying of the content inspection rules to the data object and storing the object metadata in a metadata store separate from the independent object store;
    receiving at the proxy, second data packets at the proxy from the user system during an application programming interface (API) request to the independent object store, the second data packets comprising a request to access the data object;
    retrieving the object metadata by the proxy for the data object from the metadata store; and
    controlling access by the proxy to the data object via the independent object store by the user system based upon the retrieved object metadata for the data object.

2. The method of claim 1, wherein applying content inspection rules to the first data packets comprises determining whether strings in extracted content in data associated with the first data packets are subject to content control.

3. The method of claim 2, wherein the content inspection rules include at least multi-part string search pattern that matches two or more non-contiguous strings that collectively identify content that is subject to content control.

4. The method of claim 1, wherein the object metadata for the data object is retrieved from the metadata store based upon a reference associated with the second data packets.

5. The method of claim 1, wherein the object metadata is based upon content of the first data packets.

6. The method of claim 1, wherein the object metadata is generated by parsing the first data packets at a plurality of levels.

7. The method of claim 6, wherein the plurality of levels comprise a physical level, a data link and a network layer.

8. The method of claim 1, further comprising inspecting the second data packets and determining that the API request would involve accessing the data object by reference without contents of the data object passing through the proxy for inspection, and classifying the second data packets as a data-deficient API request.

9. The method of claim 8, wherein the data-deficient API request is sharing of the data object.

10. The method of claim 8, wherein the data-deficient API request is online access of the data object within the independent object store.

11. The method of claim 8, wherein the data-deficient API request is attachment of the data object in a web-based e-mail.

12. The method of claim 1, further including:
inspecting a proxy-bypassed data object deposited into the independent object store by an unmanaged device not subject to the proxy, the inspecting including applying pattern searches-based content inspection rules to find strings and interrelated strings in the proxy-bypassed data object that are subject to content control;
based on the inspecting, creating the object metadata that classifies the proxy-bypassed data object as being subject to content control and storing the object metadata in the metadata store;
receiving third data packets at the proxy from the user system during an API request to the independent object store, inspecting the third data packets and determining that the API request would involve accessing the proxy-bypassed data object by reference without contents of the data object passing through the proxy for inspection, and classifying the third data packets as a data-deficient API request;
using the reference to the proxy-bypassed data object extracted from the third data packets to retrieve the object metadata for the proxy-bypassed data object from the metadata store; and
using the retrieved object metadata to actively control access to the proxy-bypassed data object via the independent object store by the user system.

13. The method of claim 1, wherein the object metadata links the data object to an object type, the method further comprising:
inspecting the second data packets and determining that the API request would involve accessing the data object based on a morphed object type that is not subject to content control, and classifying the second data packets as a trust-deficient API request; and
wherein controlling access to the data object via the independent object store by the user system is based upon the object type linked to the data object.

14. The method of claim 13, further including:
based on the inspecting, creating object metadata that classifies the data object as being subject to content control;
storing the object metadata in the metadata store and making the object metadata accessible by an integrity checksum of the data object;
receiving second data packets at the proxy from the user system during an application programming interface (API) request to the independent object store, inspecting the second data packets and determining that the API request would involve accessing the data object based on a morphed object identifier (ID) that is not subject to content control, and classifying the second data packets as a trust-deficient API request;
using the integrity checksum extracted from the second data packets to retrieve the object metadata for the data object from the metadata store; and
based on the object metadata, determining that the second data packets are subject to content control and actively controlling access to the data object via the independent object store by the user system.

15. A non-transitory computer readable medium carrying a computer program comprising computer readable instructions configured, when executed, to cause a computer to carry out a method including:
receiving first data packets at a proxy interposed between a user system and an independent object store during transfer of a data object from the user system to the independent object store;
determining by the proxy that the data object is subject to content control by applying content inspection rules to the first data packets;
generating by the proxy, object metadata based on the applying of the content inspection rules to the data object and storing the object metadata in a metadata store separate from the independent object store;
receiving at the proxy, second data packets at the proxy from the user system during an application programming interface (API) request to the independent object store, the second data packets comprising a request to access the data object;
retrieving the object metadata by the proxy for the data object from the metadata store; and
controlling access by the proxy to the data object via the independent object store by the user system based upon the retrieved object metadata for the data object.

16. A non-transitory computer readable medium of claim 15, wherein the computer readable instructions, when executed, further cause a computer to carry out the method including inspecting the second data packets and determining that the API request would involve accessing the data object by reference without contents of the data object passing through the proxy for inspection, and classifying the second data packets as a data-deficient API request.

17. A non-transitory computer readable medium of claim 15, wherein the computer readable instructions, when executed, further cause a computer to carry out the method including:
inspecting a proxy-bypassed data object deposited into the independent object store by an unmanaged device not subject to the proxy, the inspecting including applying pattern searches-based content inspection rules to find strings and interrelated strings in the proxy-bypassed data object that are subject to content control;

based on the inspecting, creating object metadata that classifies the proxy-bypassed data object as being subject to content control and storing the object metadata in the metadata store;

receiving third data packets at the proxy from the user system during an API request to the independent object store, inspecting the third data packets and determining that the API request would involve accessing the proxy-bypassed data object by reference without contents of the data object passing through the proxy for inspection, and classifying the third data packets as a data-deficient API request;

using the reference to the proxy-bypassed data object extracted from the third data packets to retrieve the object metadata for the proxy-bypassed data object from the metadata store; and using the retrieved object metadata to actively control access to the proxy-bypassed data object via the independent object store by the user system.

18. A non-transitory computer readable medium of claim 15, wherein the object metadata links the data object to an object type, wherein the computer readable instructions, when executed, further cause a computer to carry out the method including:

inspecting the second data packets and determining that the API request would involve accessing the data object based on a morphed object type that is not subject to content control, and classifying the second data packets as a trust-deficient API request; and wherein controlling access to the data object via the independent object store by the user system is based upon the object type linked to the data object.

19. A non-transitory computer readable medium of claim 18, wherein the computer readable instructions, when executed, further cause a computer to carry out the method including:

based on the inspecting, creating object metadata that classifies the data object as being subject to content control;

storing the object metadata in the metadata store and making the object metadata accessible by an integrity checksum of the data object;

receiving second data packets at the proxy from the user system during an application programming interface (API) request to the independent object store, inspecting the second data packets and determining that the API request would involve accessing the data object based on a morphed object identifier (ID) that is not subject to content control, and classifying the second data packets as a trust-deficient API request;

using the integrity checksum extracted from the second data packets to retrieve the object metadata for the data object from the metadata store; and based on the object metadata, determining that the second data packets are subject to content control and actively controlling access to the data object via the independent object store by the user system.

20. A computer apparatus for controlling data accesses to a data object based upon content of the data object between an organization's user systems and independent object stores comprising:

a memory storing processor readable instructions; and a processor arranged to read and execute instructions stored in said memory;

wherein said processor readable instructions comprise instructions arranged to control the computer apparatus to carry out a method including:

receiving first data packets at a proxy interposed between a user system and an independent object store during transfer of a data object from the user system to the independent object store;

determining by the proxy that the data object is subject to content control by applying content inspection rules to the first data packets;

generating by the proxy, object metadata based on the applying of the content inspection rules to the data object and storing the object metadata in a metadata store separate from the independent object store;

receiving at the proxy, second data packets at the proxy from the user system during an application programming interface (API) request to the independent object store, the second data packets comprising a request to access the data object;

retrieving the object metadata by the proxy for the data object from the metadata store; and controlling access by the proxy to the data object via the independent object store by the user system based upon the retrieved object metadata for the data object.

* * * * *